(12) United States Patent
Sugiura et al.

(10) Patent No.: US 7,903,210 B2
(45) Date of Patent: Mar. 8, 2011

(54) REFLECTION TYPE LIQUID CRYSTAL DISPLAY DEVICE AND MANUFACTURING METHOD THEREOF

(76) Inventors: Norio Sugiura, Kawasaki (JP);
Katsufumi Ohmuro, Kawasaki (JP);
Kunihiro Tashiro, Kawasaki (JP)

( * ) Notice: Subject to any disclaimer, the term of this patent is extended or adjusted under 35 U.S.C. 154(b) by 0 days.

(21) Appl. No.: 11/060,962

(22) Filed: Feb. 18, 2005

(65) Prior Publication Data

US 2005/0134768 A1 Jun. 23, 2005

Related U.S. Application Data

(62) Division of application No. 10/051,709, filed on Jan. 18, 2002, now Pat. No. 6,882,388.

(30) Foreign Application Priority Data

Jan. 25, 2001 (JP) .................................. 2001-16882
Mar. 30, 2001 (JP) ................................. 2001-101755

(51) Int. Cl.
*G02F 1/1335* (2006.01)
(52) U.S. Cl. ........................................ 349/114; 349/113
(58) Field of Classification Search .................... 349/113
See application file for complete search history.

(56) References Cited

U.S. PATENT DOCUMENTS

| 5,223,455 | A | * | 6/1993 | Itoh et al. ........................ 438/656 |
| 5,660,969 | A | * | 8/1997 | Kaimoto ....................... 430/270.1 |
| 5,847,789 | A | | 12/1998 | Nakamura et al. ............... 349/99 |
| 5,917,567 | A | | 6/1999 | Oh et al. ........................ 349/113 |
| 6,097,458 | A | | 8/2000 | Tsuda et al. ................... 349/113 |
| 6,137,557 | A | * | 10/2000 | Hebiguchi et al. ............. 349/141 |
| 6,181,396 | B1 | * | 1/2001 | Kanoh et al. ................... 349/113 |
| 6,181,397 | B1 | | 1/2001 | Ichimura ....................... 349/113 |
| 6,208,395 | B1 | * | 3/2001 | Kanoh et al. ................... 349/113 |
| 6,262,783 | B1 | | 7/2001 | Tsuda et al. ..................... 349/39 |
| 6,327,009 | B1 | | 12/2001 | Ichimura ....................... 349/113 |
| 6,339,291 | B1 | | 1/2002 | Codama ........................ 313/506 |
| 6,380,995 | B1 | | 4/2002 | Kim ............................. 349/113 |
| 6,452,653 | B1 | | 9/2002 | Yamanaka et al. ............. 349/113 |
| 6,525,792 | B1 | | 2/2003 | Fujioka et al. ................. 349/113 |
| 6,600,535 | B1 | | 7/2003 | Tsuda et al. ................... 349/113 |
| 6,900,855 | B1 | | 5/2005 | Yamazaki et al. |
| 6,985,195 | B1 | * | 1/2006 | Kumagai et al. .............. 349/113 |
| 7,106,400 | B1 | | 9/2006 | Tsuda et al. |
| 2002/0030774 | A1 | | 3/2002 | Yoshii et al. ................... 349/113 |
| 2002/0140886 | A1 | | 10/2002 | Sugiura et al. |
| 2003/0053016 | A1 | * | 3/2003 | Kubota et al. ................. 349/113 |
| 2004/0070709 | A1 | | 4/2004 | Kanou et al. |
| 2004/0144754 | A1 | | 7/2004 | Itami et al. |

(Continued)

FOREIGN PATENT DOCUMENTS

JP 05-80327 4/1993

(Continued)

*Primary Examiner* — David Nelms
*Assistant Examiner* — Lucy P Chien
(74) *Attorney, Agent, or Firm* — Greer, Burns & Crain, Ltd

(57) ABSTRACT

The present invention is a method of manufacturing a liquid crystal display device, wherein light having an exposure energy is irradiated on the surface of a photo-sensitive resin layer having a predetermined film thickness, and a distribution of thermal deformation characteristics in the thickness direction (or the plane direction) of the photo-sensitive resin layer is formed, then heat treatment is performed to form random undulation (micro-grooves or micro-wrinkles) on the surface of the photo-sensitive resin layer.

8 Claims, 71 Drawing Sheets

U.S. PATENT DOCUMENTS

| | | |
|---|---|---|
| 2005/0134768 A1 | 6/2005 | Sugiura et al. |
| 2009/0148616 A1 | 6/2009 | Itami et al. |

FOREIGN PATENT DOCUMENTS

| | | |
|---|---|---|
| JP | 05-232465 | 9/1993 |
| JP | 05-281533 | 10/1993 |
| JP | 06-175126 | 6/1994 |
| JP | 07-181481 | 7/1995 |
| JP | 08-184846 | 7/1996 |
| JP | 08-227071 | 9/1996 |
| JP | 08-338993 | 12/1996 |
| JP | 09-090426 | 4/1997 |
| JP | 09-258219 | 10/1997 |
| JP | 10-10527 | 1/1998 |
| JP | 10-253977 | 9/1998 |
| JP | 11-52367 | 2/1999 |
| JP | 11-174446 | 7/1999 |
| JP | 11-259018 | 9/1999 |
| JP | 11-295750 | 10/1999 |
| JP | 11-326615 | 11/1999 |
| JP | 11-337935 | 12/1999 |
| JP | 11-337964 | 12/1999 |
| JP | 2000-131686 | 5/2000 |
| JP | 2000-193807 | 7/2000 |
| JP | 2000-258802 | 9/2000 |
| JP | 2000-284278 | 10/2000 |
| JP | 2001-042304 | 2/2001 |
| JP | 2002-221716 | 8/2002 |
| JP | 2000-250025 | 9/2009 |

\* cited by examiner

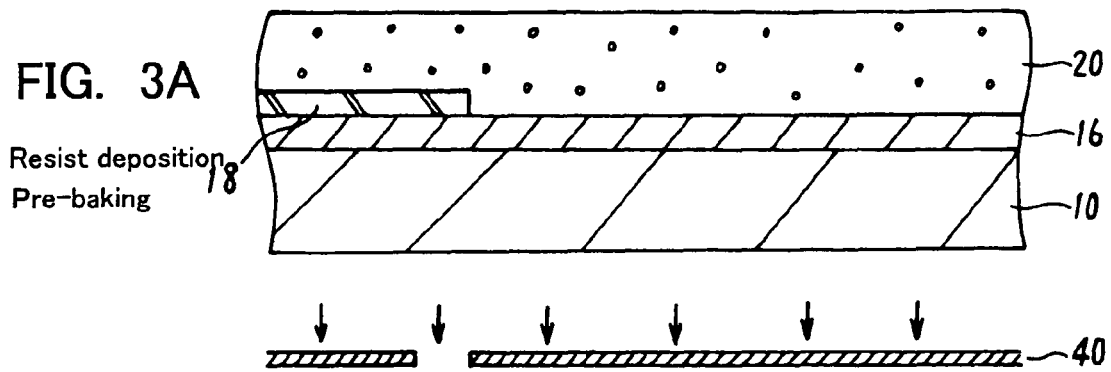
FIG. 3A
Resist deposition
Pre-baking
FIG. 3B
Exposure &
Development
for contact hole,
Post-baking
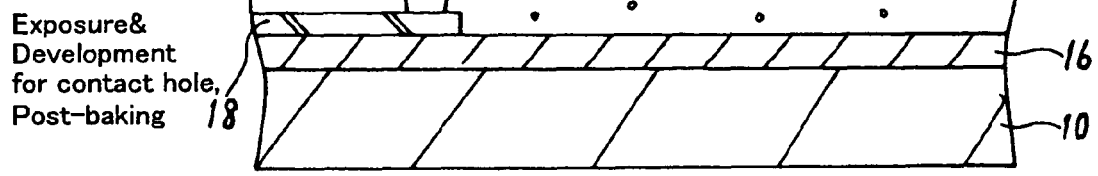
DUV
FIG. 3C
DUV irradiation
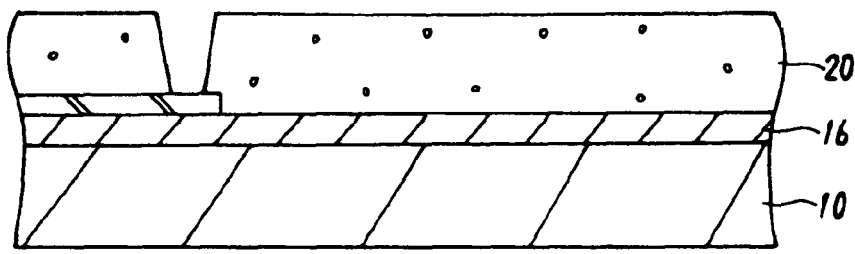
FIG. 3D
Final baking
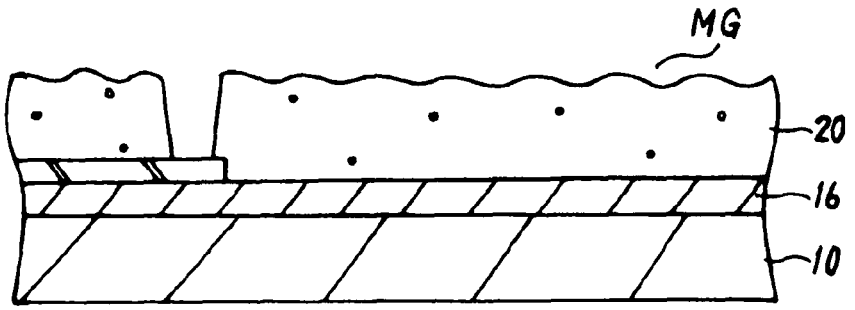

Thickness 1.4 μm

Thickness 1.0 μm

Thickness 1.7 μm

Average inclination angle k=13°
Height difference of undulation : 1.3 μm

Thickness 1.4 μm

Average inclination angle k=11°
Height difference of undulation : 1.1 μm

Thickness 1 μm

Average inclination angle k=8°
Height difference of undulation : 0.5 μm

Rough undulation

Fine undulation

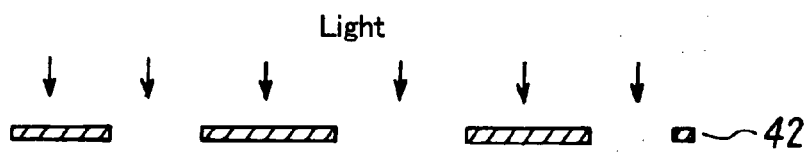
FIG. 14A
Exposure
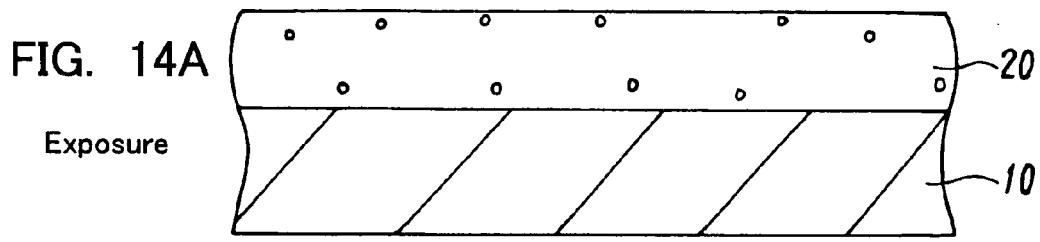
FIG. 14B
Development
UV irradiation
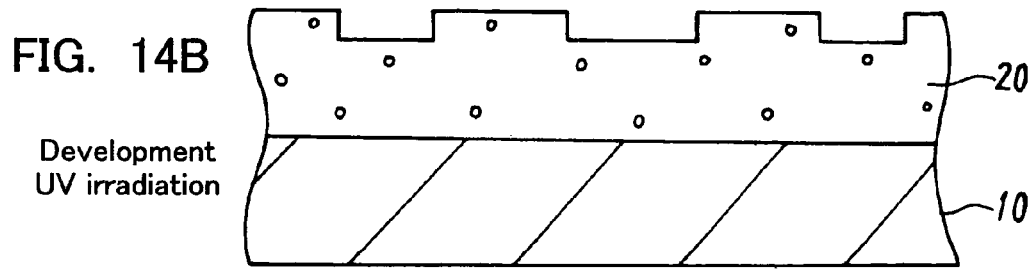
FIG. 14C
Final baking
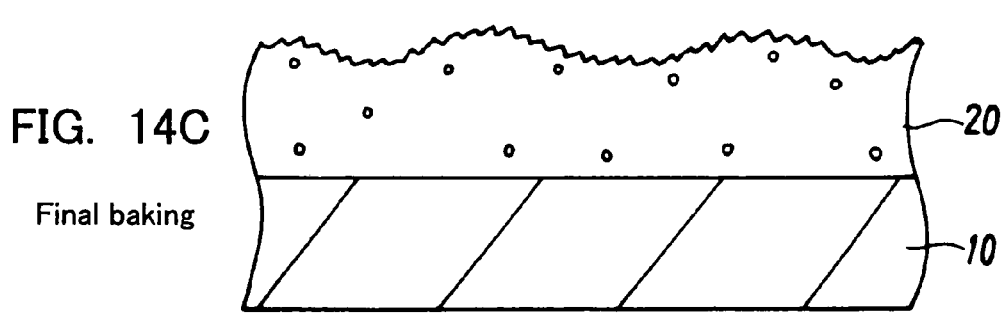

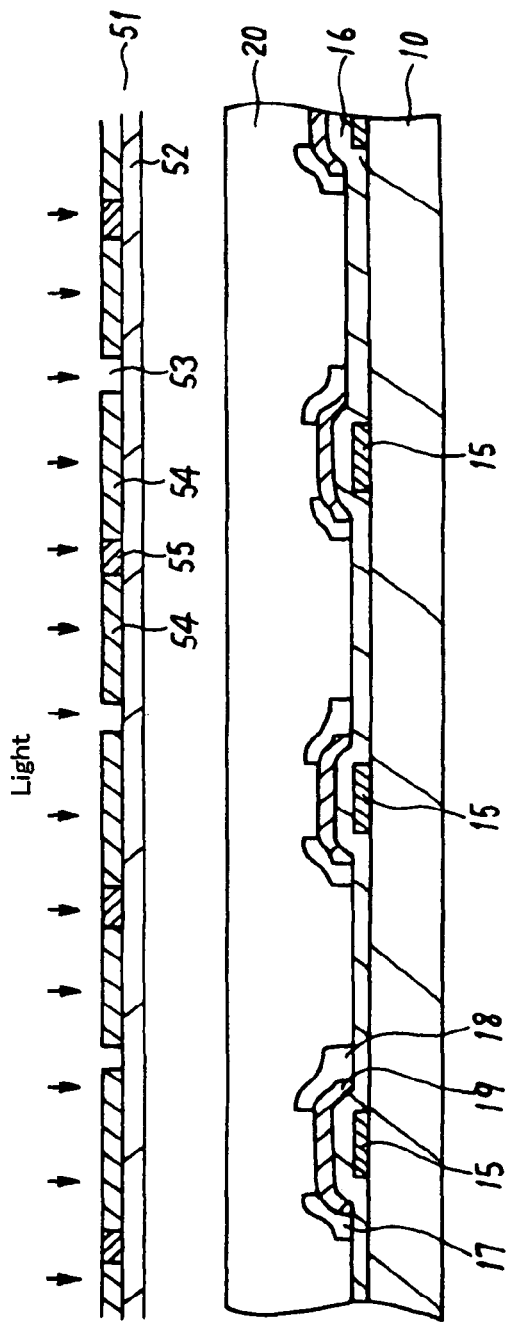
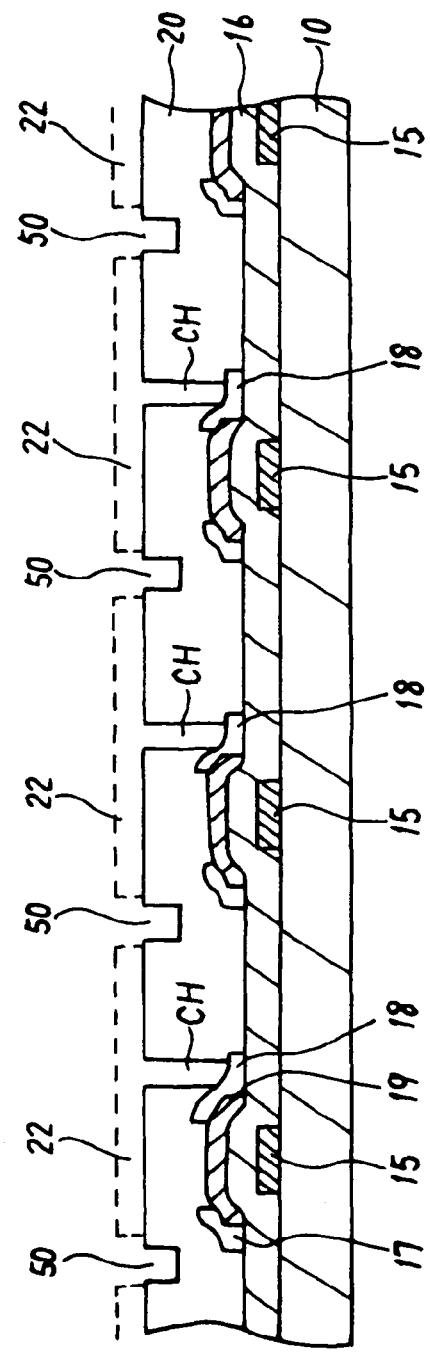
FIG. 17A
FIG. 17B with separation line without separation line

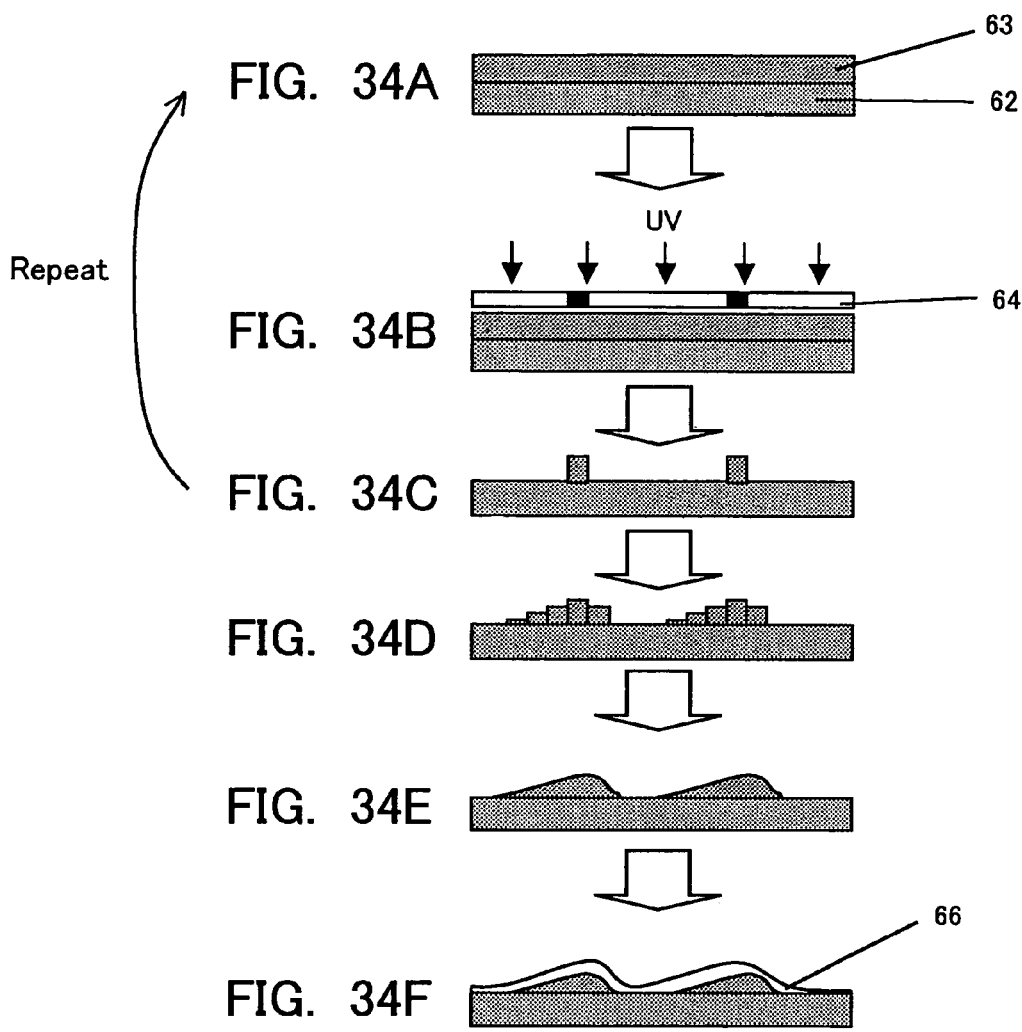
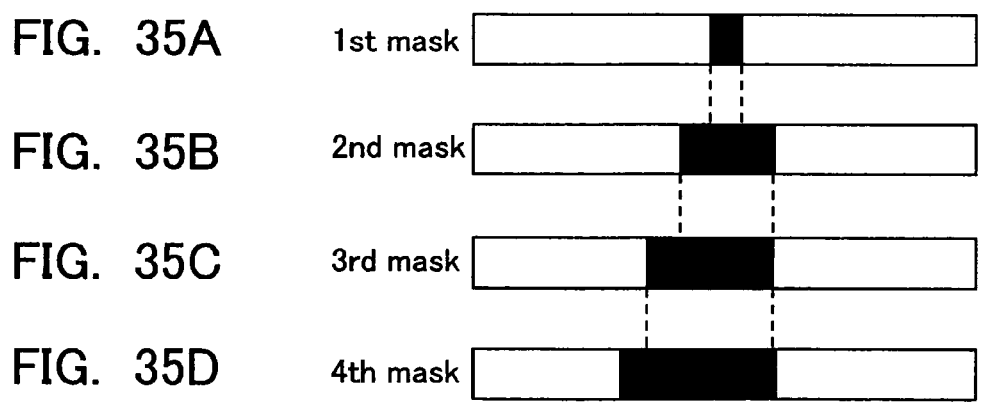

FIG. 37
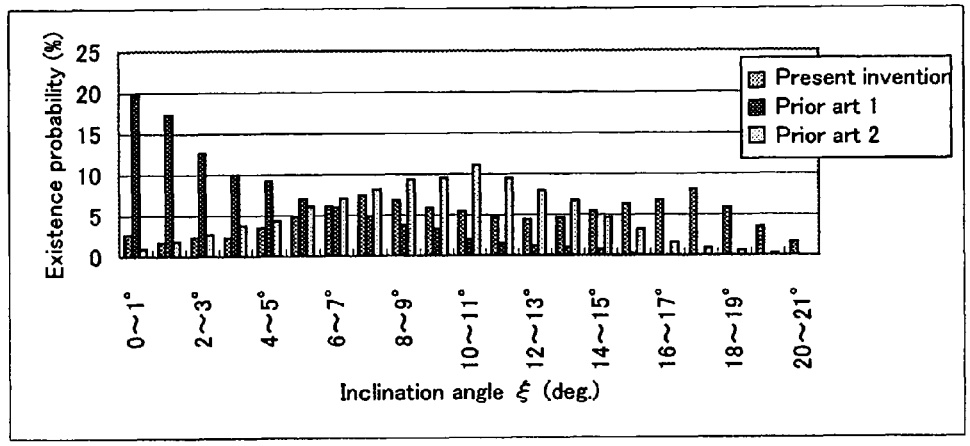
FIG. 38
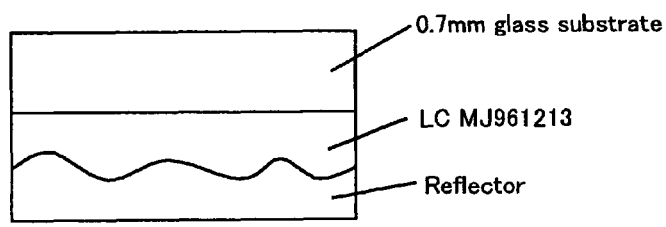
FIG. 39
Measurement result of reflectance
|  | Present invention | Prior art 1 | Prior art 2 |
|---|---|---|---|
| Reflectance | 61% | 31% | 53% |
Present invention : Existence probability of indication angle is maximum at 8° − 18°
Prior art 1 : Existence probability of indication angle is maximum at only 0°
Prior art 2 : Existence probability of indication angle is maximum at only 10°

Undulation A  Undulation B

Unite image

Unite image

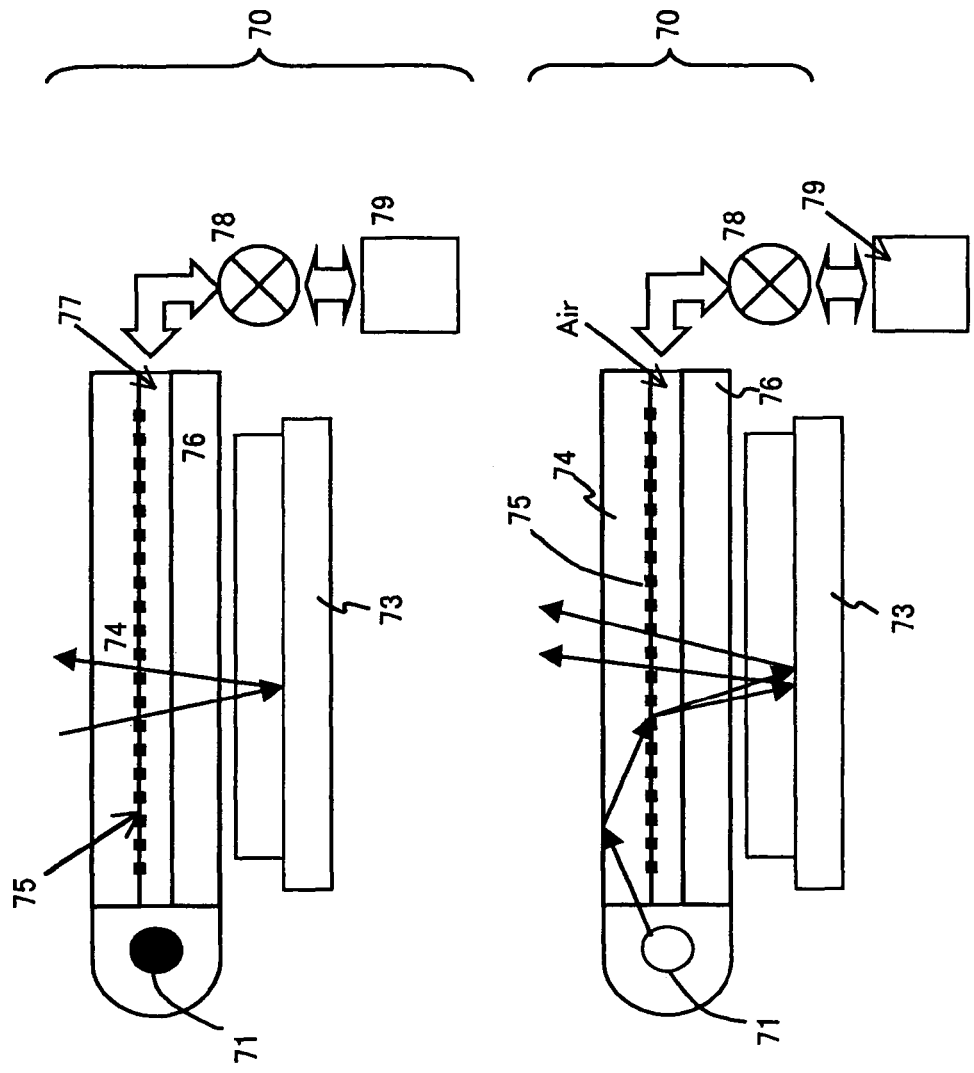
FIG.50A At bright place
FIG.50B At dark place

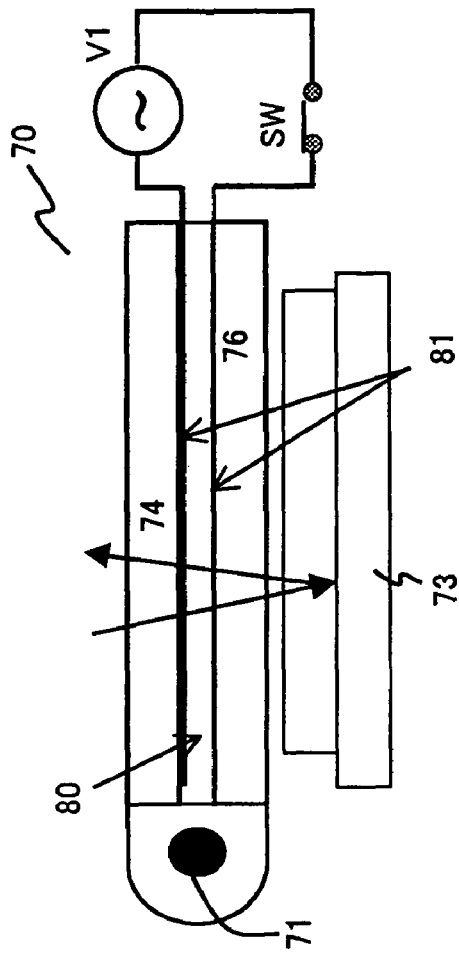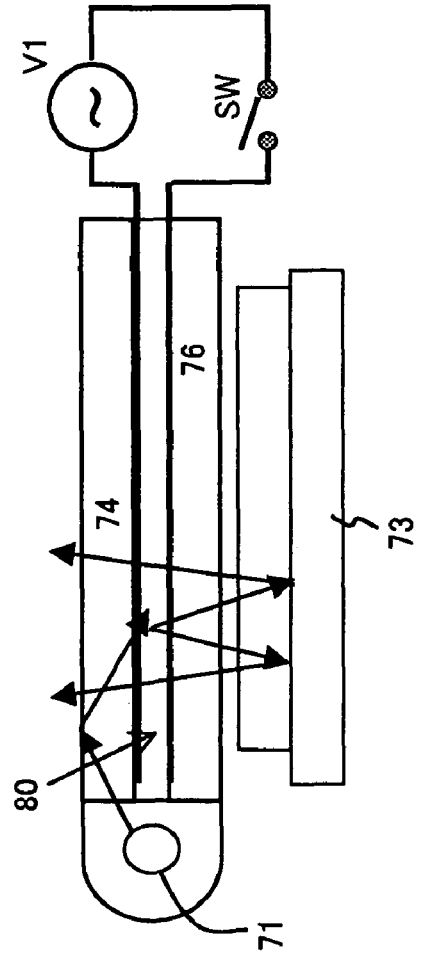
FIG.51A
At bright place
FIG.51B
At dark place

At bright place

At dark place

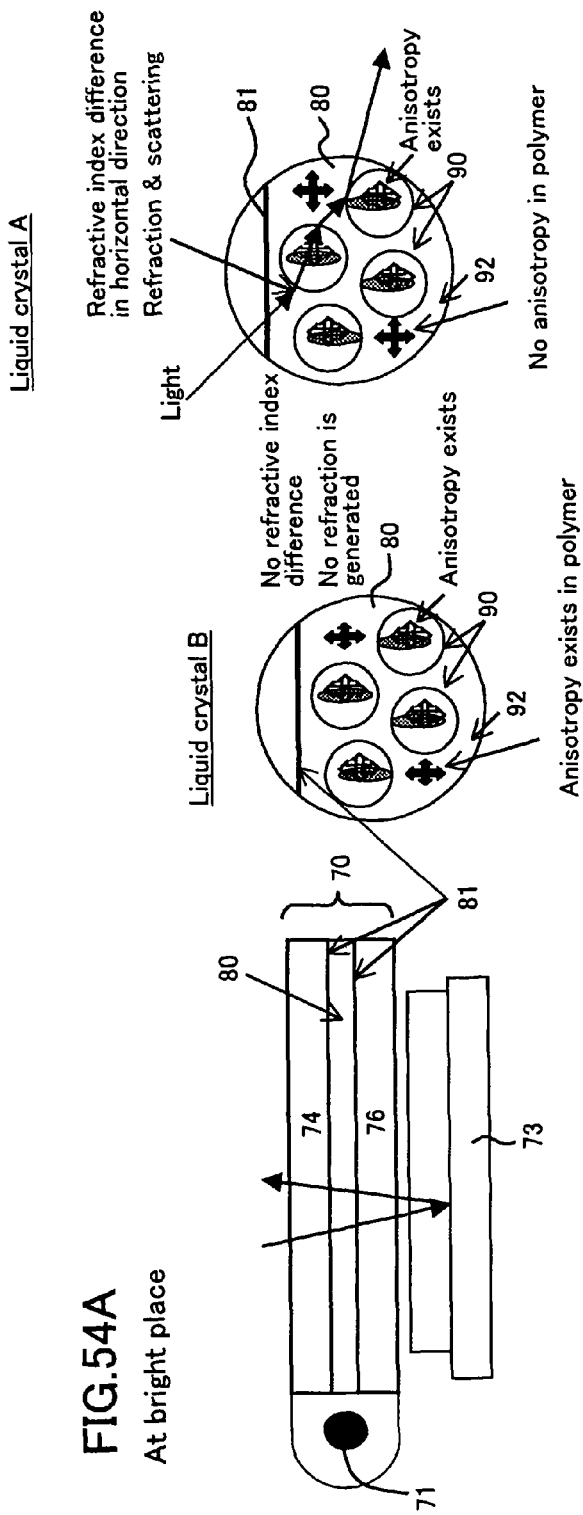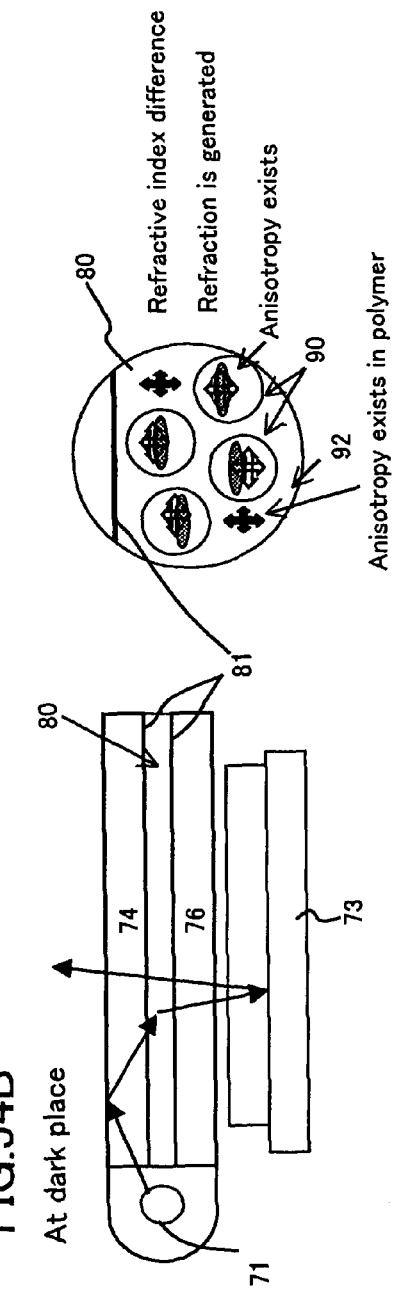
FIG.54A At bright place
FIG.54B At dark place

20 ×

Regist rotation frequency (rpm)

| 800 | 1200 | 1500 |
|---|---|---|
| 2000 | 2500 | 3000 |
| 4000 | 5000 | |

20 ×

FIG. 80A    FIG. 80B
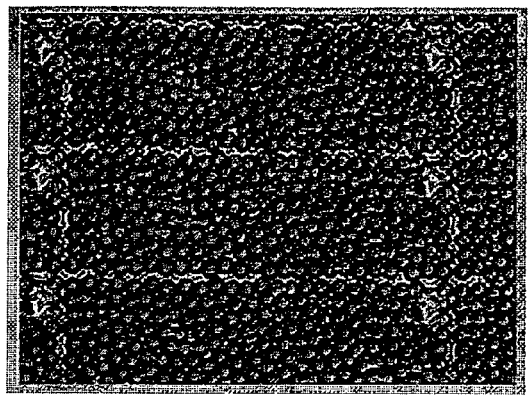 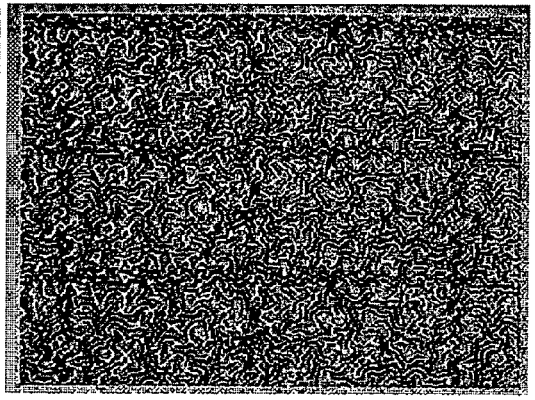
UV 80mJ/cm²          UV 35mJ/cm²
FIG. 81
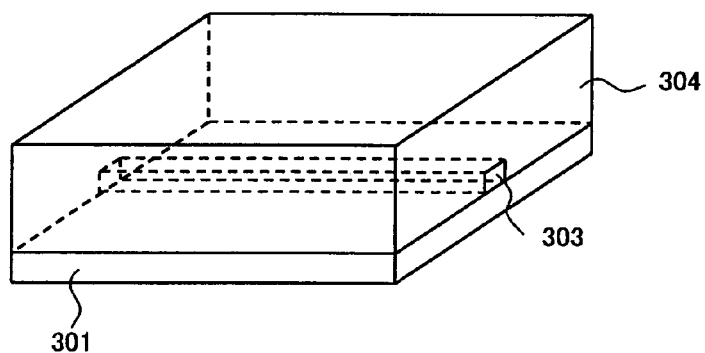
FIG. 82A    FIG. 82B
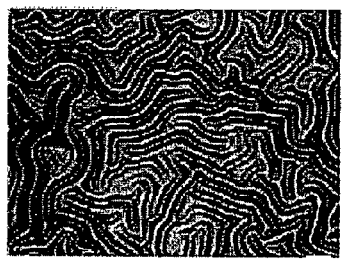 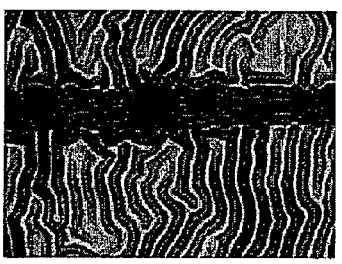
← Stripe undulation
20×
No undulation under resist    Undulation under resist

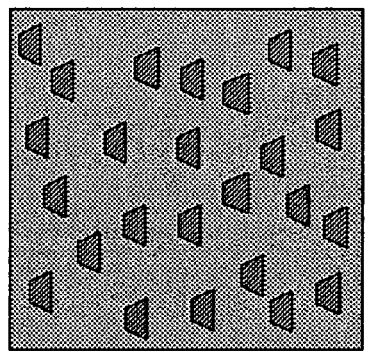
FIG. 83C Trapezoidal pattern
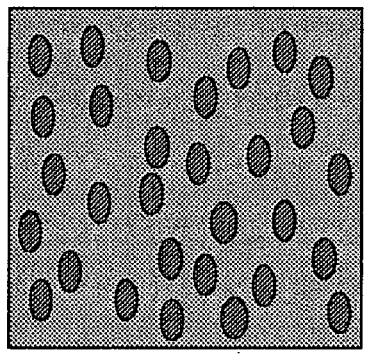
FIG. 83B Elliptical pattern
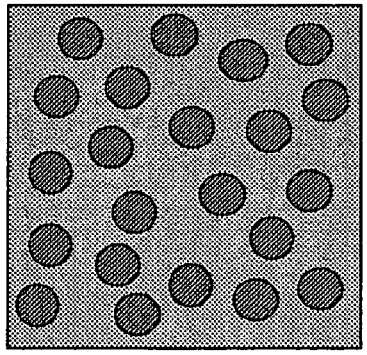
FIG. 83A Circular pattern
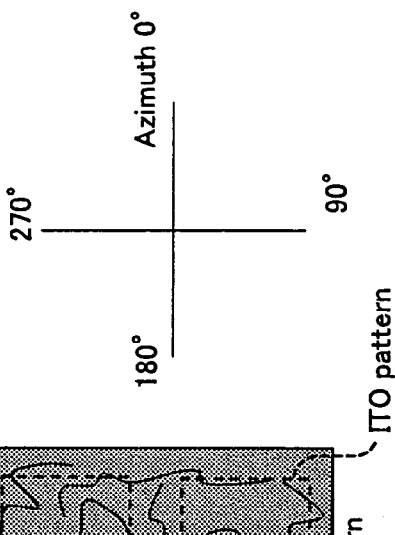
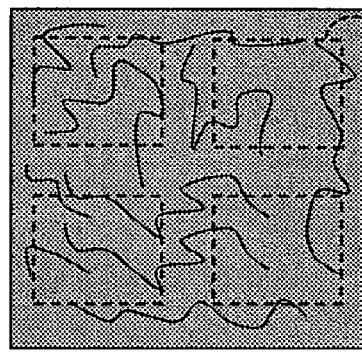
FIG. 83E Wrinkle pattern
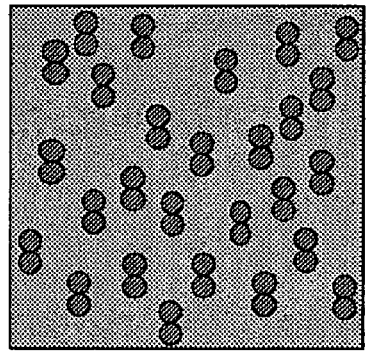
FIG. 83D Cocoon-shaped pattern Circle Elliptical Trapezoidal Cocoon-shape Wrinkle

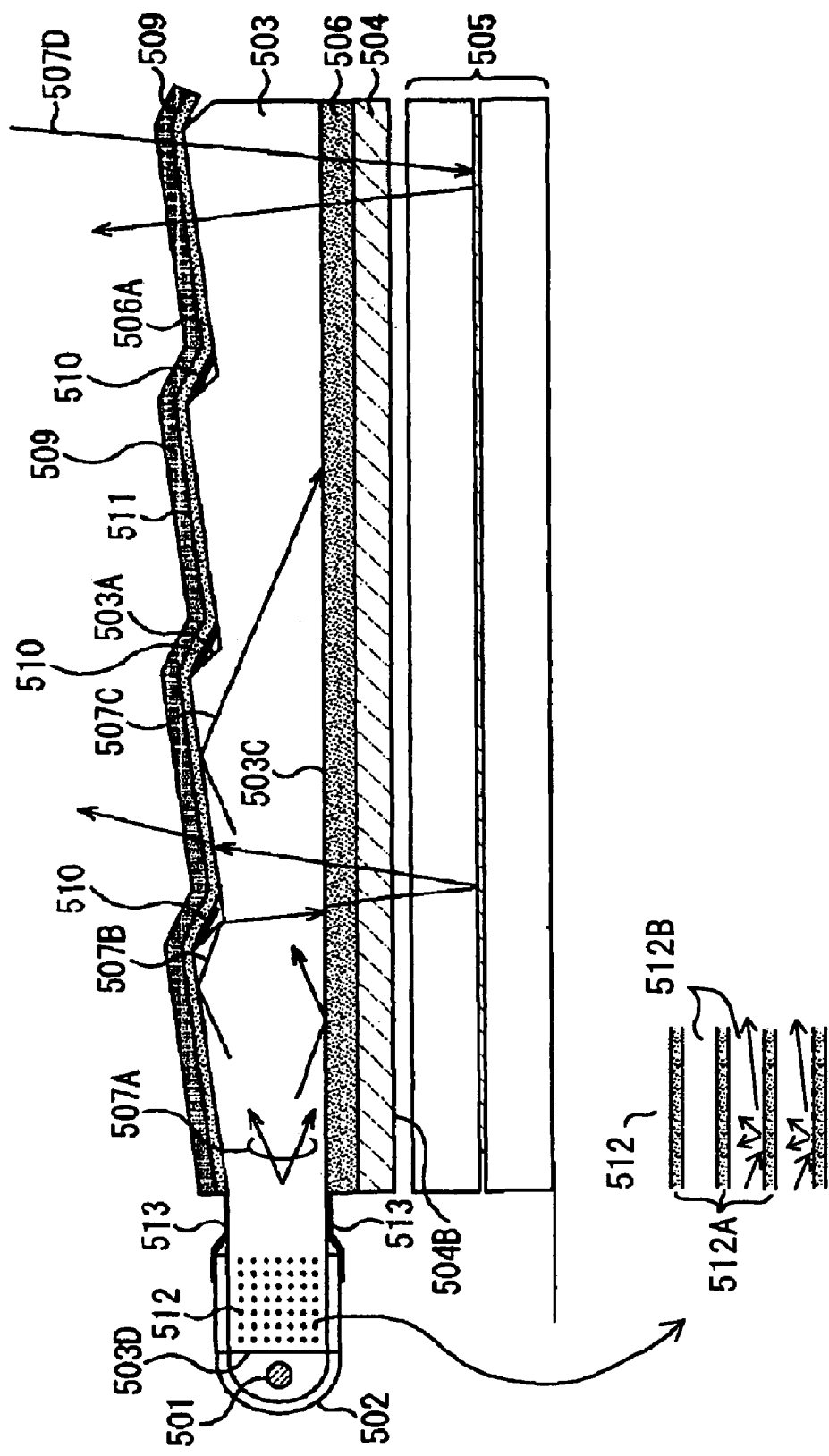

REFLECTION TYPE LIQUID CRYSTAL DISPLAY DEVICE AND MANUFACTURING METHOD THEREOF

This is a divisional of application Ser. No. 10/051,709, filed Jan. 18, 2002, now U.S. Pat. No. 6,882,388.

BACKGROUND OF THE INVENTION

1. Field of the Invention

The present invention relates to a reflection type liquid crystal display device and a manufacturing method thereof, and more particularly to a reflection type liquid crystal display device having a scattering reflector structure with high reflectance by a simple process, and a manufacturing method thereof.

2. Description of the Related Art

Recently in liquid crystal panels using an active matrix, reflection liquid crystal display devices, which can implement light weight, slimness and low power consumption, are attracting attention. A reflection type liquid crystal display device can decrease power consumption since light from the outside is taken inside the display panel and is reflected by a reflector installed at the rear face side, and backlight is unnecessary. Therefore the reflection type liquid crystal display device is useful as a display device for portable information terminals and portable telephones.

Light from the outside differs depending on the environment where the display device is used. Therefore it is desirable that the reflector installed in the display panel have a light scattering reflection structure which reflects light entering from a random direction to a random direction.

As such a reflection liquid crystal display device, a structure where pixel electrodes are formed on a bumpy shape film so that external light is irregularly reflected by the bumpy pixel electrodes has been proposed. For example, Japanese Patent Laid-Open No. H5-232465 and Japanese Patent Laid-Open No. H8-338993 proposed this structure. The reflection liquid crystal display device described in these publications uses photo-lithography processing using a mask pattern, or uses a combination of a polishing process and etching process in order to form undulation for pixel electrodes.

In these prior arts, high reflectance can be obtained by forming an arbitrary bump pattern at reflection electrodes. But to control the shape of reflection electrodes using photo-lithography makes the process complicated. Since reflection characteristics change considerably if shape changes depending on the exposure conditions, the margin in the manufacturing process is small.

As a method of solving this problem, Japanese Patent Laid-Open No. H5-80327 discloses a method of simplifying the process using a thin film resin layer where the coefficient of thermal expansion is different from that of the reflection electrodes. With this method, however, undulation is formed on the surface of the pixel electrodes by forming a metal film by a heat sputtering method after organic film is formed. This method generates degassing from the organic film during the heating process in a vacuum, causing a change in the film quality of the reflection film or generating small undulation on the reflection film, which drops the reflection characteristics, therefore this process is not practical.

Japanese Patent Laid-Open 2000-193807 proposes a technology for forming fine undulation on organic films using fluorine-contained resin having a fluorine aliphatic ring structure for the main chain. This method, however, must use special resin, and requires a baking process at a high temperature of 350° C. Also, as the known example shows, this resin itself does not have photo-sensitivity, so if undulation is formed on pixel electrodes to be connected to a thin film transistor, resin must be coated separately to generate contact holes in the photo-lithography process, which makes the process complicated.

Also Japanese Patent Laid-Open No. H10-253977 states that undulation having variable distribution in the depth direction are formed using the intensity distribution of speckles which are generated when a coherent light is irradiated, so as to form a reflector having random bump distribution. This method, however, requires a special exposure system, and this exposure system is huge and has a high cost, which means that this method is not practical.

As described above, various reflection type liquid crystal display devices where a scattering reflection electrode is used for a pixel electrode have been proposed, but in all cases, a scattering reflection electrode having sufficient reflectance cannot be formed with a simple manufacturing process. In order to form an optimum reflection electrode structure, it is necessary to control the average inclination angle of the undulation and the inclination angle distribution in an optimum range, but no manufacturing process which can control the average inclination and the inclination angle distribution to be an optimum reflection electrode structure with good repeatability has been proposed.

Also the inclination angle of the undulation of the reflector of a conventional reflection liquid crystal display device is selected such that maximum reflectance is obtained with respect to an incident light from a specific direction. A conventional reflector requires setting the inclination angle of the undulation to be 10°-20°, for example (Japanese Patent Laid-Open No. H11-259018), setting the inclination angle of the undulation of the reflector to be a uniform angle in a 5°-25° range (Japanese Patent Laid-Open No. H08-227071), setting the average inclination angle of the undulation of the reflector to be 30° or less (Japanese Patent Laid-Open No. S56-156865), with the heights of undulation in Gaussian distribution and the average inclination angle of the undulation at this time 10° (Tohru Koizumi and Tatsuo Uchida, Proceedings of the SID, Vol. 29, p. 157, 1988), and the surface of the reflector having a smooth bump face, and the average inclination angle of the undulation 4°-15° (Japanese Patent Laid-Open No. H6-175126).

In these prior arts however, no consideration was made concerning whether the reflectance becomes highest no matter from which direction the external lights enter the display panel. Therefore in the prior arts, no reflection type liquid crystal display device which becomes bright where external light is reflected at high reflectance under various environments have been proposed.

Also none of the prior arts proposed undulation shapes to make reflectance high, assuming a case when external lights enter the display panel of a notebook computer from all orientations at a certain direction and from a specific orientation at a direction which is different from that.

A reflector structure where a resist film is formed, exposed and developed with a predetermined mask pattern, then the cross-sectional structure of the resist film is smoothed by a baking process, so as to form a desired inclined face, has been proposed. However, in such a manufacturing process, an optimum pattern shape has not been proposed. A method of forming a undulation shape for reflection which has both directivity and scattering properties in a same pixel area has also not been proposed.

Also a reflection liquid crystal display device, which uses external lights, requires a light source to be used in a dark place. However, if a structure, where light from the light source is scattered and entered into the display panel side, is used, the displayed image is blurred by this scattering structure, which aggravates contrast.

The reflection type liquid crystal display device, which does not use backlight, can be slim, light and have low power consumption.

The reflection liquid crystal display device is roughly comprised of three layers, that is, a light shutter layer, a colored layer and a light reflection layer, but it is most important to obtain a bright display by utilizing ambient light efficiently. The light reflection layer of the above three layers has a particularly large influence not only on light utilization efficiency but also on viewing angle characteristics. Therefore optimizing the light reflection layer is most important to implement a bright reflection liquid crystal display device, and obtaining a bright light reflection layer has been considered.

Also a reflection type liquid crystal display device having a front light structure as an illumination system has been developed.

Also, by using a guest-host system where dichroic dye are mixed or a one polarizer system where one polarizer is used for the light shutter layer, a very bright display can be obtained in the former, and very high contrast can be obtained in the latter respectively in a bright state.

When the guest-host system where dichroic dye are mixed is used for the light shutter layer, considerable light leaks are generated if a diffuse reflector with high reflection efficiency is used, since the contrast of the guest-host liquid crystal is low in the dark state. In this state, the value of contrast of display characteristics is good, but the display does not look good visually.

Also if one diffuse reflector and one polarizer system are combined for a display, in this case, the display is good in the dark state, but brightness becomes insufficient in the bright state because of light absorption by the polarizer.

In the case of a reflection type liquid crystal display device having a front light structure as an illumination device, there are many interfaces between the liquid crystal substrate and the light guiding plate of the front light structure, therefore the light guided by the light guiding plate and the light directly entered from the outside is reflected at the interface without reaching the liquid crystal substrate. The light reflection which does not contribute to the liquid crystal display causes a drop in display quality, especially in contrast. Also, a reflection type liquid crystal display device primarily used for PDA normally has a touch panel on the surface. When the display device has a touch panel, there are also interface between the touch panel and the light guiding plate, therefore the above mentioned drop in contrast aggravates. Therefore it has been difficult to implement a reflection type liquid crystal panel having both a front light and a touch panel. As a countermeasure, a structure to decrease the reflection interfaces by integrating the light guiding plate of the front light structure and the touch panel has been considered, but the transparent conductive film used for the touch panel absorbs specific bands (blue and red, B, R) of the light being guided by the light guiding plate, and green becomes dominant on screen when combined with the light guiding plate.

Also, in the case of a prism type light guiding plate, a leak light component, which is directly emitted from the light guiding plate to the observer, is generated, which drops the contrast and makes particles which adhere to the surface of the prism more outstanding. This component is transmitted from the steep slope side of the prism face of the light guiding plate, which can be shielded to some extent, but the prism face of the light guiding plate is also a face where panel illumination light is generated, and it is difficult to implement both the shielding light to prevent leak light and panel illumination.

In this way, the reflection type liquid crystal display device can be slim, light weight and have low power consumption, but has serious problems due to a complicated manufacturing process and a narrowing of the manufacturing process margins, and it is difficult to improve the reflection characteristics.

SUMMARY OF THE INVENTION

With the foregoing in view, it is an object of the present invention to provide a method of manufacturing a liquid crystal display device which can implement a simplification of the manufacturing process, an improvement of yield, and a decrease in manufacturing cost, and allows creating a reflector which can stably implement high reflection characteristics.

It is another object of the present invention to provide a reflection type liquid crystal display device comprising a reflector which has high reflectance even if external lights enter from various directions.

It is still another object of the present invention to provide a reflection type liquid crystal display device comprising a reflector which has high reflectance on the display screen of a notebook personal computer.

It is still another object of the present invention to provide a reflection type liquid crystal display device having an optimum pattern shape of resist film for creating undulation for reflection.

It is still another object of the present invention to provide a reflection type liquid crystal display device with a front light which can be used in a dark place, and where contrast is improved without a blurred display screen during normal use.

With the foregoing in view, it is an object of the present invention to provide a method of manufacturing a reflection type liquid crystal display device with high reliability which can implement true simplification of process, an improvement of yield, and a decrease in manufacturing cost, and allows forming a reflection layer which can stably implement high reflection characteristics.

It is still another object of the present invention to provide a reflection type liquid crystal display device with high reliability which has a reflection layer having high reflection characteristics and allows a display with high brightness.

To achieve the above objects, a first aspect of the present invention is a method of manufacturing a liquid crystal display device, wherein light having an exposure energy is irradiated on the surface of a photo-sensitive resin layer having a predetermined film thickness, and a distribution of thermal deformation characteristics in the thickness direction (or the plane direction) of the photo-sensitive resin layer is formed, then heat treatment is performed to form random undulation (micro-grooves or micro-wrinkles) on the surface of the photo-sensitive resin layer.

A light having exposure energy, such as deep-ultraviolet radiation (DUV), is irradiated on the photo-sensitive resin layer, so as to partially sensitize and partially alter the photo-sensitive resin layer. By this, the distribution of thermal deformation characteristics can be formed in the thickness direction (or the plane direction) of the photo-sensitive resin layer. Then heat treatment is performed at a pre-neat treatment temperature or higher, so as to form random undulation on the surface of the photo-sensitive resin layer.

It is preferable that the DUV irradiation is controlled to be an energy irradiation to sensitize only a part of the front face of the photo-sensitive resin layer in the depth direction. As a result, the part of the front face of the photo-sensitive resin layer up to a predetermined depth is altered by a cross-link/decomposition reaction, and the front face side area and the rear face side area have different thermal deformation characteristics. Therefore random undulation is formed on the front face of the photo-sensitive resin layer during the heat treatment thereafter by the difference of the thermal deformation characteristics between the front face side and the rear face side of the photo-sensitive resin layer.

Or the DUV irradiation may be controlled to be energy irradiation to sensitize only a part of the area of the front face of the photo-sensitive resin layer. In this case, an exposure process using mask film is required. Thermal deformation characteristics distribution may be formed in the plane direction, and in this case as well, a different thermal deformation is generated in the plane direction during the heat treatment process thereafter, and random undulation is formed on the surface.

The pitch and height difference of the random undulation shaped grooves and ridges (roughness/fineness of the undulation) can be controlled with good repeatability by the film thickness of the photo-sensitive resin layer and the irradiation energy. The undulation shape can also be controlled by the temperature and the time of a pre-heat treatment of the photo-sensitive resin layer before irradiating energy light.

For example, as the film thickness of the photo-sensitive resin layer decreases, the height difference of the undulation decreases and the pitch decreases, and as the film thickness of the photo-sensitive resin layer increases, the height difference of the undulation increases and the pitch increases. As the irradiation energy decreases, the height difference of the undulation decreases and the pitch decreases, and as the irradiation energy increases, the height difference of the undulation increases and the pitch increases. As the pre-heat treatment temperature before energy light irradiation decreases and the time decreases, the height difference of the undulation increases and the pitch increases, and as the heat treatment temperature increases and the time increases, the height difference of the undulation decreases and the pitch decreases.

By selecting the above conditions, random bump shapes can be processed to be the desired shapes. The process is an extremely simple one of irradiating energy light and performing heat treatment thereafter, which is very practical.

It is preferable to use the photo-sensitive resin layer of the present invention as an insulation film between the pixel electrode and the source electrode of the thin film transistor for driving the pixel electrode. In this case it is necessary to create a contact hole for connecting the source electrode and the pixel electrode, and the contact hole can be formed by performing a photo-lithography process on the photo-sensitive resin layer, and then exposure and development are partially performed. And by performing the above mentioned irradiation of energy light and heat treatment thereafter on the photo-sensitive resin layer, desired random bump shapes can be formed on the front face. By forming a pixel electrode on the photo-sensitive resin layer, a desired reflection pixel electrode having desired random undulation can be implemented.

Instead of irradiating the above mentioned light having sensitizing energy, wet processing by an acid, an alkali solution, a quaternary ammonium salt solution or HMDS (Hexamethyl-di-silazane) chemicals may be used. By dipping the photo-sensitive resin layer into such chemicals, a chemical reaction is caused on the surface of the photo-sensitive resin layer, and the surface can be altered into a substance having different thermal deformation characteristics.

BRIEF DESCRIPTION OF THE DRAWINGS

FIGS. 3A-3D are cross-sectional views depicting a part of the manufacturing process of a reflection type crystal display device of the present embodiment;

FIGS. 14A-14C show cross-sectional views depicting the manufacturing process of the first sample;

FIGS. 17A-17B show cross-sectional views depicting the process of forming separation lines of the photo-sensitive resin layer;

FIGS. 28A-28F are cross-sectional view views depicting a method of forming the reflector prototype;

FIGS. 34A-34F show cross-sectional views depicting a method of forming a reflector sample;

FIGS. 35A-35D show diagrams depicting examples of the mask patterns in FIG. 34;

FIG. 37 shows the measurement result of the inclination angle distribution of the reflector prototype;

FIG. 38 is a rough cross-sectional view of the reflection type liquid crystal display device created using the reflector prototype;

FIG. 39 shows the measurement result of the reflectance of the reflection liquid crystal display device in FIG. 38;

FIGS. 50A-50B show diagrams depicting a first example of a reflection type liquid crystal display panel with front light;

FIGS. 51A-51B show diagrams depicting a second example of a reflection type liquid crystal display panel with front light;

FIGS. 54A-54B show diagrams depicting a fifth example of a reflection type liquid crystal display panel with front light;

FIGS. 80A-80B show micro-photographs showing substrates where 80 mJ/cm$^2$ and 35 mJ/cm$^2$ were irradiated;

FIG. 81 is a perspective view depicting a glass substrate;

FIGS. 82A-82B show micro-photographs showing micro-shapes generated after baking;

FIGS. 83A-83E show plan views depicting the patterns of the diffuse reflector of the fabrication example 1;

FIG. 96 is a cross-sectional view depicting a rough configuration of the reflection type liquid crystal display device of the fabrication example 6;

DESCRIPTION OF THE PREFERRED EMBODIMENTS

Embodiments of the present invention will now be described with reference to the accompanying drawings. The embodiments, however, do not limit the technical scope of the present invention.

Figure 1:
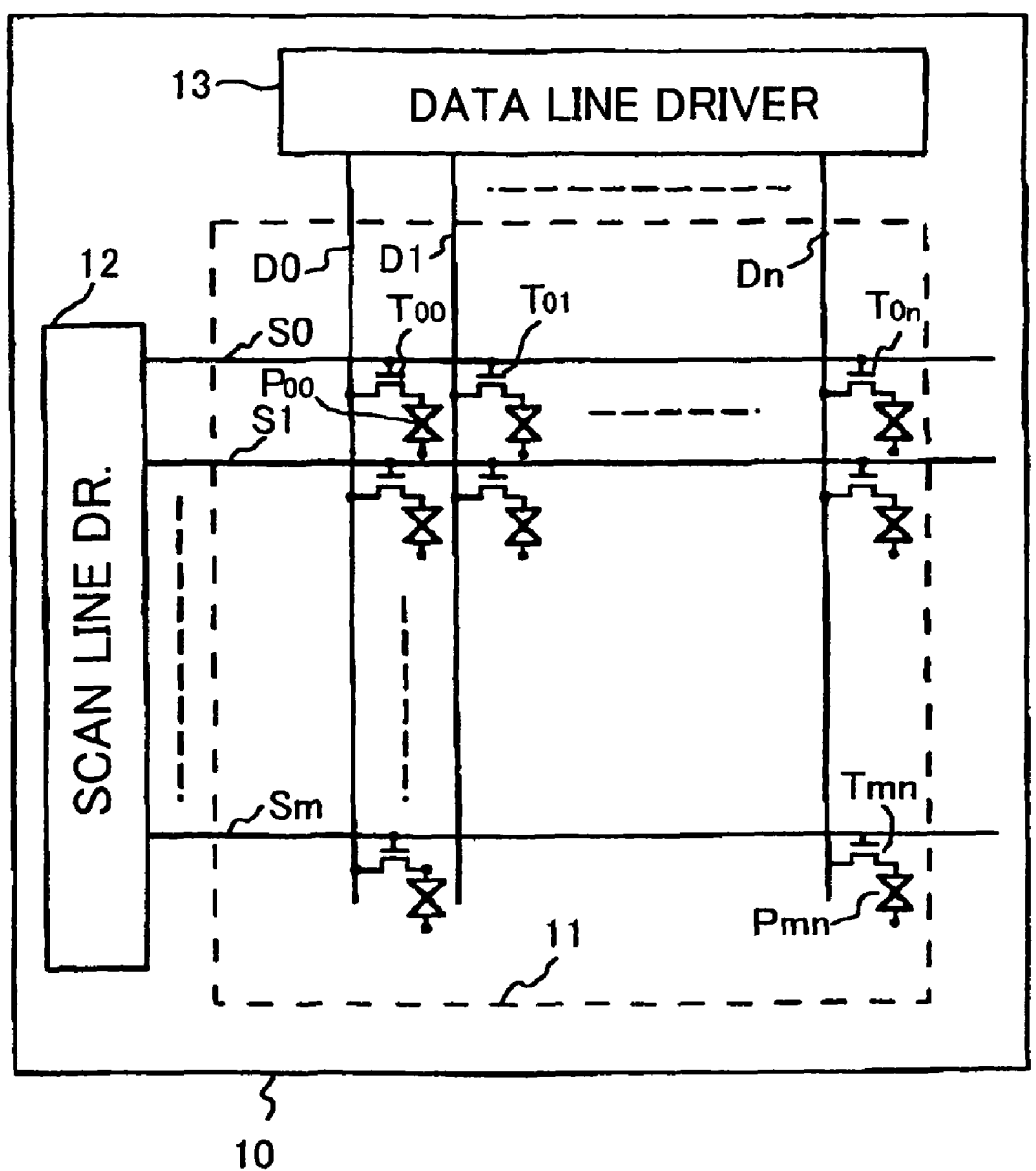
FIG. 1 is an example of a circuit diagram of a liquid crystal display device to which the present embodiment is applied.

FIG. 1 is an example of a circuit diagram of a liquid crystal display device to which the present embodiment is applied. Pixels are created in a matrix in a display area 11 of the insulation substrate 10 at the rear face side. The pixels have drive transistors T00-Tmn and pixel electrodes P00-Pmn, and the drive transistors T00-Tmn are connected to the scanning lines S0-Sm arranged in a row direction, and to the data lines D0-Dn arranged in a column direction respectively. Outside the display area 11, the scanning line drive circuit 12 for driving the scanning lines and the data line drive circuit 13 for driving the data lines are disposed.

Figure 2:
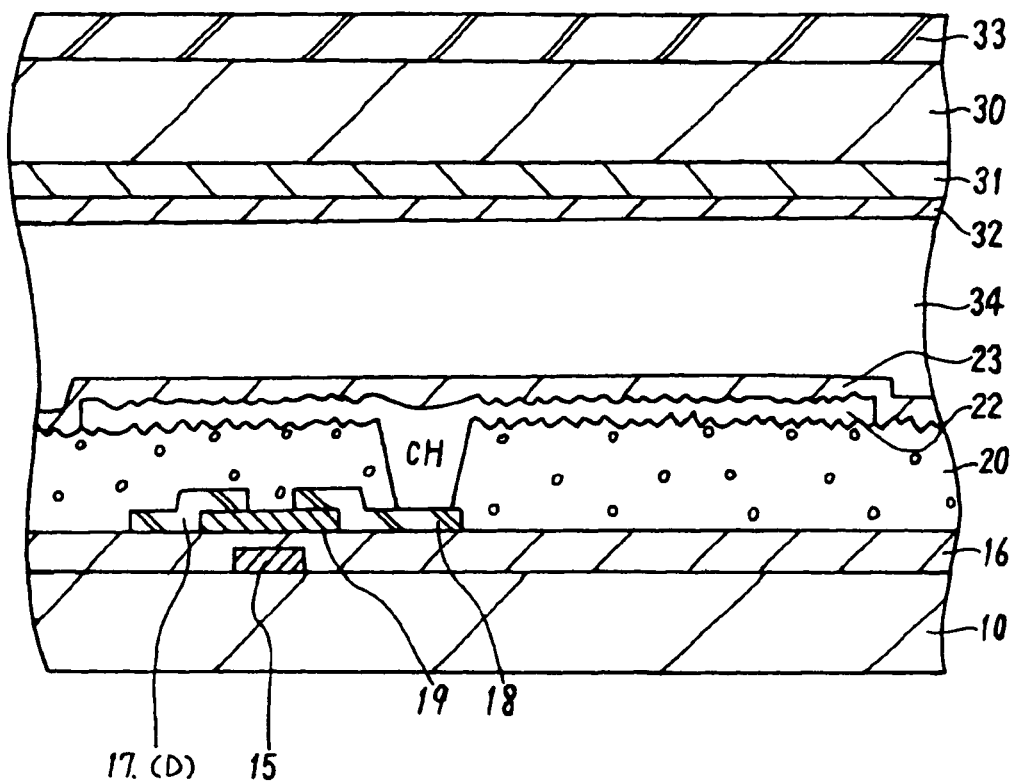
FIG. 2 is a diagram depicting an example of a cross-sectional view of a reflection type liquid crystal display device to which the present embodiment is applied.

FIG. 2 is a diagram depicting an example of a cross-sectional view of a reflection type liquid crystal display device to which the present embodiment is applied. The structure of the reflection type liquid crystal display device is that the liquid crystal layer 34 is disposed between the insulation substrate 10 at the rear face side and the transparent substrate 30 at the display side, where the reflection electrode 22 is formed on the insulation substrate 10 at the rear face side, and external light entered from the display side is reflected on the surface of the reflection electrode 22, transmits the liquid crystal layer 34 and is emitted to the display side again.

On the insulation substrate 10, the gate electrode 15 to be connected to the scanning line, which is not illustrated, the insulation layer 16, the semiconductor layer 19, and the drain electrode 17 and the source electrode 18 to be connected to the data line, are formed. Also on the resin layer 20 of the inter-layer insulation film, the reflection electrode 22, which is the pixel electrode, is formed, and the reflection electrode 22 is connected to the source electrode 18 via the contact hole CH. On the resin layer 20 and the reflection electrode 22, the alignment film 23, comprised of polyimide, is formed. At the surface of the resin layer 22, random undulation to irregularly reflect incident light, are formed, and random undulation is also formed on the surface of the pixel electrode (reflection electrode) 22, which is deposited thereon.

On the entire surface of the transparent substrate 30 at the display side, the transparent electrode 31 comprised of ITO (material which main component is indium oxide) and the alignment film 32, are formed on one side and the polarizer 33 on the other. The liquid crystal layer 34 is inserted between the alignment film 32 at the display side and the alignment film 23 at the rear face side. The alignment direction of the liquid crystal molecules of the liquid crystal layer 34 depends on the surface shape of the alignment films 32 and 23, and on the characteristics thereof.

[Method of Forming Micro-Grooves]

FIG. 3 shows cross-sectional views depicting a part of the manufacturing process of a reflection type liquid crystal display device according to the present embodiment. FIG. 3 shows a part of the source electrode 18 of the thin film transistor shown in FIG. 2. As FIG. 3A shows, after forming the insulation layer 16, each electrode of the thin film transistor, and the semi-conductive layer on the insulation substrate 10, and the photo-sensitive resin 20, such as LC-200 (novolak resin), which is a general purpose resist made by Shipley Co., is coated. The resin layer 20 is spin coated by a spinner to be about a 0.5-4.0 µm in film thickness. The spin coating method in this case involves, for example, forming resist layer by 2 steps for a 3 second spin coating at a rotation frequency of about 350 rpm, and a 20 second spin coating at a rotation frequency of about 800 rpm.

The film thickness of the resin layer 20 influences roughness (height difference and pitch length) of the undulation of the micro-grooves formed on the surface, so an appropriate film thickness is selected. As mentioned later, as the film thickness of the photo-sensitive resin layer 20 increases, the undulation become rougher (large height difference, large pitch length), and as the film thickness decreases, the undulation become finer (small height difference, small pitch length).

Then pre-bake processing is performed for 30 minutes at about a 90° C. temperature. In this pre-bake processing, temperature is not so high that resist does not react, and only the solvent is eliminated. This prevents the later mentioned sagging of the resist layer by heat during the post-bake process.

As FIG. 3B shows, a known stepper exposure processing and development processing are executed using the mask substrate 40 to form a contact hole of the display electrode. As a result, the contact hole CH is formed on the source electrode 18 of the resin layer 20.

After forming the contact hole CH, post-bake processing is performed on the photo-sensitive resin layer 20. Post-bake processing is, for example, a heat treatment at 120° C. for 40 minutes, aiming at sufficiently eliminating the solvent of the photo-sensitive resin. The temperature of the post-bake processing must be lower than the temperature at which the sensitizing agent of the photo-sensitive resin reacts (e.g. about 200° C.), so that the sensitizing agent does not react during the post-bake processing. The temperature of the post-bake processing must also be lower than the glass-transition temperature (e.g. about 160° C.) so that the resin does not harden.

As the temperature of the post-bake processing increases and the time thereof increases, the amount of residual solvent decreases and the undulation of the micro-grooves become finer, and as the temperature decreases and the time increases, the undulation of the micro-grooves become rougher. Therefore the conditions of the post-bake processing are selected so as to form the optimum shapes of the micro-grooves. Then, as FIG. 3C shows, a light having energy sufficiently high enough to sensitize the resin, a deep-ultraviolet radiation (DUV) with a wavelength of $\lambda=360$ nm or less, for example, is irradiated on the entire surface of the photo-sensitive resin layer 20, with an energy of about 2600 mJ/cm$^2$. By this DUV irradiation, the sensitizing agent reacts and novolak resin cross-links from the surface part of the photo-sensitive resin layer 20 (front face side in the film thickness direction), and the upper layer part of the resin layer is altered. As a result, the front face side and the rear face side of the resin layer 20 become substances having different thermal deformation characteristics. This DUV irradiation is performed using a UV irradiation system made by ORC, for example.

The energy of the UV irradiation also influences the shape of the micro-grooves. If the energy is too low, micro-grooves are not formed, but if energy exceeding a certain threshold is irradiated, micro-grooves are formed. In this case, as the irradiation energy (energy per unit time×irradiation time) decreases, the micro-grooves become finer, and as the irradiation energy increases, the micro-grooves become rougher. Therefore the amount of irradiation energy is also selected according to the optimum shape of the micro-grooves.

Then, as FIG. 3D shows, a final bake is performed on the resist 20. This heat treatment is performed at a 200° C. temperature for about 40 minutes, for example. The temperature of the heat treatment in the final bake must be higher than the temperature during the heat processing (post-bake) before UV irradiation. And by performing the heat processing in the final bake, the random micro-grooves MG are formed, as illustrated, on the surface of the resin layer 20.

The heat treatment temperature of the final bake must be equal to or higher than a temperature for post-bake, and preferably is sufficiently higher than the baking temperature of the alignment film in the later heat treatment process, so that the resin layer 20 sufficiently hardens.

Then, as FIG. 2 shows, aluminum is grown to about 2000 Å by a sputtering method or by a heating deposition method, and the pixel electrode 22 is formed by patterning by a known photo-lithography method. As a result, random undulation is formed on the surface of the pixel electrode 22, and functions as a reflection electrode for scattering and reflecting lights. And on the entire surface thereon, the alignment film 23 comprised of about 1000 Å polyimide, for example, is formed by spin coating and baking (about 180° C.). Undulation is formed also on the surface of this alignment film 23, and the alignment direction of liquid crystal molecules of the liquid crystal layer 34 to be inserted thereon aligns according to the groove direction of the undulation.

The reason why micro-grooves are formed is not yet certain, but according to the knowledge of the inventors, the surface part of the resin layer 20 is altered by DUV irradiation, the front face side and the rear face side of the resin layer 20 are thermally altered differently during the heat treatment of the final bake, and micro-grooves or micro-wrinkles are formed on the surface by the stress between the top layer and the bottom layer of the resin layer 20. For example, micro-grooves are formed on the front face side by the shrinkage of the rear face side of the resin layer 20. This is caused by the difference in the cross-link reaction level of the resin in the thickness direction of the resin layer due to UV irradiation.

According to an experiment of the inventors, they confirmed that the micro-grooves formed in this way have the random undulation required for an irregular reflection of the external light which enters.

UV irradiation in the above mentioned process may be performed only on a part of an area of the resin layer 20 in the plane direction using a predetermined mask pattern, instead of on the entire surface of the resin layer 20. As a result, the resin layer 20 is partially altered in the plane direction, and the distribution of thermal deformation characteristics is formed in the plane direction. By such a distribution of thermal deformation characteristics in the horizontal direction, similar micro-grooves are formed in the heat treatment in the final bake.

Also, instead of UV irradiation in the above process, wet processing by one of an acid solution, alkali solution, quaternary ammonium salt solution or HMDS chemicals can be used. By dipping the photo-sensitive resin layer into such chemicals, a chemical reaction is caused on the surface of the photo-sensitive resin layer, and the resin layer can be altered to a substance having different thermal deformation characteristics.

In the present embodiment, the roughness of micro-grooves is controlled by the film thickness of the resin layer 20 and the UV irradiation energy. FIG. 4 to FIG. 7 are micro-photographs (about X 20) of the surface shapes of the micro-grooves which were formed by changing the film thickness of the photo-sensitive resin layer 20 and the UV irradiation energy. Samples of the reflection panel of the micro-photographs were prototypes fabricated by the following process.

Resist (e.g. general purpose resist LC-200 made by Shipley Co.) was formed on the panel by a spin coating method (coated by two steps, for 3 seconds at 350 rpm, and for 20 seconds at 800 rpm), the panel was pre-baked for 30 minutes at 90° C., then the entire surface of the panel was exposed and developed to the desired film thickness (2.0 µm, 1.7 µm, 1.4 µm, 1.0 µm). And after a post-bake for 40 minutes at 120° C., DUV irradiation at a desired energy (5200 mJ/cm$^2$, 3900 mJ/cm$^2$, 2600 mJ/cm$^2$, 1300 mJ/cm$^2$, 0 mJ/cm$^2$) was performed, and a final bake for 40 minutes at 200° C. was performed. Finally, aluminum was formed to be about 2000 Å as the reflection film on the resist film by a deposition method.

Figure 4:
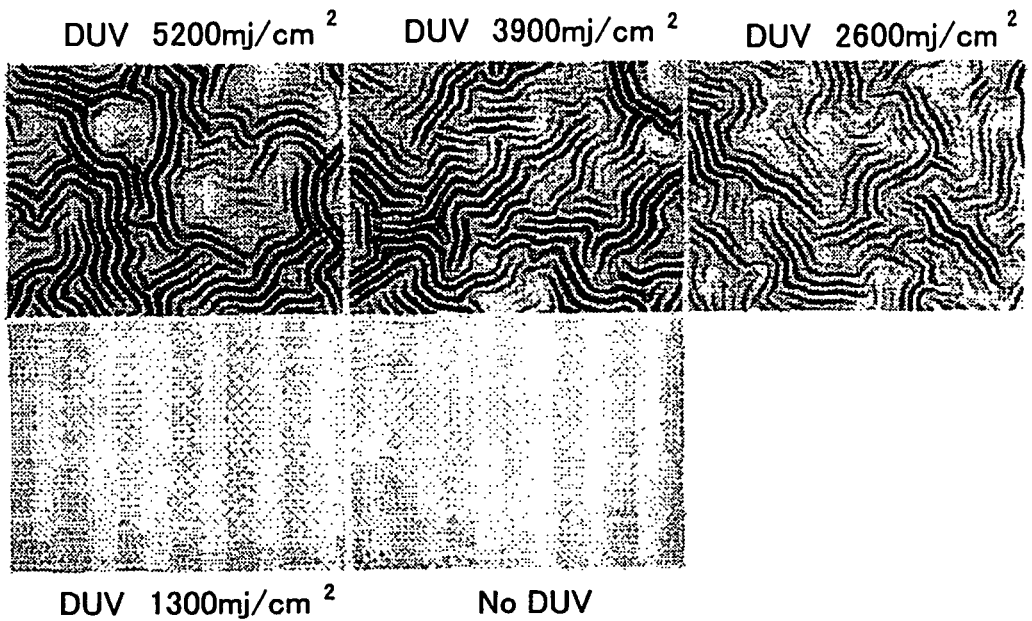
FIG. 4 is a micro-photograph of the surface shape of the micro-grooves of a reflection panel which is created by changing the film thickness of the photo-sensitive resin layer 20 and the UV irradiation energy.

FIG. 4 shows micro-photographs of five samples when the film thickness of the photo-sensitive resin layer 20 is 2.0 µm and the UV irradiation energy is 5200 mJ/cm$^2$, 3900 mJ/cm$^2$, 2600 mJ/cm$^2$, 1300 mJ/cm$^2$ and zero. When the UV irradiation is not performed or when the irradiation energy is as low as 1300 mJ/cm$^2$, micro-grooves are not formed on the surface of the resin layer. However, when the irradiation energy is higher than 1300 mJ/cm$^2$, micro-grooves are formed on the surface of the resin layer. In this case, the height difference and the pitch length (roughness) of the micro-grooves are rougher (larger height length, larger pitch length) as the UV irradiation energy increases, and are finer (smaller height length, smaller pitch length) as the irradiation energy decreases.

The shapes of the micro-grooves formed on the surface of the resin layer 20 are random. As the photos show, in terms of shapes, at least two of a gentle curved shape, a sharp angle winding shape, a closed loop shape and a Y shaped branching shape coexist. The micro-grooves of the present embodiment have shapes which cannot be obtained by undulation generated by a conventional lithography processing using an artificially created predetermined mask pattern.

By controlling the roughness of the micro-grooves, average inclination angles and inclination angle distribution of the undulation can be appropriately controlled.

Figure 5:
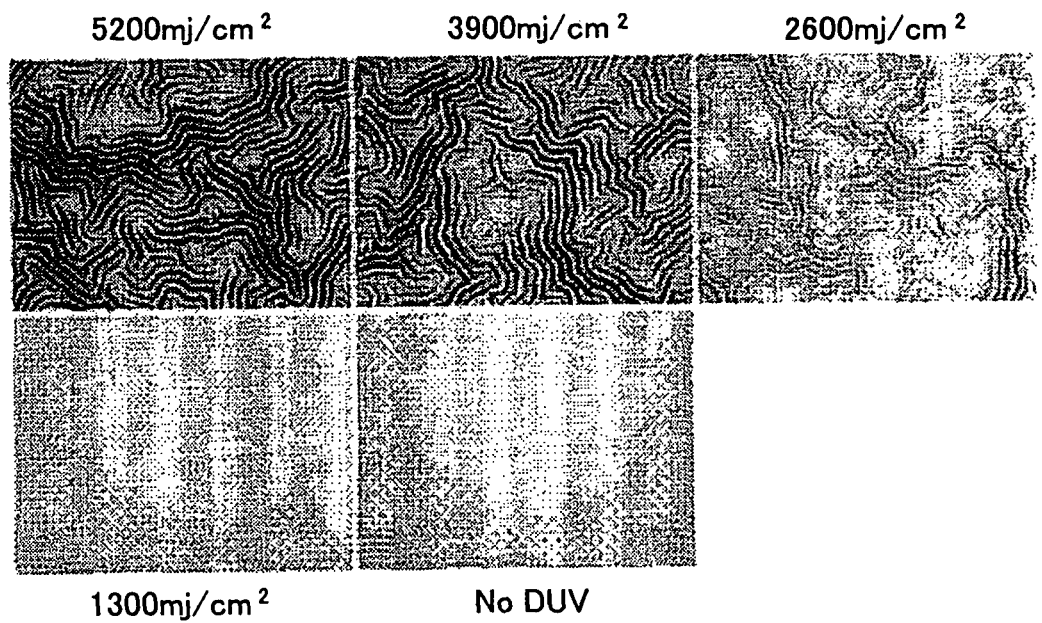
FIG. 5 is a micro-photograph of the surface shape of the micro-grooves of a reflection panel which is created by changing the film thickness of the photo-sensitive resin layer 20 and the UV irradiation energy.

FIG. 5 shows micro-photographs of five samples when the film thickness of the photo-sensitive resin layer 20 is 1.7 µm and the UV irradiation energy is 5200 mJ/cm$^2$, 3900 mJ/cm$^2$, 2600 mJ/cm$^2$, 1300 mJ/cm$^2$ and zero. Since the thickness of the resist layer is smaller than the samples in FIG. 4, the micro-grooves which are formed are finer. Micro-grooves are not formed when the UV irradiation energy is too low, which is the same as the samples in FIG. 4.

Figure 6:
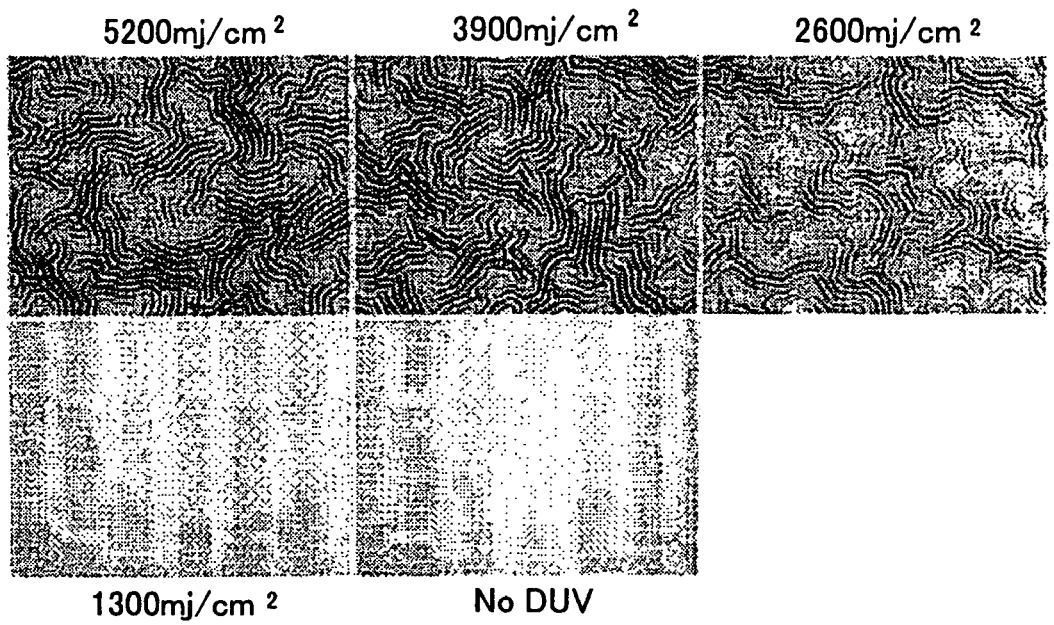
FIG. 6 is a micro-photograph of the surface shape of the micro-grooves of a reflection panel which is created by changing the film thickness of the photo-sensitive resin layer 20 and the UV irradiation energy.

FIG. 6 shows micro-photographs of five samples when the film thickness of the photo-sensitive resin layer 20 is 1.4 µm and the UV irradiation energy is 5200 mJ/cm$^2$, 3900 mJ/cm$^2$, 2600 mJ/cm$^2$, 1300 mJ/cm$^2$ and zero. In this case, micro-grooves are even finer.

Figure 7:
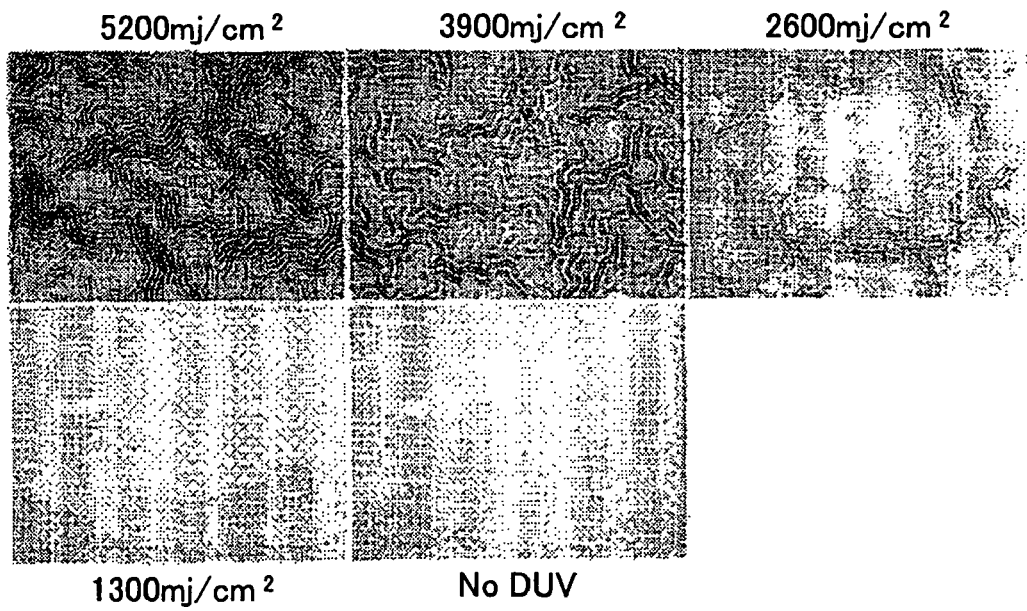
FIG. 7 is a micro-photograph of the surface shape of the micro-grooves of a reflection panel which is created by changing the film thickness of the photo-sensitive resin layer 20 and the UV irradiation energy.

FIG. 7 shows micro-photographs of five samples when the film thickness of the photo-sensitive resin layer 20 is 1.0 µm, and the UV irradiation energy is 5200 mJ/cm$^2$, 3900 mJ/cm$^2$, 2600 mJ/cm$^2$, 1300 mJ/cm$^2$ and zero. In this case, the micro-grooves are even finer, but the formation of micro-grooves are not sufficient even with a UV irradiation energy of 2600 mJ/cm$^2$.

As the above photographs of the surfaces of twenty samples clearly show, bump shapes become finer as the UV irradiation energy-decreases. Also micro-grooves are not formed unless an irradiation energy at a predetermined reference value or more is provided. The bump shape of micro-grooves also depends on-resist film thickness after final baking, and as the film thickness decreases, the bump shape of the micro-grooves becomes finer.

FIG. 8 shows AFM images of three reflection panel samples. These samples are the same as the above mentioned reflection panel samples where the UV irradiation energy is a constant 5200 mJ/cm$^2$, the resist film thickness is 1.7 µm, 1.4 µm and 1.0 µm, and a 2000 Å aluminum reflection film is formed on the resist layer.

Figure 8A:
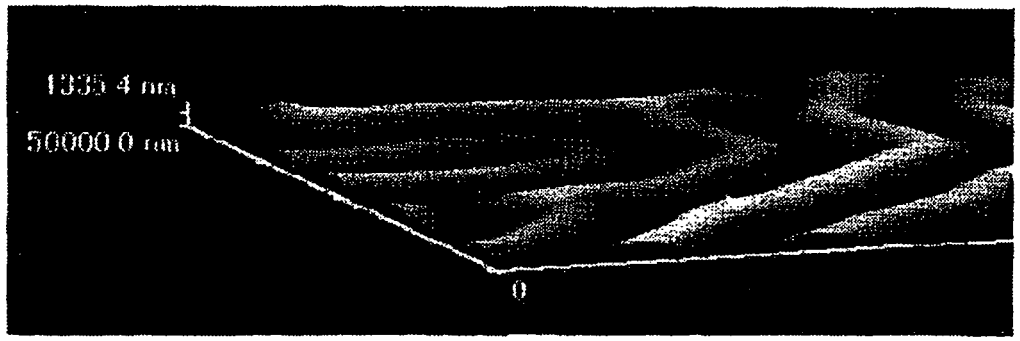
FIGS. 8A-8C show diagrams depicting AFM images of the three reflection panel samples.

As FIG. 8A shows, in the case of the sample where the film thickness of the resist film, which is the photo-sensitive resin layer, is 1.7 µm, the shape of the micro-grooves on the surface is rough, where the height difference of the undulation is 1.3 µm, and the average inclination angle thereof is 13°.

Figure 8B:
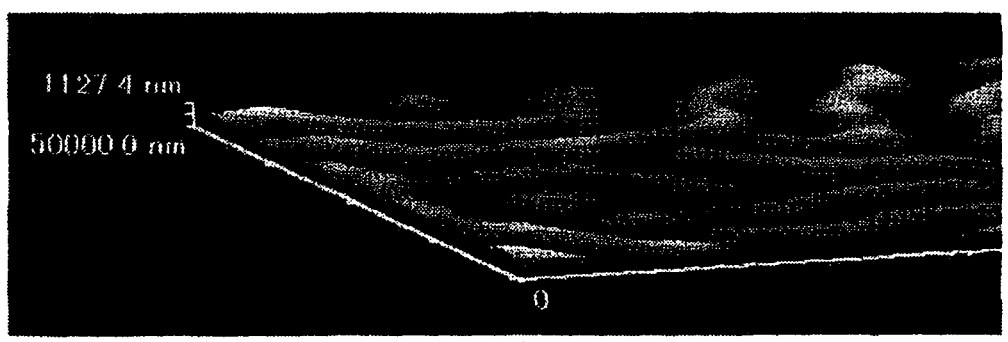

As FIG. 8B shows, in the case of the sample where the film thickness of the resist film, which is the photo-sensitive resin layer, is 1.4 µm, the shape of the micro-grooves on the surface is somewhat finer, where the height difference of the undulation is 1.1 µm, and the average inclination angle thereof is 11°.

Figure 8C:
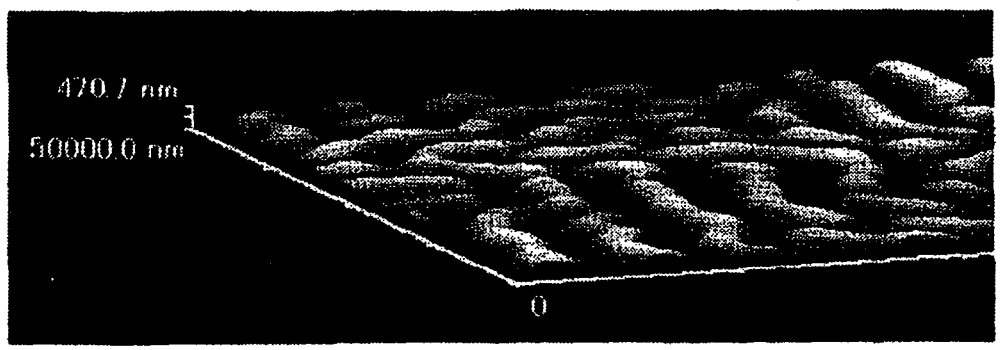

As FIG. 8C shows, in the case of the sample where the film thickness of the resist film, which is the photo-sensitive resin layer, is 1.0 µm, the shape of the micro-grooves on the surface is even finer, where the height difference of the undulation is 0.5 µm, and the average inclination angle thereof is 8°.

As the observation result in FIG. 8 clearly shows, the average inclination angle of the undulation changes depending on the size of the shape of the micro-grooves. In other words, as the thickness of the resist film decreases, the height difference and the average inclination angles of the undulation decreases. Therefore, according to the manufacturing process of the present embodiment, the average inclination angle can be controlled. The average inclination angle is an important factor for increasing the reflectance of the reflection panel. Therefore in terms of practicality, it is significant that the average inclination angle can be controlled by the manufacturing process of the present embodiment.

Figure 9:
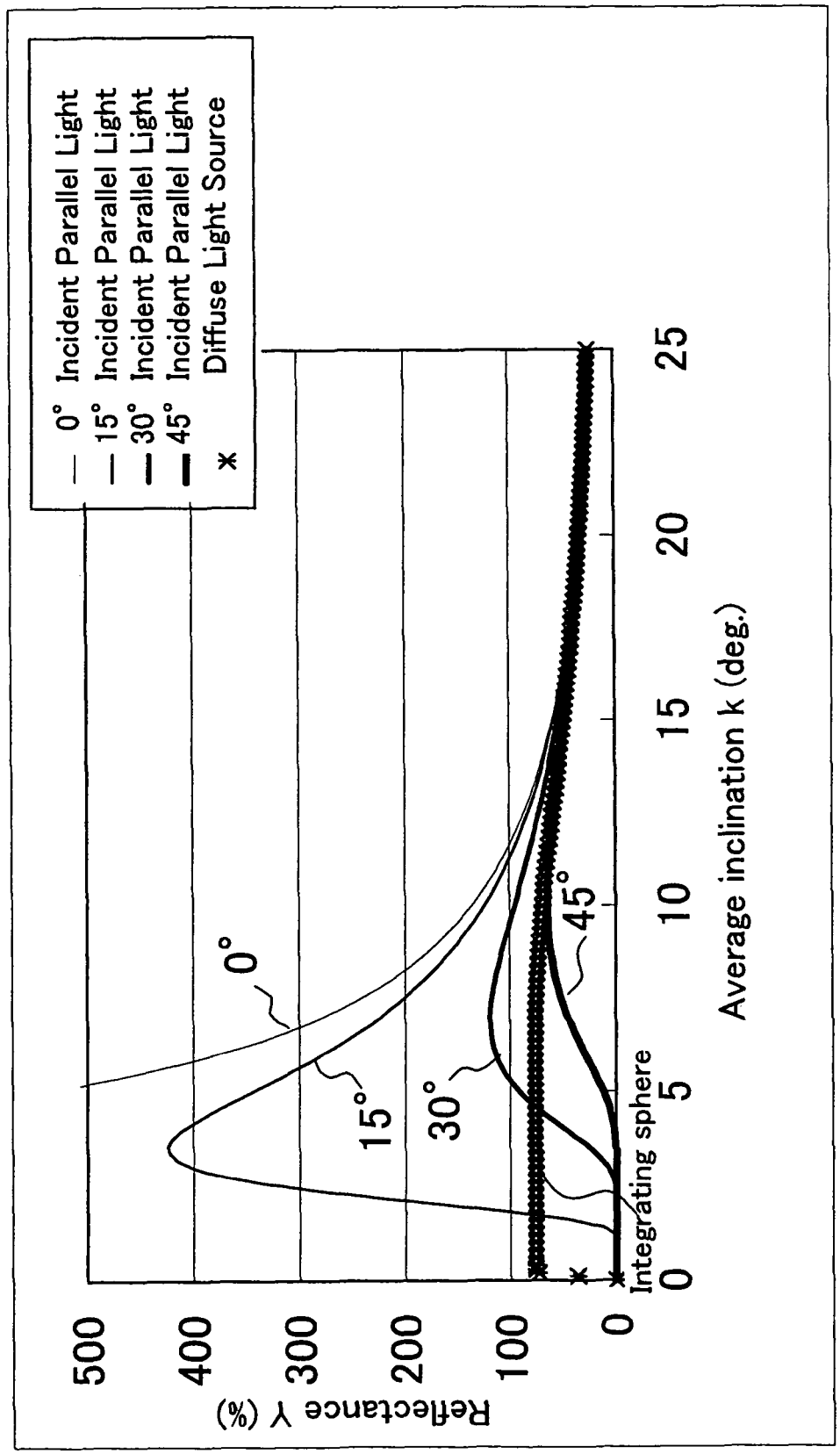
FIG. 9 is a graph depicting the relationship between the average inclination angle of the reflection film and the reflectance with respect to the diffuse light source.

FIG. 9 is a graph depicting the relationship between the average inclination angle of the reflection film and reflectance with respect to the parallel light source and the diffuse light source. FIG. 9 shows that the reflectance Y depends on the average inclination angle k of the undulation of the reflection film with respect to five types light sources which light enters the reflection panel, having incident angles to the reflection panel of 0°, 15°, 30°, 45° and an integrating sphere having incident angel distribution of 0° to ±90° range. This dependency is given by the later mentioned theoretical formula. The inclination angle distribution of the undulation is a normal distribution, and the average inclination angle of this normal distribution is theoretically set.

As the theoretical values in FIG. 9 show, when the average inclination angle exceeds 15°, the reflectance of the reflected light reflected by the reflection film drops, since the angle of the reflected light at the boundary of the liquid crystal and the glass substrate at the front surface side of the reflection panel and the glass substrate exceeds the critical angle more frequently. When the incident angle is 0° or 15°, on the other hand, the reflectance increases as the average inclination angle becomes lower than 5°, but a display is not often used in an environment where the incident angle is 0° or 15°. Therefore according to the theoretical values in FIG. 9, reflection films of 15° or less, preferably 8°-15° of the average inclination angle, have a relatively high reflectance with respect to any incident light.

For all three samples shown in FIG. 8, the average inclination angle is in a 8°-13° range. Therefore it is clear that the average inclination angle can be controlled in a range of high reflectance by using the manufacturing process of the present embodiment.

Figure 10:
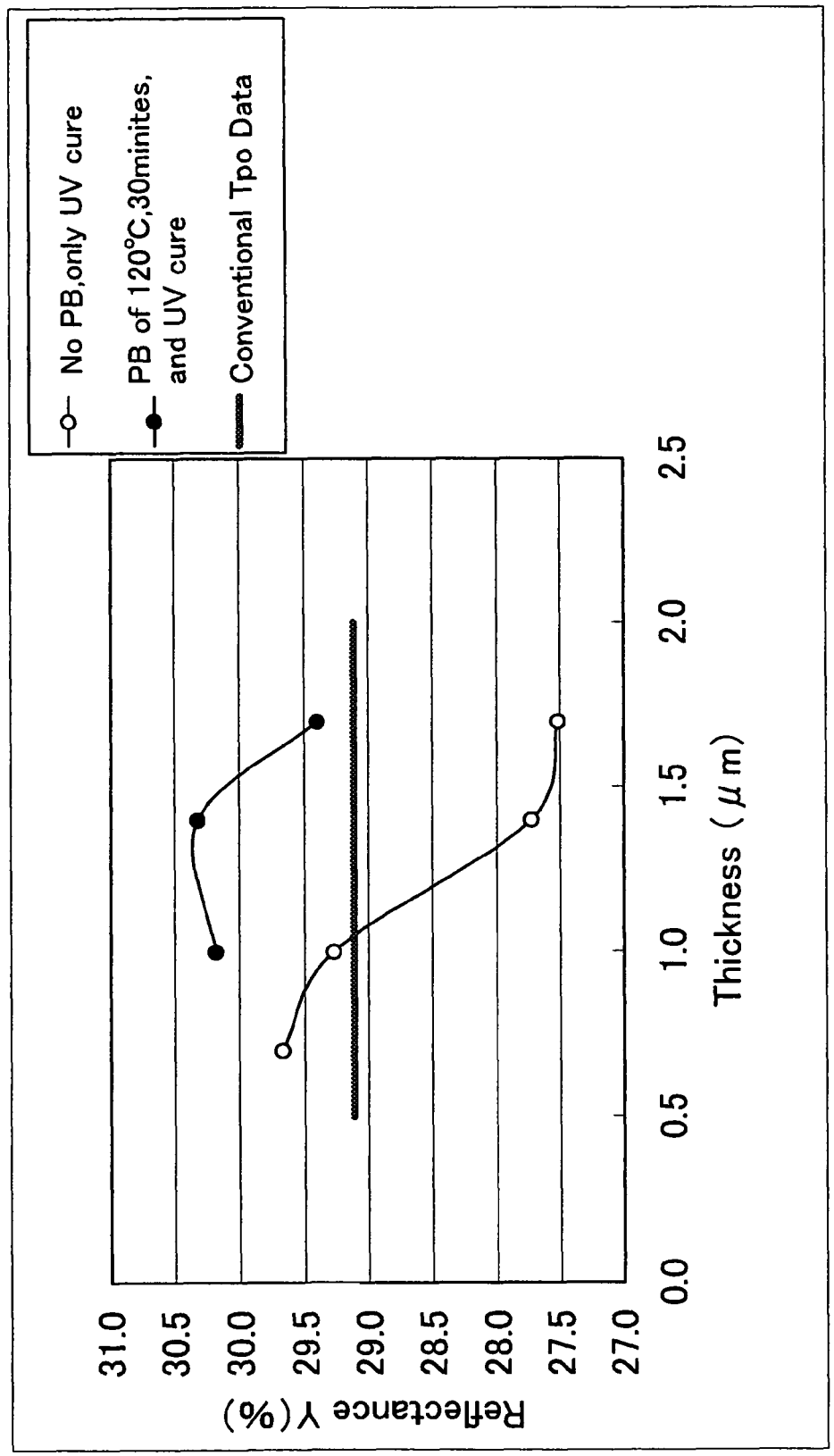
FIG. 10 is a graph depicting the relationship between the resist film thickness and the reflectance of the three samples in FIG. 8.

FIG. 10 is a graph depicting the relationship between resist film thickness and the reflectance of the three samples in FIG. 8 when a post-bake is performed (black dots), and when post-bake is not performed (white dots). The diffused light in this case is by an integrating sphere. As described for the three samples in FIG. 8, when a post-bake is performed, all samples with resist film thickness 1.7 μm, 1.4 μm and 1.0 μm, according to the present embodiment, have high reflectance compared to the top data of reflectance when undulation is formed by a conventional process. In other words, as the theoretical values in FIG. 9 show, the samples formed to have the average inclination angle in an 8°-15° range has a higher reflectance than the top data of prior art.

For the sample shown by white dots in FIG. 10, for which a post-bake was not performed, reflectance is lower than the conventional top data in the area where the resist film thickness is thick, but is higher in the area where the resist film thickness is thin. This experiment result shows that post-bake processing is important to increase reflectance. This is probably because when a post-bake is not performed, considerable solvent remains in the resist film after exposure and development, and this residual solvent is degassed in the final bake process after UV irradiation, and defects are generated on the bump surface.

It is also considered that the temperature of the final bake must be set higher than the baking temperature of alignment film formation thereafter. In other words, it is considered that completely removing the solvent in the resist layer in the final bake process is necessary so that the degassing phenomena does not occur in the heat treatment thereafter, according to the result of the samples which were not subject to post bake in FIG. 10.

Figure 11A:
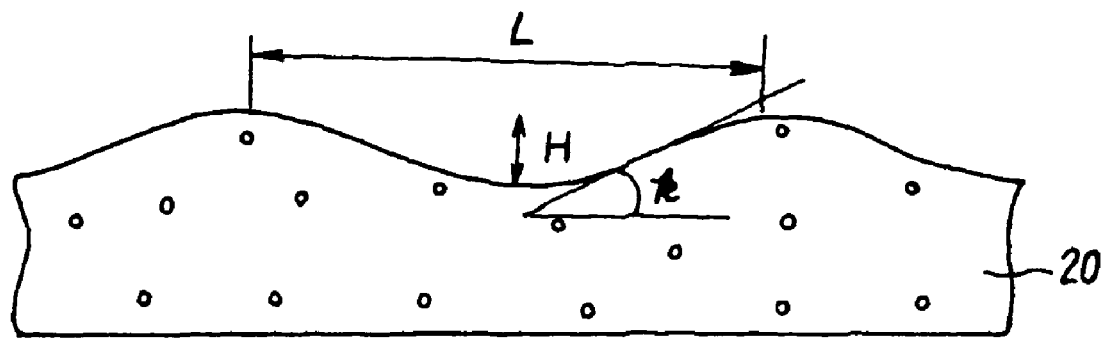
FIGS. 11A-11B show diagrams depicting the bump shapes of the micro-grooves of the resin layer formed by the present embodiment.
Figure 11B:
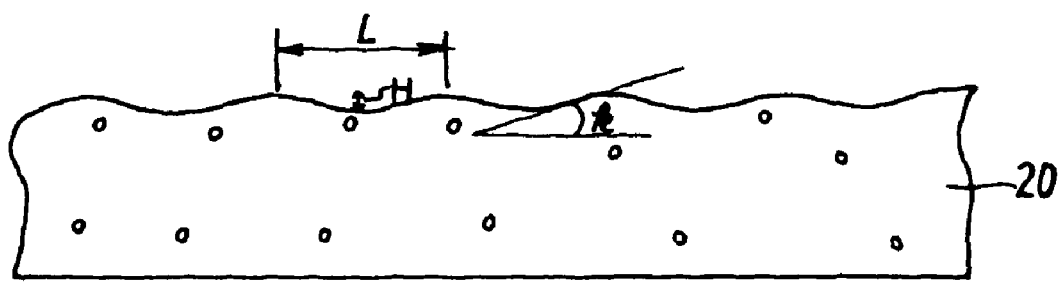
Figure 12A:
FIGS. 12A-12D show diagrams depicting examples of the plane pattern of the micro-groove formed by the present embodiment.
Figure 12B:
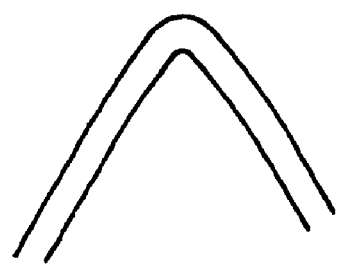
Figure 12C:
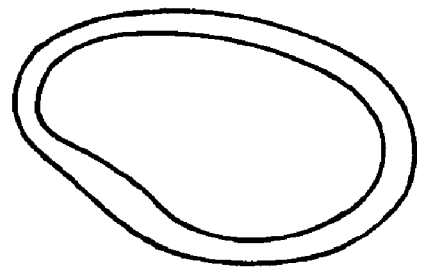
Figure 12D:
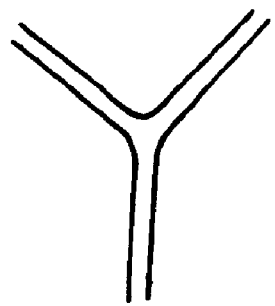

FIG. 11 shows diagrams depicting the bump forms of the micro-grooves of the resin layer formed by the present embodiment. When the undulation is rough, as shown in FIG. 11A, the waviness of the surface of the resin layer 20 is large, the pitch length L is long, and the height difference H of the undulation is large. As a result, the inclination angle k tends to be large. When the undulation is fine, as shown in FIG. 11B, the waviness of the surface of the resin layer 20 is small, the pitch length L is short, and the height difference H of the undulation is small. As a result, the inclination angle k tends to be small.

FIG. 12 shows diagrams depicting examples of the plane pattern of the micro-grooves formed by the present embodiment. As mentioned above, according to the present embodiment, the micro-grooves where the curved pattern in FIG. 12A, the bent pattern in FIG. 12B, the looped pattern in FIG. 12C and the branched pattern in FIG. 12D are mixed, are formed on the surface of the resin film.

Figure 13A:
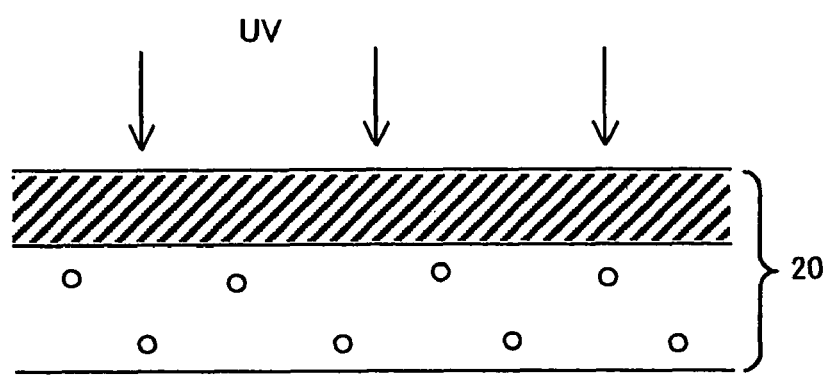
FIGS. 13A-13B show diagrams depicting examples of the UV irradiation required to form micro-grooves.

FIG. 13 shows diagrams depicting examples of the UV irradiation required to form micro-grooves. FIG. 13A is the case when UV is irradiated on the entire surface of the resin layer 20, and in this case the shaded area, which has a predetermined depth from the surface in the depth direction, is altered by the sensitizing reaction by the UV irradiation. Therefore the micro-grooves are formed on the surface by the heat treatment of the final bake thereafter, because thermal stress is caused by the difference of the thermal deformation characteristics between the altered layer and the unaltered layer and the stress influences the surface.

Figure 13B:
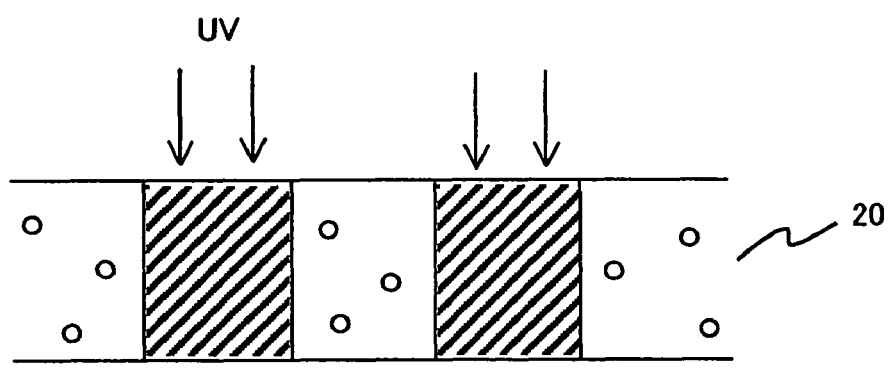

In the case of FIG. 13B, on the other hand, the shaded area is altered by UV irradiation using a mask on the resin layer 20. As a result, an altered layer and an unaltered layer are distributed in traverse directions. Therefore micro-grooves are formed on the surface by the heat treatment of the final bake thereafter, because thermal stress is formed by the difference of the thermal deformation characteristics between the altered layer and the unaltered layer and the stress influences the surface. Micro-grooves are formed on the surface of the resin layer in all methods, but the process in FIG. 13A has an advantage, because a mask is not required for the UV irradiation process.

The present inventors compared cases when the UV irradiation and the final bake of the present embodiment are performed in a conventional bump formation process by half exposure using a mask. (1) A first sample where undulation is formed on the surface by half exposure, and UV is irradiated and a final bake is performed, (2) a second sample where UV is irradiated and a final bake is performed without executing half exposure, and (3) a third sample where undulation is formed by a conventional half exposure and UV irradiation is not performed, were prototyped, and the respective reflectances were compared.

The manufacturing process of the second sample was described above referring to FIG. 3. Therefore the manufacturing processes of the first sample and the third sample will now be described. FIG. 14 shows cross-sectional views depicting the manufacturing process of the first sample. For the first sample, the above mentioned resist film 20 is coated on the substrate 10 by spin coating, and is then pre-baked. As FIG. 14A shows, the resist film 20 is half-exposed using a mask 42 having a predetermined pattern. Half exposure is an exposure with an energy weak enough not to sensitize all of the resist film 20 in the film thickness direction. Then development is performed thereafter, and the concave parts of the pattern shape of the mask 42 are formed on the surface of the resist film, as shown in FIG. 14B.

For the first sample, UV irradiation (e.g. 5200 mJ/cm$^2$) of the present embodiment is performed on the entire surface after post-baking, so that the surface is altered. And after the above mentioned final bake is executed, micro-grooves are formed on the surface of the resist film 20 by the bumpy waviness corresponding to the pattern by half exposure, UV irradiation and post bake, as shown in FIG. 14C.

For the third sample, after the development process in FIG. 14B, UV is irradiated on the entire surface at an energy low enough not to form micro-grooves (e.g. 1300 mJ/cm$^2$). When the final bake is performed thereafter, undulation, where micro-grooves are not formed, are generated on the surface, as shown in FIG. 14C. By the above UV irradiation at the above mentioned low energy, only the very surface of the resist film 20 is altered, so that a flattening of the undulation of the resist film by sagging during the heating process of the final bake can be prevented. Since the UV irradiation energy is low, micro-grooves are not formed.

Figure 15:
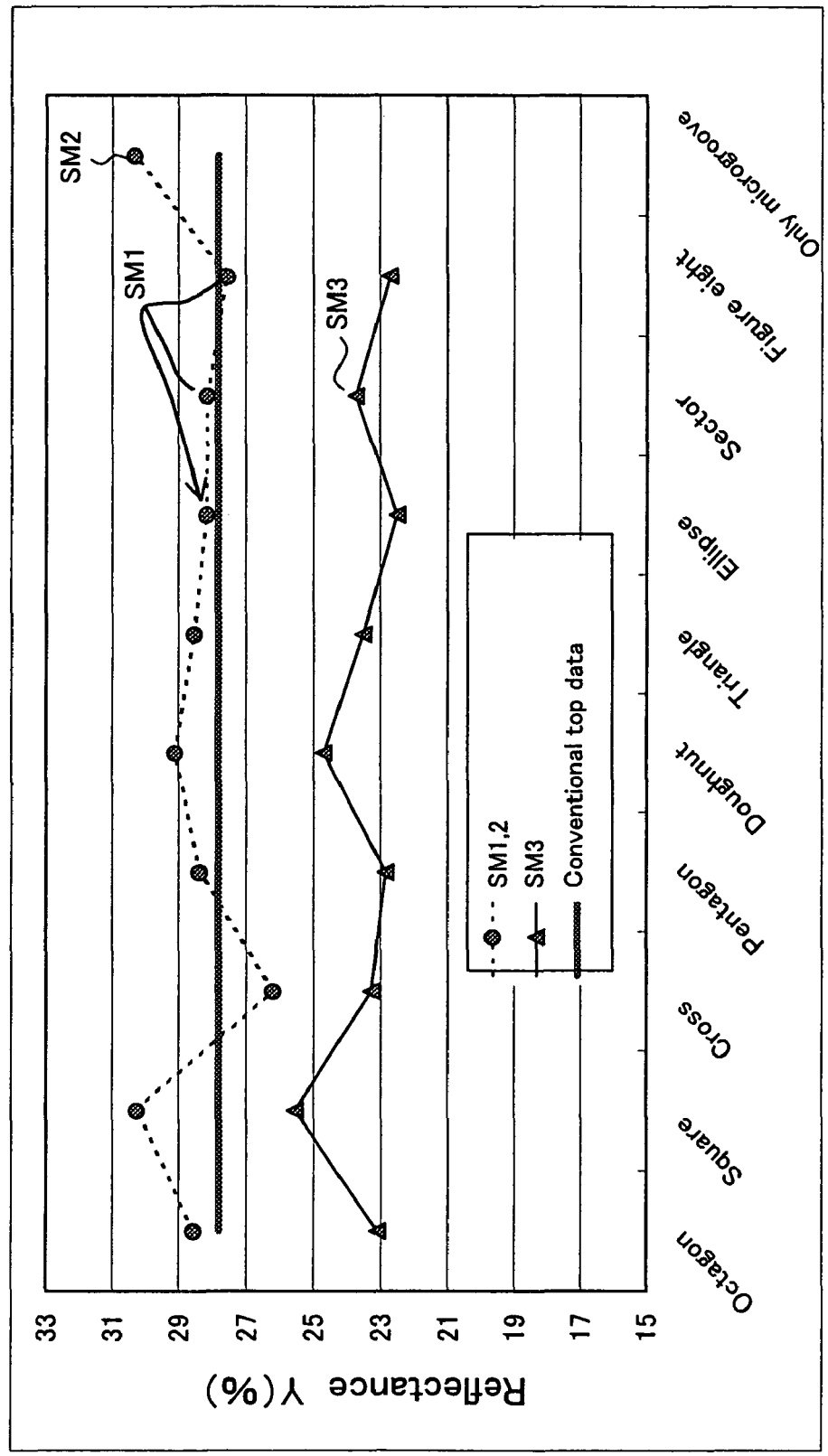
FIG. 15 is a graph comparing the reflectance of the diffuse light source of an integrating sphere on the first, second and third samples.

FIG. 15 is a graph comparing reflectance when the diffuse light source of the integrating sphere is irradiated on the first, second and third samples which are formed by the above process. In FIG. 15, the first sample SM1 includes samples which are half-exposed with a plurality of types of pattern shapes (octagon, square, cross, pentagon, doughnut, triangle, ellipse, sector, figure eight). The second sample SM2 uses the area which was not exposed in the half exposure. The third sample SM3 also includes samples which were half-exposed with a plurality of types of pattern shapes, the same as the first sample.

As the comparison example in FIG. 15 shows, when the present embodiment is applied with adding the half exposure process as well, a reflectance higher than the top data of a conventional process may be obtained. However, reflectance is highest when the present invention is applied without executing a half exposure, as shown in the second sample SM2. In the third sample SM3, where undulation is formed only by the half exposure process, reflectance is low in all patterns. In this way the process of UV irradiation and final bake according to the present embodiment, high reflectance can be implemented even if the half exposure process and the development process using a predetermined pattern are added.

It is preferable that the micro-grooves of the present embodiment be formed to be as random undulation as possible. According to the experiment of the present inventors, it was observed that thick grooves or ridges are formed in a long shape at various locations when UV is irradiated on the photo-sensitive resin layer surface, and final bake is executed. In some cases, such undulation is not desirable as an irregular reflection function of the reflection electrodes, since reflection directions concentrate to a certain direction, for example. So a method which can control the direction and length of the micro-grooves to some degree is desirable.

Pixel electrodes are used in the present embodiment as the reflection electrodes. The pixel electrodes are separately formed for each pixel, where voltage is applied independently. Here the present inventors discovered that the thick grooves or ridges which formed in a long shape can be prevented by separating the photo-sensitive resin layer into pixel units or section separation line units, and by doing so micro-grooves with more uniformity can be formed in the pixel electrodes. The photo-sensitive resin layer may be completely separated or be separated by forming grooves with a predetermined depth on the surface, or may be separated by forming the resin layer such that part of the layer is thin. Pixel electrodes, however, are designed such that capacitance with the data line, scanning line and gate electrode come to a predetermined range, so the photo-sensitive layer must be separated within a range which satisfies such conditions.

FIG. 16 shows diagrams depicting the separation of the photo-sensitive resin layer. FIGS. 16A and 16B are plan views of the rear side substrate. As FIG. 16A shows, a data line D and a scanning line S are formed on the surface of the rear face substrate, and semiconductor layer 19 and source/drain electrodes 17 and 18 are formed at the crossing positions. And the area partitioned by the data line D and the scanning line S become the pixel area PX. Therefore as FIG. 16B shows, the contact hole CH for connecting the source electrode 18 and the pixel electrode 22 is formed, and the pixel electrode 22 is separately disposed for each pixel area.

Figure 16A:
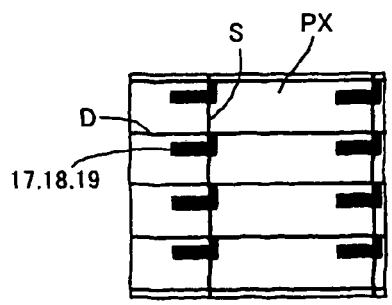
FIGS. 16A-16F show diagrams depicting the separation of the photo-sensitive resin layer.
Figure 16C:
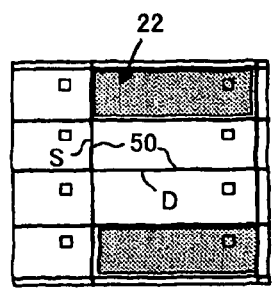
Figure 16E:
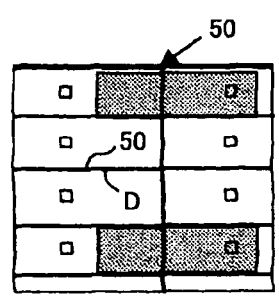
Figure 16B:
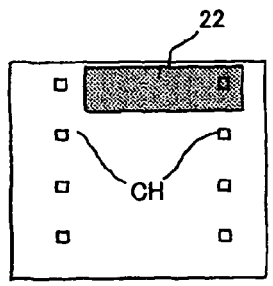
Figure 16D:
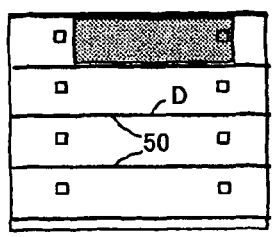
Figure 16F:
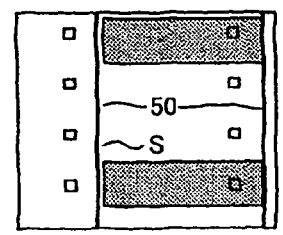

FIG. 16C-16F show examples of separation lines for separating the photo-sensitive resin layer. FIG. 16C is an example when the separation line 50 is formed along the scanning line S and the data line D, where the photo-sensitive resin layer is separated into pixel units. FIG. 16D is an example when the separation line 50 is formed along the data line D, where the photo-sensitive resin layer is separated into data line units. In FIG. 16E, the separation line 50 is formed along the data line D, and the separation line 50 is also formed in a direction perpendicular thereto. In this case, the separation unit of the photo-sensitive resin layer is unrelated to the pixel electrode. FIG. 16F is an example when the separation line 50 is formed along the scanning line S.

FIG. 17 shows cross-sectional views depicting the process of forming separation lines of the photo-sensitive resin layer. FIG. 17A shows a state when the gate electrodes 15, insulation film 16, semiconductor layer 19 and drain/source electrodes 17 and 18 are formed on the insulation substrate 10, then the photo-sensitive resin layer 20, made of resist, is spin coated and is pre-baked. In this state, the exposure process for forming contact holes in the photo-sensitive resin layer 20 is executed. For the exposure mask 51 at this time, a mask pattern, where the area 53, corresponding to the contact hole, completely transmits light, the area 55 corresponding to the separation line partially transmits light, and the other area 54 shields light completely, is formed on the transparent substrate 52. For example, the area 54 is formed by a light shielding film made of chromium, and the area 55 can be formed by a half exposure film comprised of molybdenum silicide. If exposure using such an exposure mask is executed, the position of the contact hole of the photo-sensitive resin layer 20 is completely exposed, and the area corresponding to the separation line is half-exposed.

When the development process is performed thereafter, contact holes CH which penetrate the resin layer are formed on the photo-sensitive layer 20 at positions corresponding to the source electrodes 18, and grooves as separation lines 50, having a predetermined depth, are formed on the surface of the resin layer, as shown in FIG. 17B. Contact holes CH are formed only in narrow areas, and do not have the function of separating the resin layer 20. The separation line 50, however, separates at least the surface of the resin layer 20, so long extended grooves and ridges, generated in the micro-grooves formed by the UV irradiation and final baking processes, can be prevented.

In FIG. 17A, a special exposure mask 51 was used. However the patterning of the resin layer shown in FIG. 17B is also possible by executing normal exposure using a mask to form contact holes, and executing half-exposure using another mask to form a separation line. It is also possible to execute normal exposure using a mask to form a separation line so that the resin layer 20 is completely separated by the separation line 50.

The separation line 50 need not be formed on the front face side of the resin layer 20. The separation line 50 can be formed on the rear face side, for example. In that case, the data line D, formed on the insulation layer 16, may have the function of the separation line 50. This is because the thickness of the resin layer 20 becomes partially thinner at the part where the data line D exists. By this, the formation of micro-grooves is cut off, and the generation of long extended grooves and ridges can be prevented.

As FIG. 17B shows, it is desirable that the separation line 50 is formed in the separated area of the pixel electrodes 22 (indicated by the broken line in FIG. 17B) which are formed on the resin layer 20. Because of this, influence on parasitic capacitance between the pixel electrodes 22, and the gate electrodes 15 or other electrodes, can be minimized.

Figure 18A:
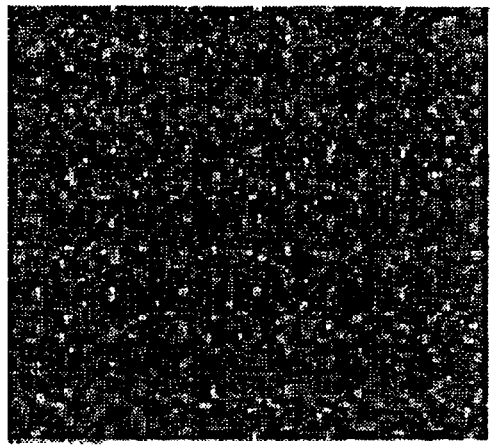
FIGS. 18A-18B show micro-graphs of micro-grooves when separation lines are formed and when not formed.
Figure 18B:
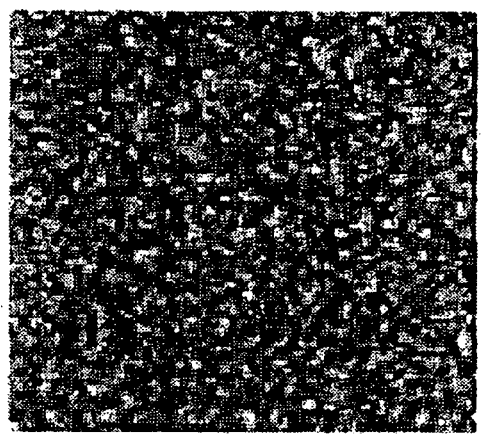

FIG. 18 shows micro-photographs of micro-grooves when a separation line is formed and when not formed. In these examples, a separation line is formed and is not formed on the reflector, which is the same with the samples in FIG. 6 to FIG. 9. FIG. 18A is an example of micro-grooves when a separation line is formed, and FIG. 18B is an example of micro-grooves when a separation line is not formed.

As these micro-photographs show, in the case of example FIG. 18B, where a separation line is not formed, long extended grooves or ridges partially exist, but in the case of example FIG. 18A, where a separation line is formed, such extended grooves or ridges do not exist, and the micro-grooves are more uniform.

For samples of the above embodiment, a general purpose resist, LP200 made by Shipley Co., was used for the photo-sensitive resin layer. It was confirmed that similar micro-grooves are also formed when AFP 750 resist, made by Clariant Japan, instead of the above mentioned photo-sensitive resin, was used.

As described above, according to the present embodiment, micro-grooves with random undulation can be formed on the surface of the photo-sensitive resin layer by a simple process of forming partially altered areas of the photo-sensitive resin layer by UV irradiation, and performing heat treatment thereafter. Also the shape and the direction of the micro-grooves can be controlled relatively easily by various process conditions. Therefore a reflection function, effective for a reflection liquid crystal display device, can be implemented by forming a reflection layer on a resin layer which has such micro-grooves. By using pixel electrodes for the reflection layer, an even simpler reflection liquid crystal display device can be implemented.

[Modified Process of Micro-Grooves 1]

The main point of the present embodiment is to adjust the distribution of the thermal deformation characteristics of photo-sensitive resin when forming micro-grooves, so as to control the shape of the undulation of the photo-sensitive resin as desired.

Specifically, the preferred methods are a method of adjusting the irradiation energy to be exposed on the photo-sensitive resin, a method of using an arbitrary mask pattern at this time, a method of setting at least one of the number, shape and arrangement of the composing elements provided on a TFT substrate to a desired value using the composing elements (e.g. gate electrode, CF electrode, pixel electrode, contact hole) when at least one of the composing elements is formed, and a method of forming an undulation pattern on the substrate by selectively etching the surface of the substrate, and, using these methods, the distribution of the thermal deformation characteristics of the resin layer is adjusted, and the undulation shape of the resin layer is controlled.

Here an example of a method of adjusting the irradiation energy when the photo-sensitive resin is exposed will be shown first. FIG. 57 shows a conventional manufacturing process and the manufacturing process of the present invention of the undulation or bump formation method respectively.

In a conventional formation process as shown at left hand side of FIG. 57, resist 123, which is resin for protrusion formation, is coated on the TFT substrate 122 where TFT element 121 is formed, then the protrusions 124 are formed by photo-lithography, as shown in FIG. 57A to 57E. Then the average inclination angles of the undulation 125 are optimized by forming flattening resin 125, the contact hole CH is formed by photo-lithography, and the reflection electrode 126 comprised of Al is formed. In this way, a resin formation process and photo-lithography are conventionally required twice respectively, as shown in FIG. 58A.

Figure 57A:
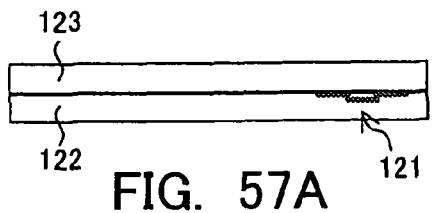
FIGS. 57A-57H show cross-sectional views depicting a conventional manufacturing process and the manufacturing process of the present invention of the bump formation method.
Figure 57F:
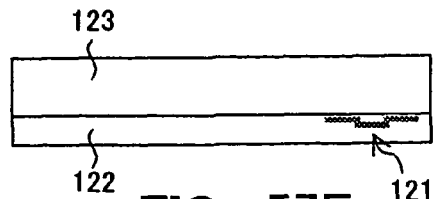
Figure 57B:
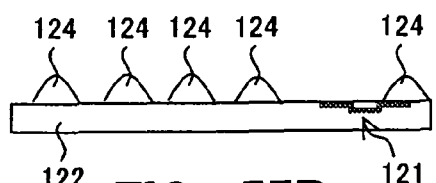
Figure 57C:
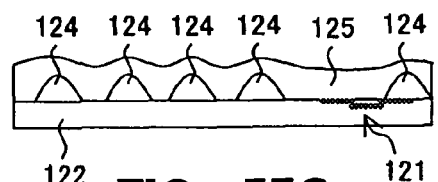
Figure 57G:
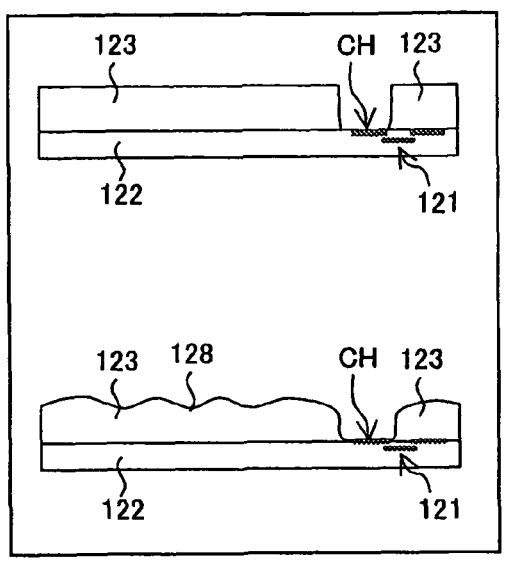
Figure 57D:
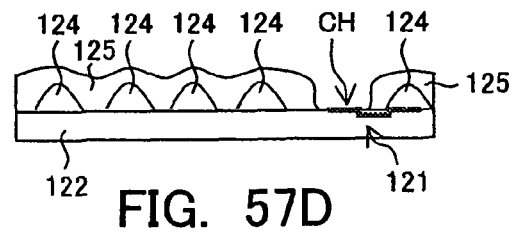
Figure 57H:
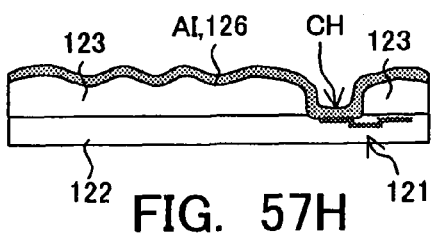
Figure 57E:
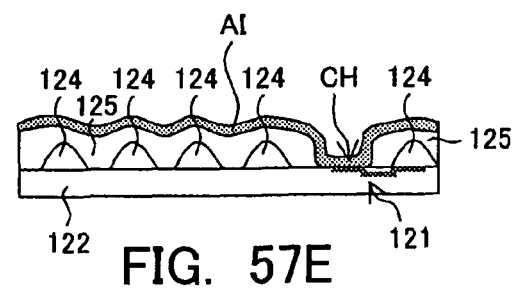

According to the present invention, on the other hand, the photo-sensitive resin 123, such as resist, is coated, the contact hole CH is formed by a photo-lithography process, and a post-bake is performed at a temperature of less than 160° C., as shown in FIG. 57F to 57H. Then the thermal deformation characteristics of the photo-sensitive resin 123 are distributed by irradiating UV light (preferably DUV (deep UV)) with an irradiation higher than normal exposure conditions, to form a contact hole CH, then undulation (micro-grooves) 128 like wrinkles are formed at the surface of the photo-sensitive resin 123 by performing heat treatment equal to or higher than the post-bake temperature. The process up to this point is the same as the process in FIG. 3. Then the reflection electrode 126 comprised of Al is formed.

Figures 58A, 58B:
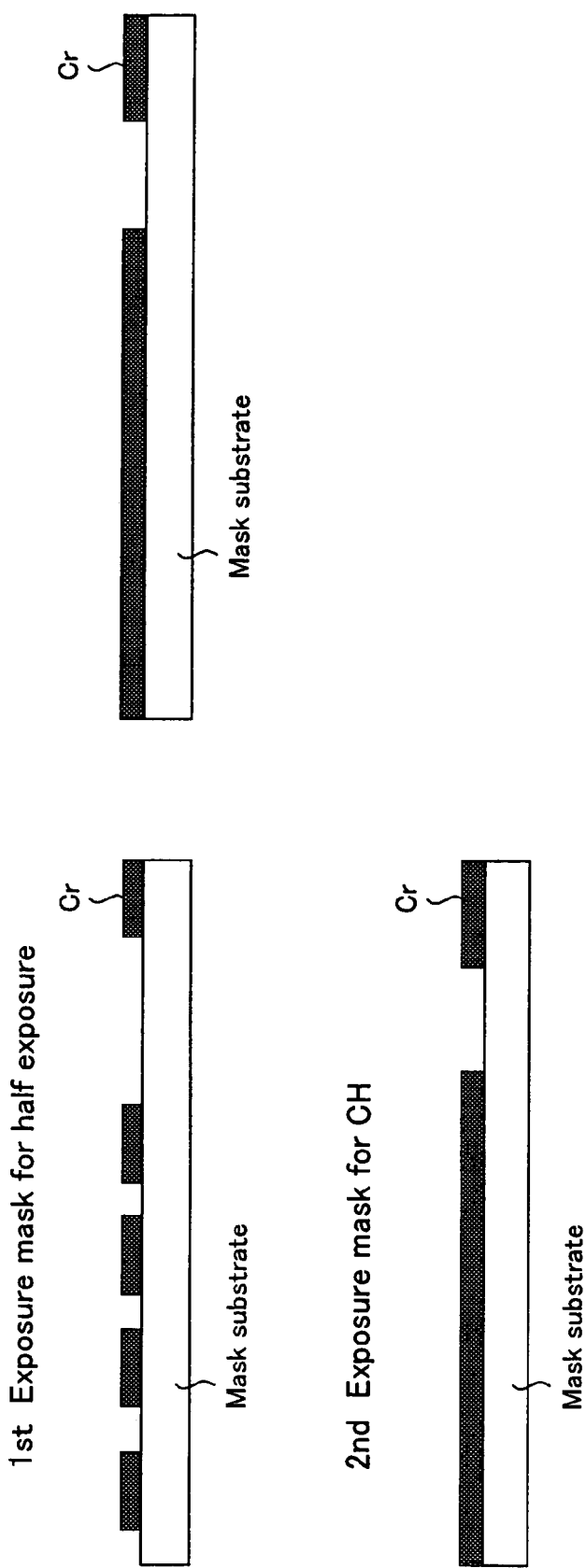
FIGS. 58A-58B show cross-sectional views depicting a conventional mask pattern and the mask pattern of the present invention of the bump formation method.

In this way, according to the present embodiment, it is sufficient to perform the resin formation process and photo-lithography only once respectively, as shown in FIG. 58B, so the manufacturing process can be considerably simplified and a photo mask for bump formation is not necessary. Also, by controlling the process conditions, including the resin film thickness, bake conditions, and UV curing conditions, the average inclination angles of the micro-grooves can be controlled. Therefore it is possible to implement a reflection liquid crystal display device having higher reflection characteristics than prior art. The reflectance characteristics are shown in FIGS. 9, 10 and 15.

CONCRETE FABRICATION EXAMPLES

Fabrication example 1

A reflection panel prototype was fabricated under the following fabrication conditions.
Photo-sensitive resin: LC-200 (general purpose resist made by Shipley Co.)
Using a spinner, the above mentioned photo-sensitive resin material was rotated for 3 seconds at 350 rpm, then rotated for 20 seconds at 800 rpm to form the resin layer.
Pre-bake: 30 minutes at 90° C.
Film thickness was changed by exposing the entire surface of the panel.
Post bake: 40 minutes at 120° C.
UV curing: Using a UV irradiation device made by ORC, UV was irradiated on the entire surface of the resin layer at 5200 mJ/cm$^2$ (measured by a UV25 sensor made by ORC).
Resist final bake: 40 minutes at 200° C.
Reflection material: Al with a 200 nm film thickness (deposited by resistance heating)

A liquid crystal panel was fabricated using a reflection electrode fabricated under the above mentioned conditions, and reflection characteristics were evaluated using an integrating sphere. As a result, as FIG. 9 shows, it was determined that a reflection liquid crystal panel with better reflection characteristics than prior art was implemented.

Fabrication Example 2

Fabrication example 2 can be applied to the case when pattern exposure is executed.

The following fabrication conditions are when the photo-sensitive resin is half-exposed and the pattern sags by heat, in order to form a reflection electrode having the desired reflection characteristics. When this system is applied to a TFT substrate, exposure is required twice, but resin formation can be only once. However, the problem is that reflection characteristics greatly depend on the exposure conditions and heat sagging conditions. To alleviate this problem, we invented a method of adding a micro-groove formation process to the half exposure process. The fabrication conditions are as follows.
Photo-sensitive resin: LC-200 (general purpose resist made by Shipley Co.)
3 seconds at 350 rpm first, then 20 seconds at 800 rpm using a spinner.
Pre-bake: 30 minutes at 90° C.

Using photo-masks (having an octagon, square, cross, pentagon, doughnut, triangle, ellipse, sector, figure eight shapes, and an area without a pattern. Here the area without a pattern is an area where only micro-grooves are formed), contact exposure was executed (under the same exposure conditions) using a large exposure system.

Development process: 50 seconds
Post-bake: 40 minutes at 120° C.
UV curing: 5200 mJ/cm² (micro-groove forming conditions)
UV curing: 1300 mJ/cm² (micro-groove non-forming conditions, prevents sagging by heat), optimized under half exposure conditions
Resist final bake: 40 minutes at 200° C.
Reflection material: Al at a 200 nm film thickness (deposited by resistance heating)

A liquid crystal panel was fabricated using a reflection electrode formed under the above mentioned conditions, and the reflection characteristics were evaluated using an integrating sphere. As a result, as FIG. 15 shows, it was determined that a reflection panel having stable and high reflection characteristics can be fabricated by adding micro-groove formation conditions to the half exposure system. However, only the area where only micro-grooves are formed on the part with no pattern formation showed the highest reflection characteristics.

Fabrication Example 3

In fabrication example 3, it was discovered that when micro-grooves are formed on a flat substrate, uniformity from a macro-view improves if the surface of the resin is separated into blocks by half exposure, compared with the case of not separating into blocks, as shown in FIG. 18.

Figure 59:
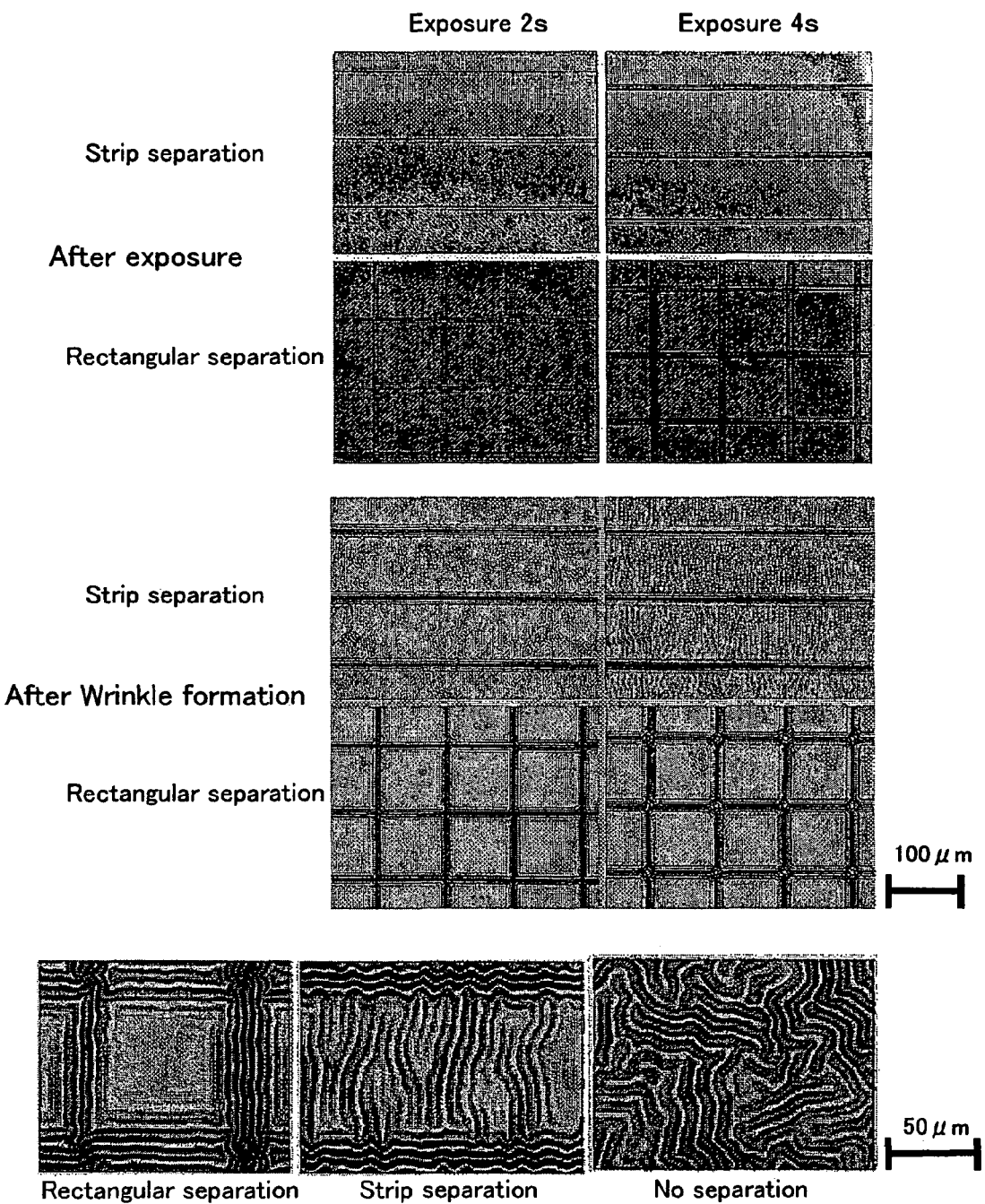
FIG. 59 shows micro-photographs showing an example of micro-groove formation when block separation was formed by half exposure.

FIG. 59 shows micro-photographs depicting an example of micro-groove formation when block separation was performed by half exposure.

As FIG. 59 shows, wrinkles of micro-grooves are confined to a block. In other words, it is known that micro-grooves can be separated by half exposure. It was also discovered that the shape of micro-grooves can be controlled by block shape and depth of separation (exposure conditions).

Fabrication Example 4

In the block separation shown in fabrication example 3, it was discovered that it is not necessary to form block separation on the surface of the resin layer by half exposure, but that micro-grooves can be separated or that shape thereof can be controlled by creating film thickness distribution on the photo-sensitive resin by forming undulation on the substrate surface. In other words, film thickness distribution is created on the photo-sensitive resin layer by a data bus line, gate line and auxiliary electrode Cs line on the substrate shown in FIGS. 16 and 17, by which blocks of micro-grooves are separated.

Figure 60:
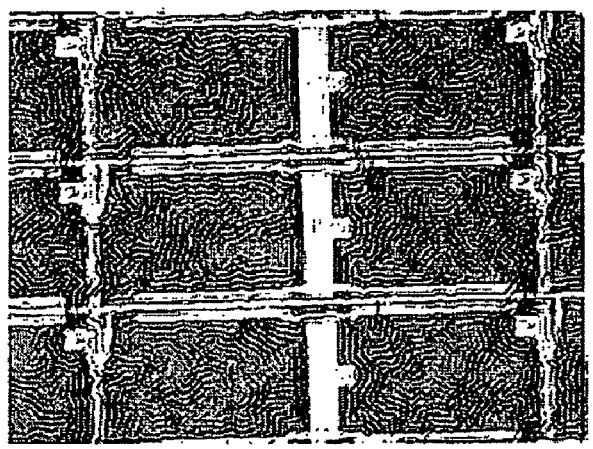
FIG. 60 is a micro-photograph which shows the micro-grooves formed in the fabrication example 4.

FIG. 60 is a micro-photograph showing the micro-grooves formed in fabrication example 4.

Here, AFP 750 (made by Clariant Japan) is coated on a TFT substrate, pre-bake is performed, a contact hole is exposed using a stepper, the resist is developed, and post-bake is performed for 80 minutes at 135° C., then UV is irradiated at 2600 mJ/cm² for UV curing, and final bake is performed on the resist at 200° C. for 60 minutes, to form the micro-grooves.

As FIG. 60 shows, micro-grooves are separated on the data bus, gate line and Cs line, which are the composing elements on the substrate. This is because resist film thickness decreases on the data bus, gate line and Cs line, and micro-grooves are separated.

Figure 61:
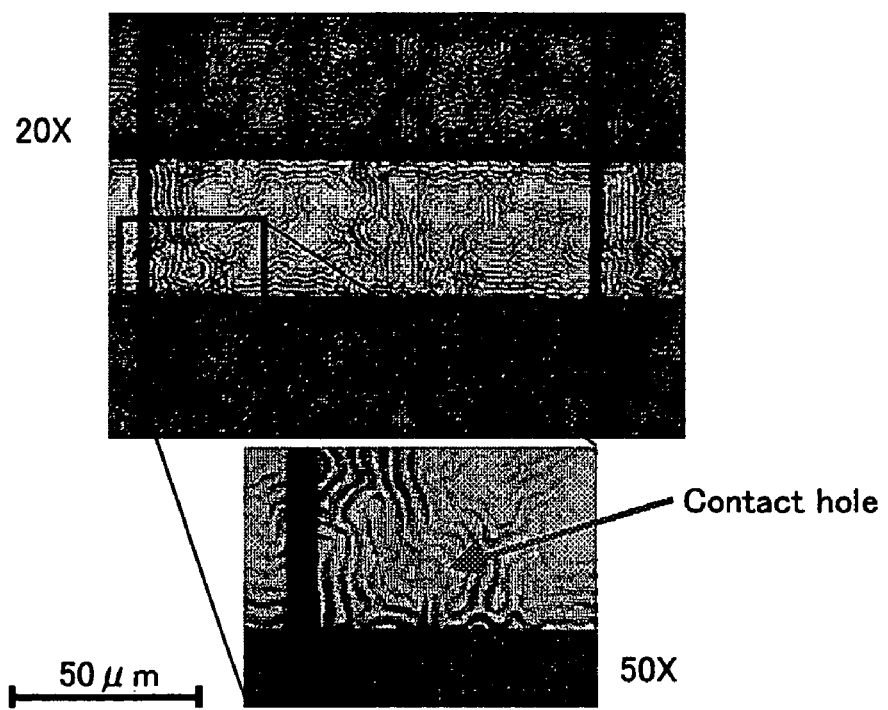
FIG. 61 is a micro-photograph of one polarizer type TFT driven reflection liquid crystal device fabricated using CF substrate and a TFT substrate where a pixel electrode is formed on the substrate by sputtering and photo-lithograph Al electrode.
Figure 62A:
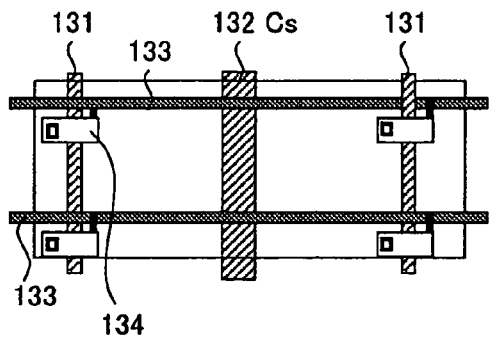
FIGS. 62A-62G show plan views depicting the state of controlling the shape of micro-grooves by controlling the arrangement and shape of the electrode layer, including the gate electrode, Cs electrode and data electrode, and the inter layer insulation film layer.
Figure 62D:
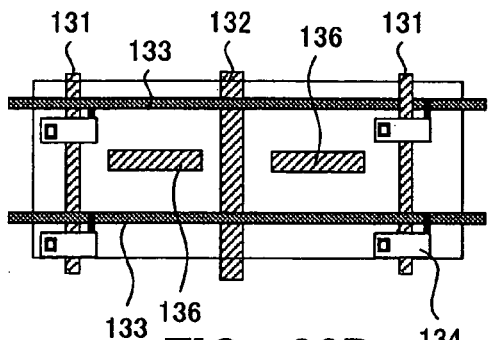
Figure 62B:
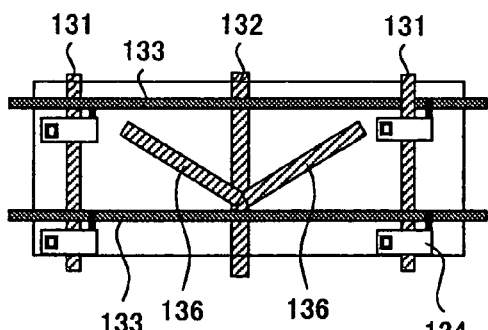
Figure 62E:
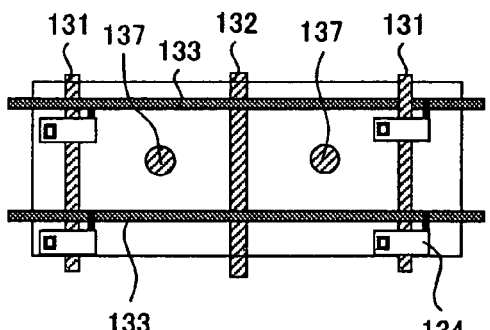
Figure 62C:
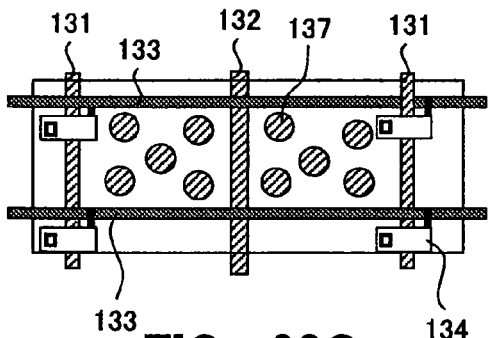
Figure 62F:
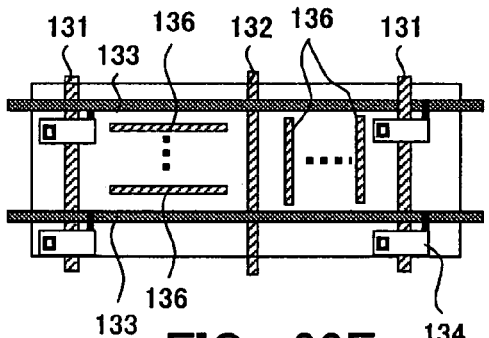
Figure 62G:
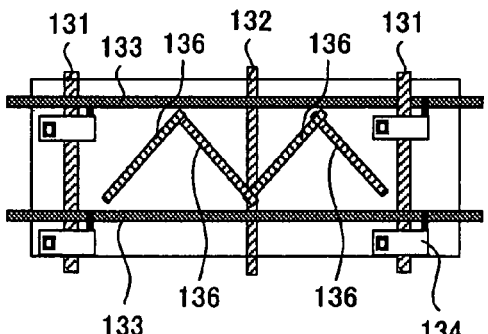
Figure 63A:
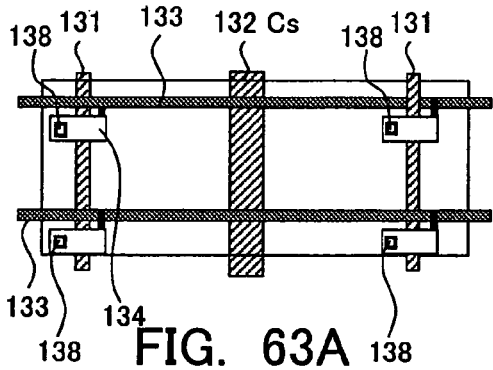
FIGS. 63A-63H show plan views depicting the state of controlling the bump shapes on the surface of a reflection electrode by size, shape, arrangement and number of contact holes for electrically connecting the drain electrode and the reflection electrode.
Figure 63E:
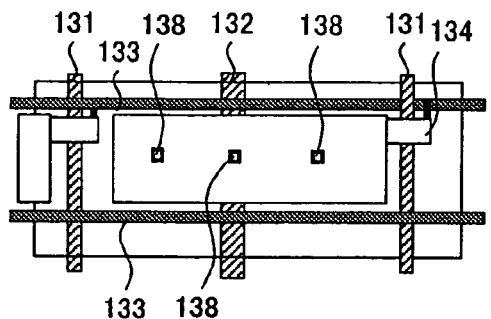
Figure 63B:
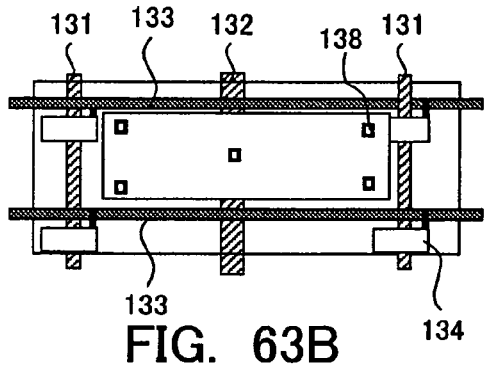
Figure 63F:
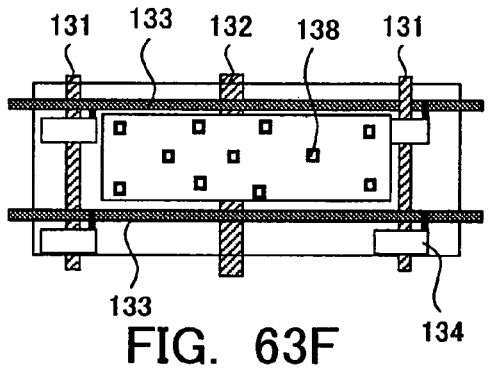
Figure 63C:
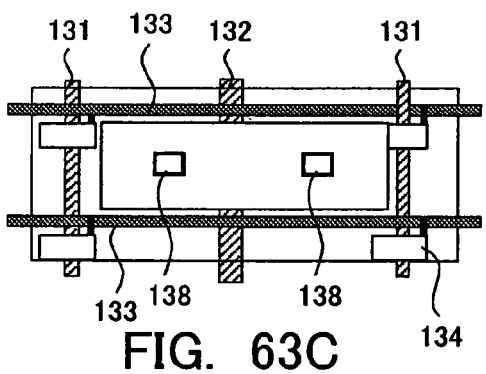
Figure 63G:
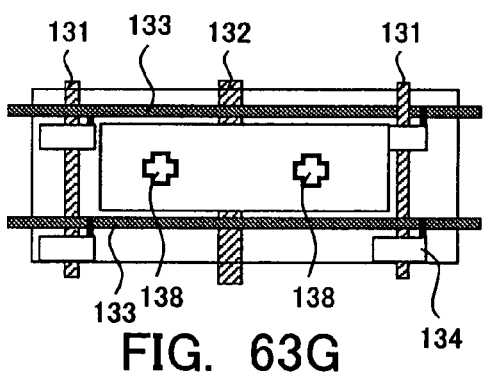
Figure 63D:
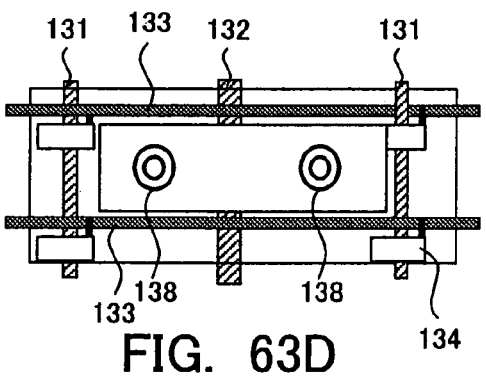
Figure 63H:
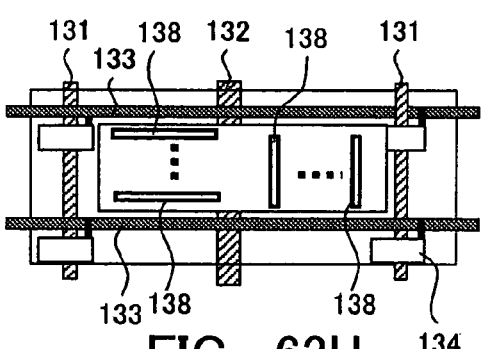

FIG. 61 is a micro-photograph of one polarizer type TFT driven reflection liquid crystal device fabricated using a TFT substrate and CF substrate, where an Al electrode is formed by sputtering and a pixel electrode is formed by separation by photo-lithography.

As FIG. 61 shows, micro-grooves are deformed not only on the data bus, gate line and Cs line but also near the contact hole. This indicates that bump shapes on the reflection electrode surface can be controlled by the size, shape, arrangement and number of contact holes.

Table 1 shows the characteristics comparison between an actually fabricated reflection panel and reflection panels made by other companies.

As Table 1 shows, the fabricated reflection panel exhibits higher reflection characteristics than other companies, both in the 30° incident system using a point light source and in measurement by an integrating sphere using a diffuse light source.

TABLE 1

Reflectance comparison with reflection LCDs made by other companies (reflector of a 100% white display)

| Measurement system | Company A | Company B | Present invention |
|---|---|---|---|
| 30° incident | 18 | 18 | 35 |
| Integrating sphere | 11 | 14 | 16 |

The 30° incidence indicates reflectance (standard white panel: 100%) at the front face of the panel under a 30° incident point light source, and the integrating sphere indicates reflectance (standard white panel: 100%) at the front face of the panel under a uniform diffuse light source with full attachment.

Fabrication Example 5

The shape of the micro-grooves can be controlled by controlling the arrangement and shape of the electrode layer and the inter-layer insulation film layer of the gate electrode, Cs electrode (same layer as the gate electrode) and the data electrode, which are the composing elements of a TFT substrate.

FIG. 62 shows plan views depicting examples of the TFT substrate. FIG. 62A shows a normal TFT substrate where a gate electrode 131, Cs electrode 132, data electrode 133 and TFT element 134 are formed. FIG. 62B is an example when two lines of linear structures 136 are formed in a diagonal direction during patterning of the gate electrode 131 and Cs electrode 132, in addition to the normal TFT structure. FIG. 62C is an example when n number of circular structures 137 are formed in the same way as FIG. 62B, FIG. 62D is an example when two lines of linear structures 136 are formed in parallel with the data electrode 133, FIG. 62E is an example when two circular structures 137 are formed just like FIG. 62C, FIG. 62F is an example when n number of linear structures 136 are formed in parallel with the data electrode 133, and n number of linear structures 136 are formed in parallel with the gate electrode 133, and FIG. 62G is an example when four linear structures 136 are formed in the diagonal direction. The photo-sensitive resin layer is formed on the structure shown in the above mentioned plan views, and micro-grooves are formed on the surface.

As illustrated, wrinkle shapes of the micro-grooves generated on the surface of the photo-sensitive resin can be controlled by forming structures using these materials so as to create step differences in the pixel area when each constituting element of the gate electrode 131, Cs electrode 132 (the same layer as the gate electrode 131) and data electrode 133 are formed. In this case, the structures are patterned at the same time with each constituting element, so the number of processing steps are unchanged. Because of this, it is possible to add directivity to the reflection characteristics and to control alignment of the liquid crystal layer by the micro-groove azimuth.

Fabrication Example 6

Micro-grooves can be controlled in the same way by forming the step difference shape of fabrication example 5 by selectively etching the TFT structure.

Fabrication Example 7

Bump shapes at the surface of the reflection electrode can be controlled by the size, shape, arrangement and number of contact holes for electrically connecting the drain electrode (the same layer as the data electrode) of the TFT substrate and the reflection electrode. In other words, by forming a plurality of contact holes to be a predetermined shape in a pixel, undulation can be formed on the photo-sensitive resin layer and the wrinkle shape of the micro-grooves formed on the surface can be controlled.

FIG. 63 shows examples. FIG. 63A shows a plan view of a normal TFT substrate where the gate electrode 131, Cs electrode 132, data electrode 133, TFT element 134 and contact hole 138 are formed. FIG. 63B, 63E, 63F are examples when the number of contact holes 138 are changed, and FIG. 63C, 63D, 63G and 63H are examples when the shape of the contact holes 138 are changed. In these examples, the source electrode 18 shown in FIG. 2 is formed on the entire face of a pixel block, and a plurality of contact holes CH are formed thereon. The wrinkle shapes of the micro-grooves are formed with contacts hole CH as the center.

As FIG. 63 shows, the micro-grooves generated on the surface of the photo-sensitive resin can be controlled by controlling the size, shape, arrangement and number of the contact holes 138.

Fabrication Example 8

It has been confirmed that the liquid crystal aligns along the groove on the surface of the reflection electrode where the micro-grooves of the present invention are formed, and by using this characteristic, a random alignment type reflection liquid crystal display device can be implemented without performing special alignment processing, such as rubbing processing on the alignment film, in the horizontal alignment, vertical alignment and hybrid alignment (HAN), and the panel formation process can be simplified.

As described above, according to the present embodiment, process simplification, yield improvement, and a decrease in manufacturing cost can be implemented, a reflection electrode which can stably implement high reflection characteristics can be formed, and a reflection liquid crystal display device with high reliability whereby a high brightness display is possible can be implemented.

[Modified Process of Micro-Groove 2]

A rough configuration of the reflection liquid crystal display device of the present embodiment is the same as the configuration shown in FIG. 2.

The main point of the present embodiment is that when undulation is formed on the surface of the resin layer by performing heat treatment on the resin layer, a part which thermal deformation characteristics are different from the resin is created in the resin layer, or a material which thermal deformation characteristics are different from the resin is mixed into the resin layer, so as to control the bump shape of the micro-grooves to be a desired shape.

Specifically, suitable methods include a method of dispersing particles which have different thermal deformation characteristics into the resin layer, a method of forming the above mentioned part by layering another resin layer having different thermal deformation characteristics in the resin layer, a method of forming the above mentioned part by forming another resin layer having different thermal deformation characteristics in the resin layer into a predetermined shape using a pattern, and a method of forming the part having different thermal deformation characteristics by performing partial processing (e.g. irradiating energy rays selectively onto the resin layer or changing the irradiation intensity of the energy ray). The bump shape of the resin layer is controlled such that the ridge line shape becomes at least one of a line, curve, loop and branch shape.

CONCRETE FABRICATION EXAMPLES

Fabrication Example 1

Figure 64:
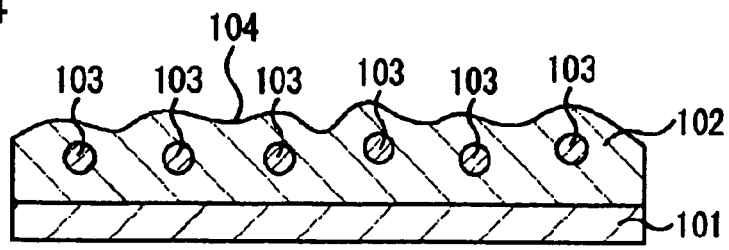
FIG. 64 is a cross-sectional view depicting a rough configuration of the resin layer of the fabrication example 1.

As FIG. 64 shows, novolak photo-sensitive resin 102, where $SiO_2$ particles 103 with about a 1 μm diameter are dispersed, is coated on the glass substrate 101, a post bake is performed at 160° C., then UV is irradiated at an irradiation energy equal to or higher than image exposure condition, so as to form an area with different thermal deformation characteristics in the photo-sensitive resin 102. Then heat treatment is performed a temperature equal to or higher than a post bake temperature, so as to form fine wrinkled undulation 104 on the surface of the photo-sensitive resin 102 with the particles 103 having different thermal deformation characteristics as cores. And a reflection layer (not illustrated) such as Al is formed on the photo-sensitive resin 102, so as to fabricate a reflector having a surface which reflects the shape of the undulation 104.

In this example, silicon dioxide particles having different thermal deformation characteristics are dispersed in the photo-sensitive resin layer, and a distribution having different thermal deformation characteristics is formed in the photo-sensitive resin layer by UV exposure. It was discovered that finer wrinkle shapes are formed after heat treatment is performed compared with the case when silicon dioxide particles were not dispersed.

Fabrication Example 2

Figure 65:
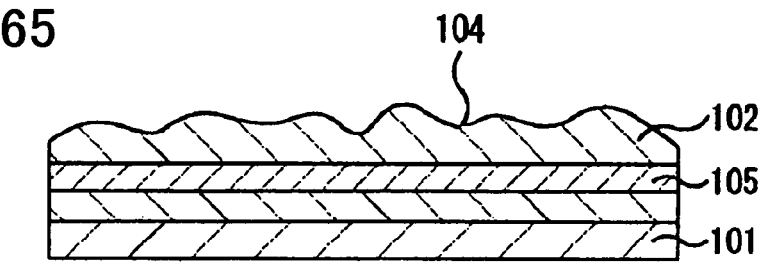
FIG. 65 is a cross-sectional view depicting a rough configuration of the resin layer of the fabrication example 2.

As FIG. 65 shows, a layer 105 having thermal deformation characteristics different from the photo-sensitive resin 102 is layered in the photo-sensitive resin 102. After post baking at 160° C., UV is irradiated at irradiation energy equal to or higher than image exposure conditions, so as to form an area having different thermal deformation characteristics in the photo-sensitive resin 102. Then heat treatment is executed at a post bake temperature or higher. As a result, finer wrinkle undulation 104 is formed on the surface of the photo-sensitive resin 102 because the thermal deformation characteristics of each layer are different. Then the reflection layer (not illustrated) such as Al is formed on the photo-sensitive resin 102, so as to fabricate a reflector having a surface which reflects the shape of the undulation 104.

Fabrication Example 3

Figure 66:
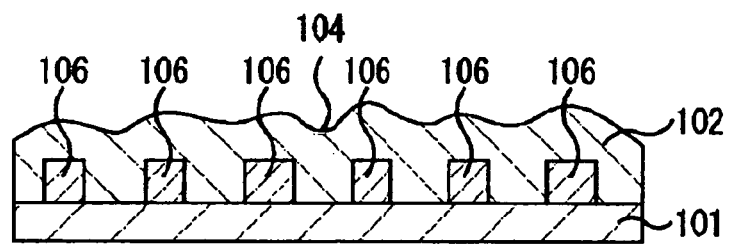
FIG. 66 is a cross-sectional view depicting a rough configuration of the resin layer of the fabrication example 3.

As FIG. 66 shows, a resin 106 having thermal deformation characteristics different from the photo-sensitive resin 102 is formed on the substrate 101 by patterning, and is covered by the photo-sensitive resin layer 102. To prevent diffraction, the pattern shapes are preferred to be random. After post-bake is executed at 160° C., UV is irradiated at an irradiation energy equal to or higher than the image exposure conditions, so as to form an area having different thermal deformation characteristics from the photo-sensitive resin 102 in the photo-sensitive resin 102. Then heat treatment is performed at a post-bake temperature or higher, and as a result, finer wrinkled undulation 104 are formed on the surface of the photo-sensitive resin 102, because the thermal deformation characteristics of each layer are different. Then a reflection layer (not illustrated), such as Al, is formed on the photo-sensitive resin 102, so as to fabricate a reflector having a surface which reflects the shape of the undulation 104.

Fabrication Example 4

Figure 67:
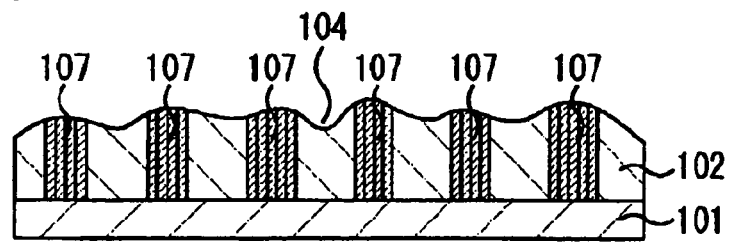
FIG. 67 is a cross-sectional view depicting a rough configuration of the resin layer of the fabrication example 4.

As FIG. 67 shows, UV is selectively irradiated on the photo-sensitive resin, so as to form an area 107 having different thermal deformation characteristics. After post baking at 160° C., UV is irradiated on the entire surface at a irradiation energy equal to or higher than the image exposure conditions, so as to form an area having different thermal deformation characteristics in the photo-sensitive resin 102. Then heat treatment is performed at a post bake temperature or higher, and as a result, finer wrinkled undulation 104 are formed on the surface of the photo-sensitive resin 102, because the thermal deformation characteristics of each layer are different. Then a reflection layer (not illustrated), such as Al, is formed on the photo-sensitive resin 102, so as to fabricate a reflector having a surface which reflects the shape of the undulation 104.

As described above, according to the present embodiment, the roughness of the display screen is controlled by meticulously controlling the wrinkled undulation on the surface of the photo-sensitive resin, and a simplification of process, improvement of yield and decrease in manufacturing cost can be implemented, and a reflection type liquid crystal display device with high reliability, which can display with high lightness, can be implemented by forming a reflection electrode which can stably implement high reflection characteristics.

In the above example, the process of irradiating UV on the entire surface can be omitted if material having different thermal deformation characteristics is mixed, layered or distributed in the photo-sensitive resin layer.

[Modified Process of Micro-Groove 3]

A rough configuration of the reflection liquid crystal display device of the present embodiment is the same as the configuration shown in FIG. 2.

The main point of the present embodiment is that when thermal characteristics distribution is created in the resin layer, the distribution of the shrinkage factor or the expansion factor is created in the thickness direction of the resin layer by irradiating the light with a predetermined exposure energy on the surface of the resin layer, so as to control the bump shape of the resin layer. Specifically, it is preferable to set the exposure energy to be 1000 mJ/cm$^2$ or higher value.

CONCRETE FABRICATION EXAMPLES

Fabrication Example 1

Figure 68:
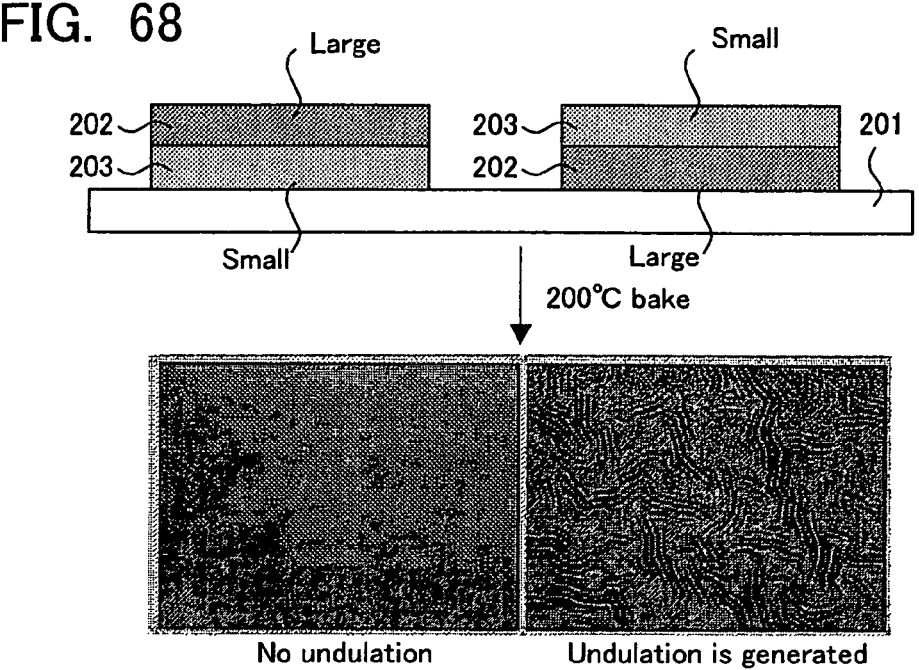
FIG. 68 is a schematic diagram depicting a rough configuration of the resin layer of the fabrication example 1.

Resist having a different shrinkage factor is layered on the glass substrate 201 as a resin layer, and is baked at 200° C. for 60 minutes, then it was examined how undulation (micro-grooves) are generated on the resist surface. Examination showed that undulation (micro-grooves) were generated on the surface when the layer 203, having a small shrinkage factor, is formed on a layer 202 having a large shrinkage factor, as shown in FIG. 68, but the undulation (micro-grooves) were not generated when the layer 202, having a large shrinkage factor, is formed on the layer 203 having a small shrinkage factor.

Figure 69:
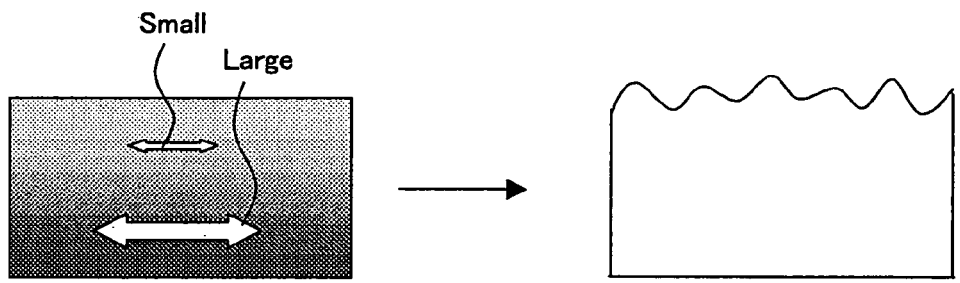
FIG. 69 is a schematic diagram depicting the influence of the shrinkage factor on bump shape.

The reason follows. As FIG. 69 shows, stress generated in the layer 202 with a large shrinkage factor at the bottom layer influences the layer 203 with a small shrinkage factor at the top layer, and deformation is generated in the layer 203 with a small shrinkage factor at the top layer. If the layer 203 with a small shrinkage factor is at the bottom, little stress is generated, and the top layer 202 with a large shrinkage factor is not influenced, so deformation by heat treatment is not generated and micro-grooves are not formed.

Therefore when two types of photo-sensitive resin layers with different thermal shrinkage factors are layered, it is necessary to form a resist with a high thermal shrinkage factor at the bottom layer and a resist with a low thermal shrinkage factor at the top layer.

Fabrication Example 2

Figure 70:
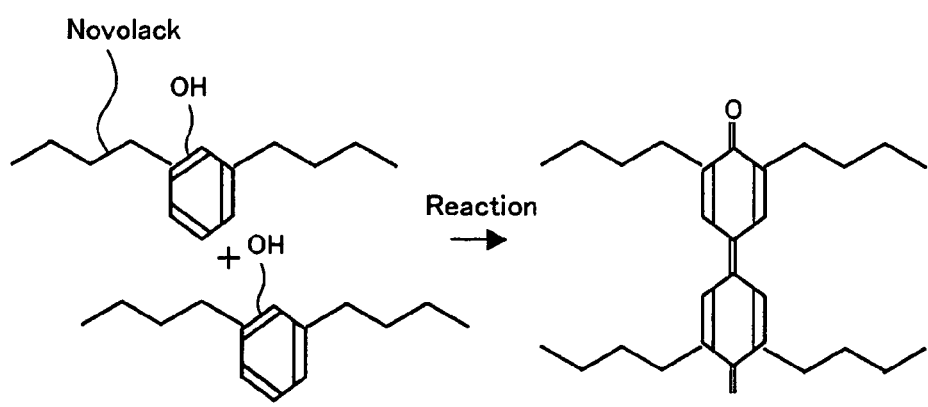
FIG. 70 is a schematic diagram depicting an example of cross-link by the oxidation of novolak.

4000 mJ/cm$^2$ of UV is irradiated on the novolak photo-resist coated on the glass substrate to cause a cross-link reaction of resist near the surface. The novolak resin near the surface of the resist polymerizes by an oxidation reaction, as shown in FIG. 70 (FIG. 70 is one example of the reaction). Since the polymerized novolak has a smaller shrinkage factor than the non-polymerized novolak, distribution of the shrinkage factors can be formed such that the shrinkage factor is small at the resist surface and the shrinkage factor is large inside the resist.

Therefore by forming a novolak photo-resist layer on the glass substrate and irradiating UV on the entire surface to cross-link the resist at the surface, a structure where the top layer has a small shrinkage factor and the bottom layer has a large shrinkage factor can be created. Micro-grooves can be formed by performing heat treatment at the surface thereafter.

Fabrication Example 3

Resist AFP 750 (made by Clariant Japan) is coated on the 0.7 mm thick glass substrate to a 3 μm thickness, and solvent in the resist is evaporated by baking the resist for 30 minutes at 90° C. in a clean oven. UV is then irradiated at 0-6500 mJ/cm$^2$. After irradiating UV, the resist was baked for 60 minutes at 200° C. in a clean oven, and the result of observing the shape of the resist by microscope is shown in FIG. 71.

Figure 71:
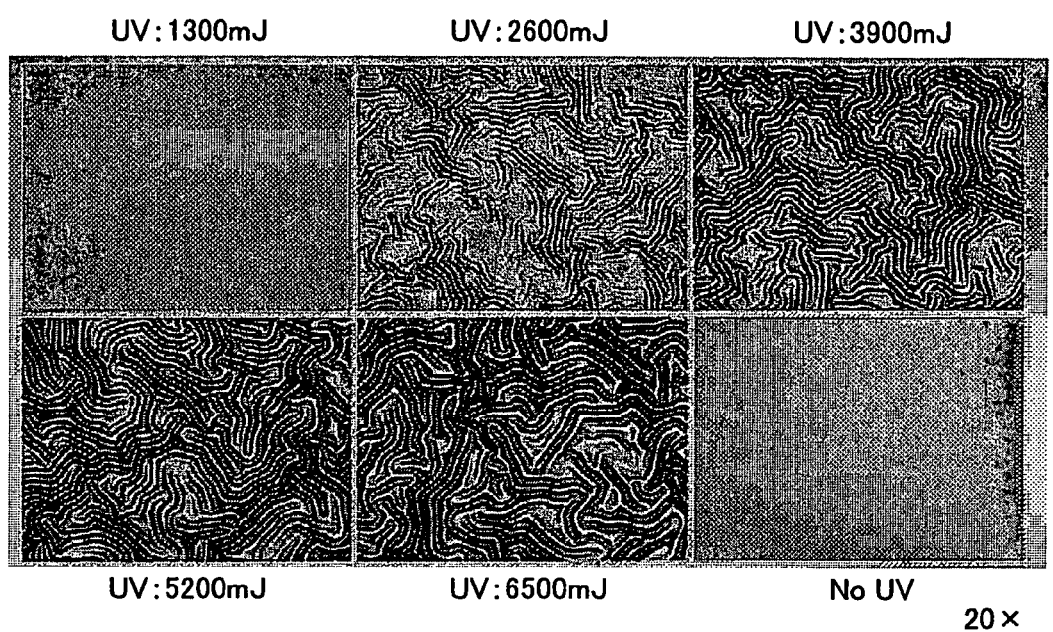
FIG. 71 is a micro-photograph of the resist surface.

As FIG. 71 shows, undulation (micro-grooves) are generated on the resist surface by irradiating UV at a 2600 mJ/cm$^2$ or higher energy.

Figure 72:
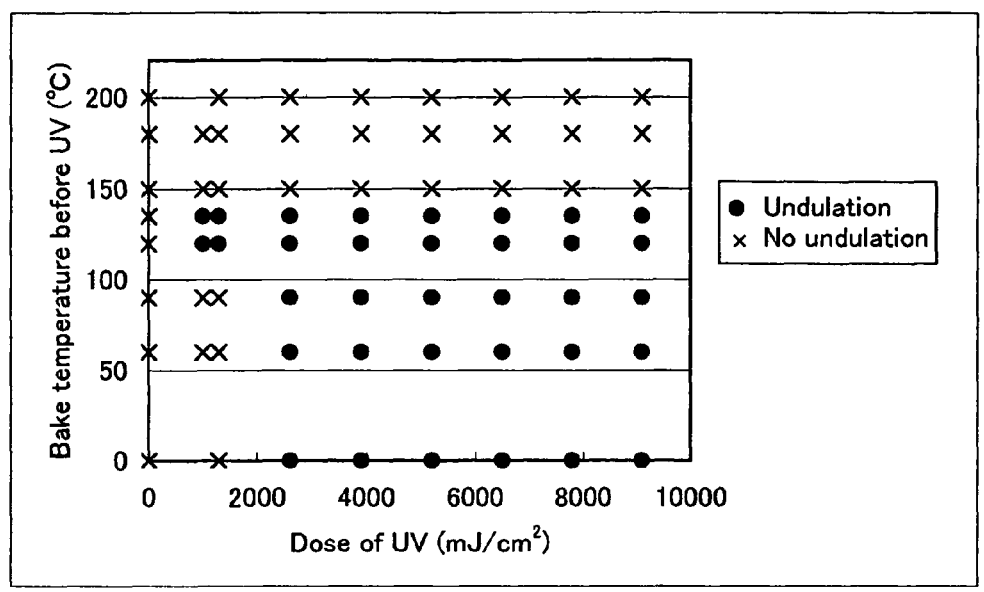
FIG. 72 is a characteristic diagram depicting the result of examining the state of undulation being generated on the resist surface.

We examined how undulation is generated on the resist surface by changing the baking temperature (time is fixed to 30 minutes) before UV irradiation and dose of UV. This result is shown in FIG. 72. The black dot indicates a case when micro-grooves were generated, and X indicates a case when micro-grooves were not generated.

As FIG. 72 shows, undulation is generated under specific conditions, that is, when the bake temperature before UV irradiation is 135° C. or less and the dose of UV is 1000 mJ/cm² or more.

Figure 73:
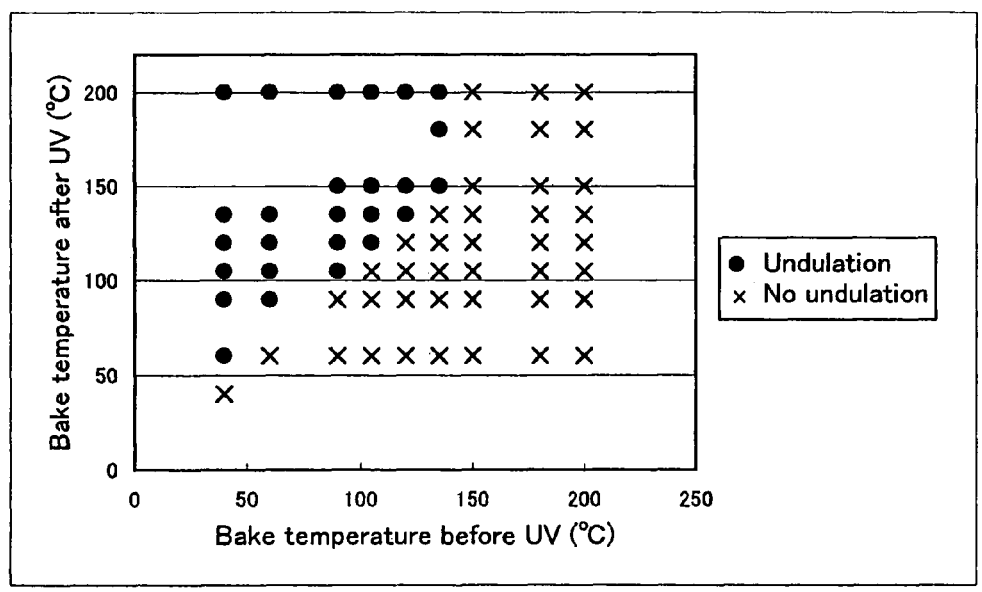
FIG. 73 is a characteristic diagram depicting the result of examining the state of generating undulation when the bake temperature is changed before UV irradiation and after UV irradiation.

FIG. 73 shows the result of examining the state of the generation of undulation when the bake temperature is changed before UV irradiation and after UV irradiation while fixing the dose of UV at 3900 mJ/cm².

Figure 74:
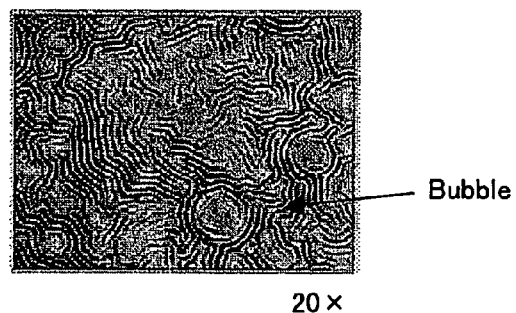
FIG. 74 is a micro-photograph showing the state of bubbles generated on the resist.

The result shows that undulation is generated when the bake temperature before UV irradiation is 135° C. or less and the bake temperature after UV irradiation is higher than that before UV irradiation. However, if the bake temperature before UV irradiation is set to 90° C. or less, bubbles are generated, as the micro-photograph in FIG. 74 shows. This is because the solvent in the resist is not completely evaporated.

Table 2 shows the results when the bake temperature before UV irradiation and bubble generation are examined. As Table 2 shows, bubbles are not generated if the bake temperature before UV irradiation is 90° C. or more. Therefore it became clear that uniform undulation (micro-grooves) without defects, due to bubble generation, can be formed by baking in a 90-135° C. temperature range. If the temperature exceeds 150° C., it is a glass transition temperature or higher where micro-grooves are not formed.

TABLE 2

Bake temperature and bubble generation states before UV irradiation

| Temperature | Bubble generation | Remarks |
|---|---|---|
| 25° C. | Generated | |
| 30° C. | Generated | |
| 50° C. | Generated | |
| 70° C. | Generated | |
| 80° C. | Generated | |
| 90° C. | No | |
| 105° C. | No | |
| 120° C. | No | |
| 135° C. | No | |
| 150° C. | No | No undulation generated |

Fabrication Example 4

Undulation were examined when the resist film thickness is changed. Resist AFP 750 (30 cP viscosity) is coated on the glass substrate while changing the rotation frequency in an 800-5000 rpm range, and is baked for 30 minutes at 90° C. After baking, UV is irradiated at 3900 mJ/cm², and baking is finally performed for one hour at 200° C.

Figure 75:
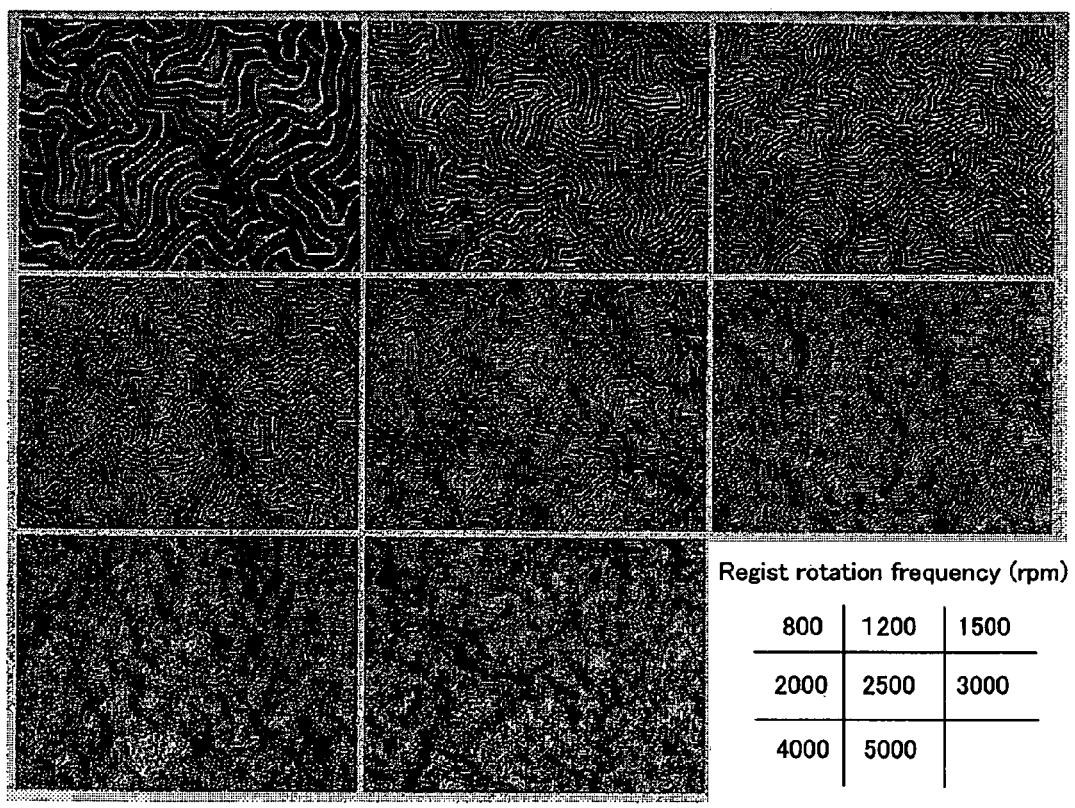
FIG. 75 shows micro-photographs showing the resist surface.

FIG. 75 shows micro-photographs of undulation (micro-grooves) fabricated as above.

As FIG. 75 shows, the amplitude and cycle of the undulation decreases as the rotation frequency of the spinner increases (as the film thickness of the resist decreases). Even in the case of using resist AFP 750 changing between 40 CP and 15 CP viscosity, we observed a phenomena where film thickness decreased along with a decrease in the amplitude and cycle of undulation.

A reflector was fabricated by depositing aluminum (Al) on the undulation formed at the resist surface to be a 200 nm film thickness. The reflector and 0.7 mm thick glass substrate were optically contacted with immersion oil (1.53 refraction index), and reflection characteristics were measured using an integrating sphere. Since the refraction index of the liquid crystal and the glass substrate are both about 1.5, a reflection type liquid crystal display device can be created virtually by optically contacting the glass substrate on the reflector.

Figure 76:
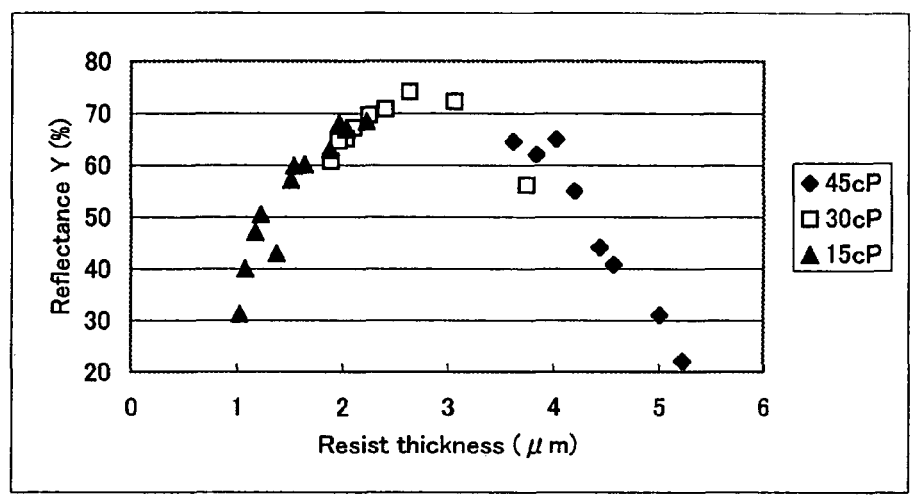
FIG. 76 is a characteristic diagram depicting the result of measuring reflectance.

FIG. 76 shows the result of measuring the reflectance.

The abscissa in FIG. 76 is the resist film thickness which was measured using a non-contact three-dimensional shape measurement device (made by Hishiko). As FIG. 76 shows, a 60% or higher reflectance is obtained for resist film thickness in a 1.5-4 µm range. Since reflectance on a newspaper surface is about 60%, a bright reflection liquid crystal display device can be implemented by setting the resist film thickness to 1.5-4 µm. A resist with a different viscosity CD was used to change the resist film thickness.

Fabrication Example 5

Using resists LC-200 and S1808 (both made by Shipley), the generation of undulation was examined, and a result similar to the result of the fabrication example 1 was obtained. In the case of LC-200, S1808 and AFP 750, fine undulation was generated even if the structure of novolak resin in the resist is different, so it was confirmed that undulation can be implemented if the resist is a novolak resin type.

We performed a similar experiment using AFP 750 without a sensitizing agent, and undulation was generated even with a resist without a sensitizing agent. By this, it was confirmed that undulation is generated by a novolak resin and a sensitizing agent in the resist is not necessary for generating undulation.

Fabrication Example 6

Resist AFP 750 is coated on a 0.7 mm thick glass substrate at a 3 µm thickness, baked for 30 minutes at 90° C. in a clean oven, then UV was irradiated at 3900 mJ/cm². After UV irradiation, undulation was fabricated by baking the resist for 60 minutes at 200° C. in a clean oven. A reflector was formed by forming a 300 nm aluminum film on the undulation. Using this fabricated reflector and a glass substrate with a transparent electrode ITO, the liquid crystal cell shown in FIG. 77 was fabricated using a 4 µm diameter spacer.

Figure 77:
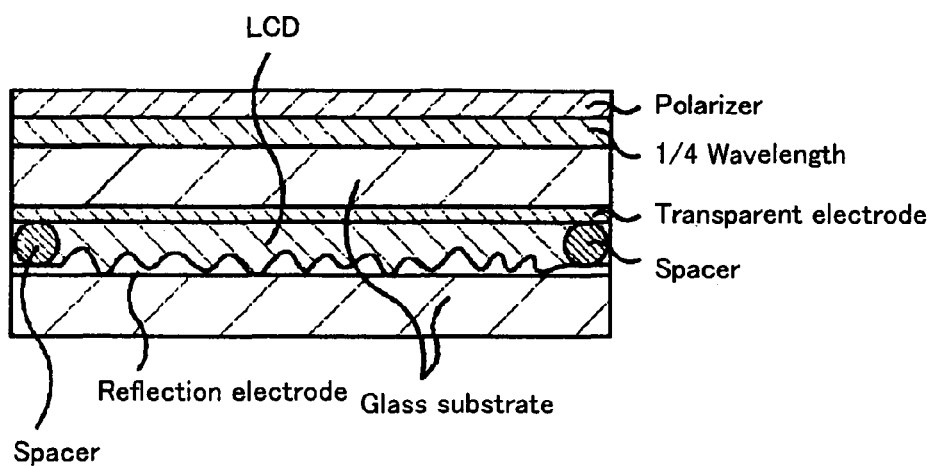
FIG. 77 is a cross-section view depicting a rough configuration of a fabricated liquid crystal cell.

For the liquid crystal, FT-5045 made by Chisso was used, and, as shown in FIG. 77, a polarizer and 1/4 wavelength plate were glued onto the front face of the 0.7 mm thick glass substrate. As a result of observing this liquid crystal cell indoors, it was clear that a good light display was obtained.

Figure 78:
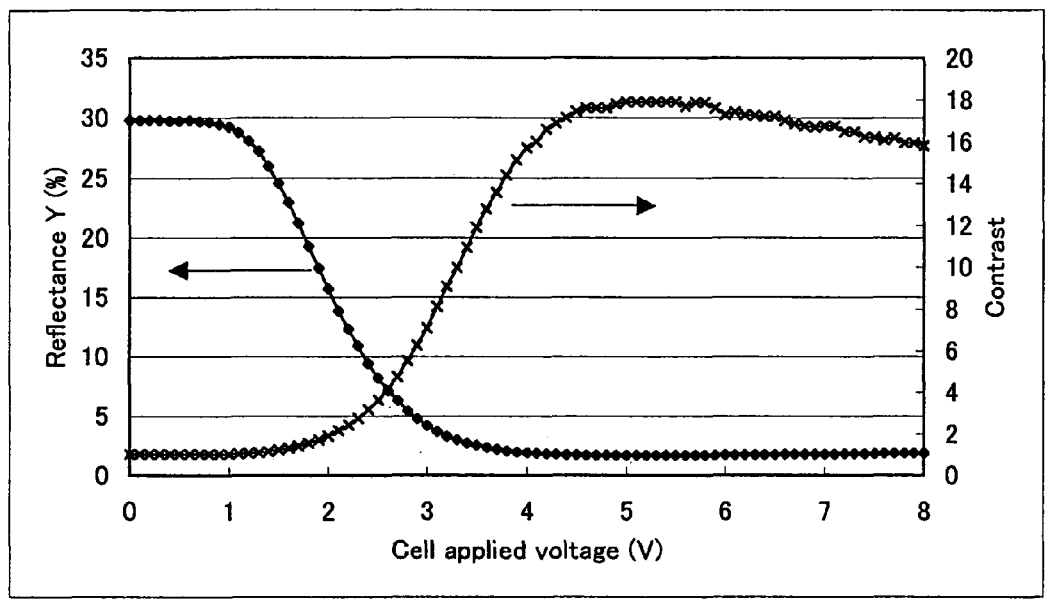
FIG. 78 is a characteristic diagram depicting the result of measuring reflectance when applied voltage is changed using an integrating sphere.

When voltage was applied, it was confirmed that a dark state was obtained and the contrast of the light state and dark state is large. FIG. 78 shows the result of measuring reflectance when the applied voltage is changed using an integrated sphere. In FIG. 78, the abscissa is the applied voltage to the cell, and the white display changes to a black display by changing this applied voltage to the cell. As FIG. 78 shows, it was confirmed that a good display with high reflectance (30%) and high contrast (18) was obtained.

Fabrication Example 7

Resist AFP 750 is coated on a 0.7 mm thick glass substrate to be a 3 µm thickness, baked for 30 minutes at 90° C., and UV was irradiated at 32 mJ/cm² using a mask where circular patterns with a 10 µm diameter are arranged at random. After UV irradiation, the resist film was soaked in MF 319 developer so as to form circular patterns. After baking the substrate for 40 minutes at 120° C. to completely evaporate the developer in the resist, UV was irradiated at 1300 mJ/cm² and 2600 mJ/cm². Then the resist was baked for one hour at 200° C. so as to form undulation.

Figure 79:
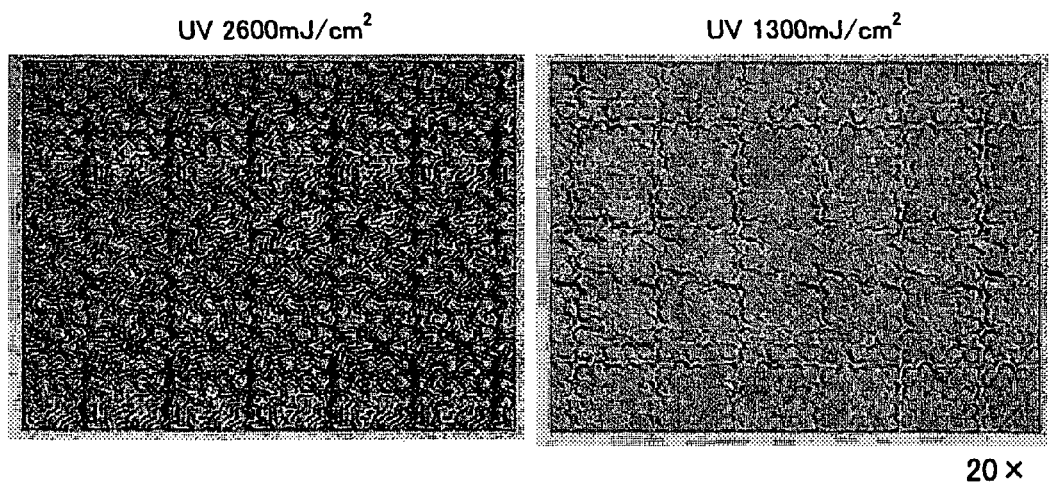
FIG. 79 shows micro-photographs showing patterned substrates after baking.
Figure 84A:
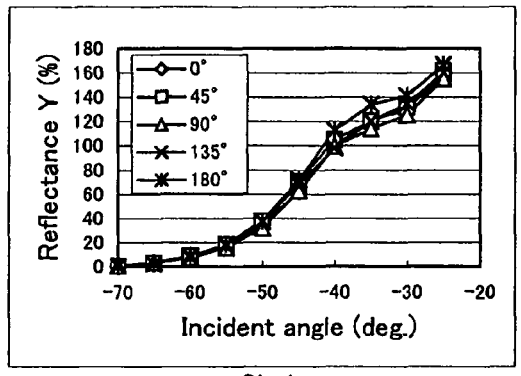
FIGS. 84A-84E show characteristic diagrams depicting the result of measuring reflection characteristics.
Figure 84B:
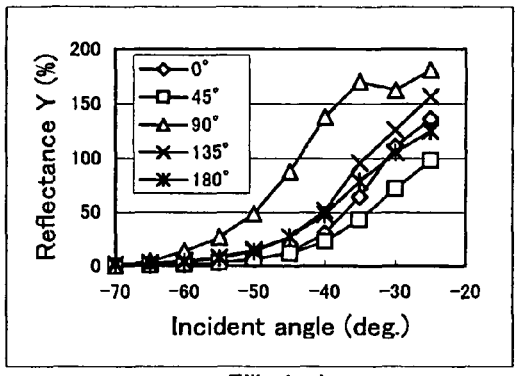
Figure 84C:
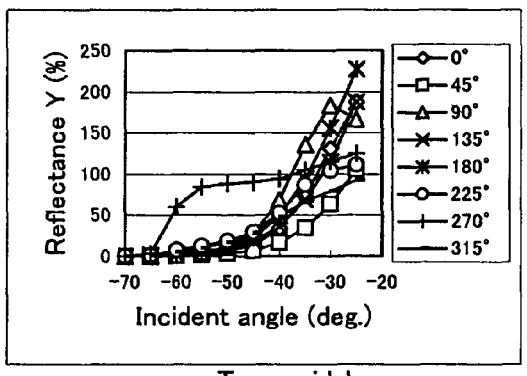
Figure 84D:
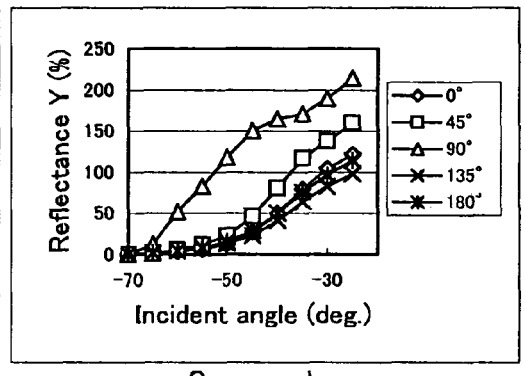
Figure 84E:
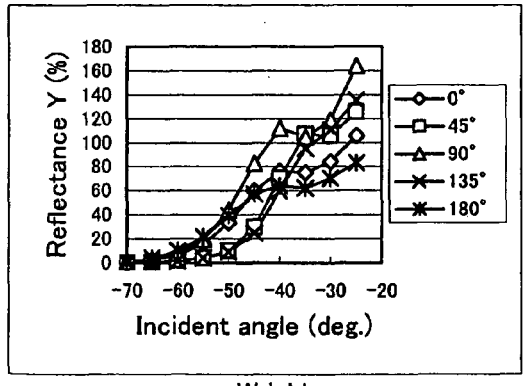

FIG. 79 shows a micro-photograph of a patterned resist substrate after baking. As the photograph shows, fine wrinkled undulation is generated on the circular patterns by UV irradiation. However it was discovered that fine undulation is not generated when the same experiment was performed by increasing the UV dose to 80 mJ/cm² to form circular patterns.

So we examined the UV dose and the micro-pattern generation status during patterning. Table 3 shows the result, and FIG. 80 shows micro-photographs of substrates when 80 mJ/cm² and 35 mJ/cm² are irradiated respectively.

As Table 3 shows, if the first patterning is executed at 60 mJ/cm² or less exposure energy, fine wrinkle shapes are generated to be patterned undulation. This means that if the exposure energy of half exposure during patterning is too high, the undulation formed thereby become deep, and micro-grooves are not easily formed on the surface. Therefore micro-grooves are effectively formed on the surface by forming shallow undulation with a relatively low exposure energy.

TABLE 3

Relationship between UV dose and micro-undulation (micro-grooves) generation during patterning

| UV dose (mJ/cm²) | Generation of micro-undulation |
| --- | --- |
| 10 | Generated |
| 20 | Generated |
| 30 | Generated |
| 35 | Generated |
| 40 | Generated |
| 45 | Generated |
| 50 | Generated |
| 60 | Generated |
| 70 | Not generated |
| 80 | Not generated |
| 100 | Not generated |

Fabrication Example 8

As FIG. 81 shows, striped undulation 303 (height: 0.5 μm, width: 15 μm) were formed on the glass substrate 301, and resist layer 304 (AFP 750) was coated thereon. After baking for 30 minutes at 90° C., UV at 3900 mJ/cm² was irradiated, and the resist was baked for one hour at 200° C.

FIG. 82 shows micro-photographs of fine micro-groove shapes which are generated after baking.

For comparison, FIG. 82 also shows a micro-photograph of a fine micro-groove shape when undulation is not formed under the resist film. When undulation exist under the resist film, a step difference is formed on the surface of the resist, where the stress applied inside the resist differs, so the fine micro-groove shape becomes different from the peripheral area.

As described above, according to the present embodiment, a simplification of process, improvement of yield and a decrease in manufacturing cost can be implemented, and a reflection liquid crystal display device with high reliability which can display with high lightness can be implemented by forming a reflection electrode which can stably implement high reflection characteristics.

[Control of Inclination Angle Distribution of Reflector]

Figure 19:
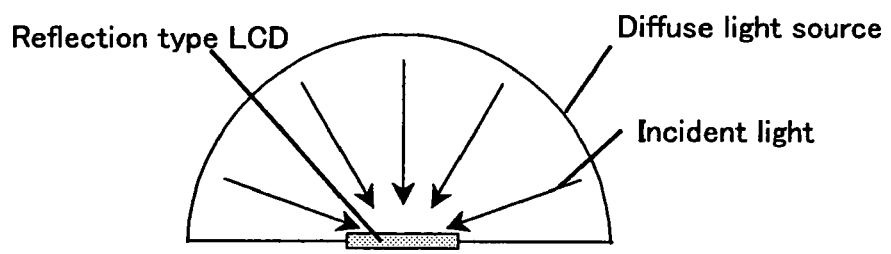
FIG. 19 is a diagram depicting an actual environment where a reflection type liquid crystal display device, which the present embodiment assumes, is used.

FIG. 19 is a diagram depicting an actual environment where the reflection type liquid crystal display device based on the present embodiment is used. In the environment where the reflection type liquid crystal display device is used, light sources exist in various locations. Therefore, considering various environments of use, as shown in FIG. 19, it is necessary to assume the case when the reflection type liquid crystal display device is positioned under a uniform diffuse light source placed inside a sphere. Under such a use environment, all incident lights that exist in the solid angle of the half sphere are irradiated into the display panel.

Figure 20:
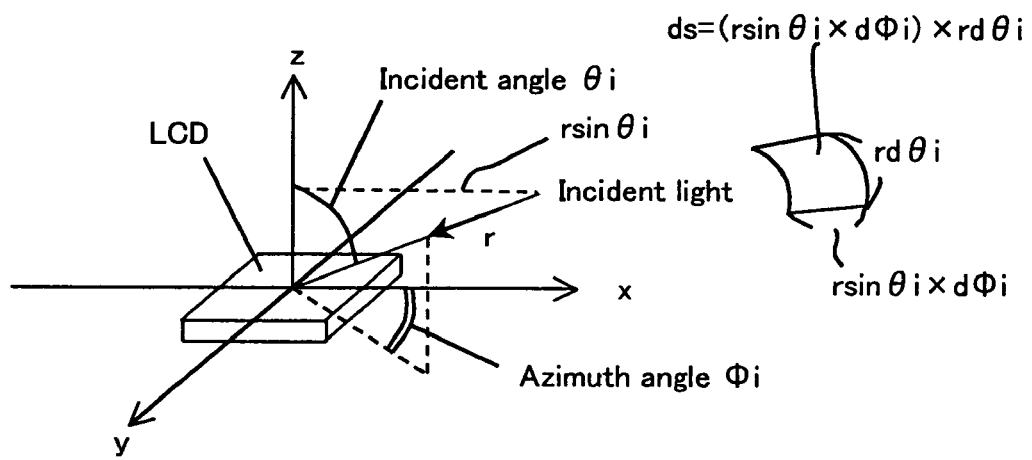
FIG. 20 shows diagrams depicting the incident angle θi and azimuth angle φ1.

To determine the light intensity L to enter the reflection type liquid crystal display device, X-Y-Z axis, incident angle $\theta_i$ and azimuth angle $\phi_i$ are defined as shown in FIG. 20. The incident angle $\theta_i$ is an angle between the Z axis and incident light, and azimuth angle $\phi_i$ is an angle between the incident light and the X axis. If the light intensity per unit area of the sphere shown in FIG. 19 (hereafter integrating sphere) is $I(\theta_i, \phi_i)$, then the light intensity dL is given by.

$$dL = I(\theta_i, \phi_i) \cdot dw$$
$$= I(\theta_i, \phi_i) \cdot ds/r^2$$

Here, ω is a solid angle, ds is a unit area on the spherical surface of the integrating sphere, and r is a radius of the integrating sphere, and if the integrating sphere is a uniform diffuse light, then the above mentioned light intensity I becomes a constant.

Also, the incident light is irradiated onto the display panel from a diagonal direction with incident angle $\theta_i$, so the light intensity irradiated on the display panel is attenuated for sin $\theta_i$.

$$dL = I(\theta_i, \phi_i) \cdot \sin\theta_i \cdot ds/r^2 \quad (1)$$

As shown in FIG. 20, the unit area ds is given by $$ds = (r \cdot \sin\theta_i \cdot d\phi_i) \cdot r \cdot d\phi_i \quad (2)$$

Therefore, if the formula (2) is substituted for formula (1), and the light intensity dL is integrated in the range of incident angle $\theta_i$, 0-π/2, and azimuth angle $\phi_i$, 0-2π, then the incident light intensity L of the display panel is given as follows.

$$L = \int_0^{\theta_i=\frac{\pi}{2}} \int_0^{\phi_i=2\pi} I(\theta_i, \phi_i) \sin\theta_i \cos\theta_i d\theta_i \quad (3)$$

Therefore the light intensity f ($\theta_i$), which enters from the polar $\theta_i$ direction, is given by the function in the integration in formula (3), and is given as follows.

$$f(\theta_i) = I(\theta_i, \phi_I) \sin\theta_i \cos\theta_i \quad (4)$$

Sin $\theta_i$ in the formula (4) results from the area of the diffuse light source of the integrating sphere for each unit incident angle $\theta_i$, and this means that the light source area of the incident light from just above the display panel (incident angle $\theta_i$=0) is small (sin $\theta_i$=0), and the light source area of the incident light from the lateral direction of the display panel (incident angle $\theta_i$=π/2) is wide (sin $\theta_i$=1). The cos $\theta_i$ in the formula (4) is an attenuation component due to the incident angle, and this means that the attenuation of the incident light from just above the display panel (incident angle $\theta_i$=0) is very little (cos $\theta_i$=1), and the attenuation of the incident light from the lateral direction of the display panel (incident angle $\theta_i$=π/2) is large ((cos $\theta_i$=0).

Figure 21:
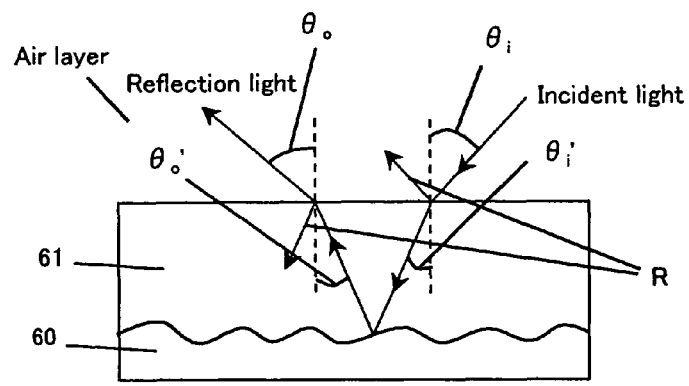
FIG. 21 is a diagram depicting the case when light enters the reflection display device and is reflected.

FIG. 21 is a diagram depicting the case when light enters the reflection type display device and is reflected. In the case of the reflection type liquid crystal device shown in FIG. 2, the refractive index n of the glass substrate at the display side and the liquid crystal layer are roughly 1.5, so as FIG. 21 shows, in the structure it is assumed that the reflector 60 comprising a substrate having the reflection electrode shown in FIG. 21 is covered with the medium 61 with the refractive index n comprised of a liquid crystal layer and a substrate at the display side, which are formed thereon. Then the incident light which enters the air layer at incident angle $\theta_i$ has incident angle $\theta_i'$, in the medium 61, is reflected by the reflector 60 at the reflection angle $\theta_o'$ in the medium 61, and is emitted to the air layer at the reflection angle $\theta_o$.

When the light enters from the air layer to the medium 61, a part of the light becomes reflected light R, and does not enter into the medium, so considering this, the intensity $f(\theta_i')$ of the light which enters the reflector 61 at the incident angle $\theta_i'$ can be given as follows.

$$f(\theta_i') = [1 - R(\theta_i)] \cdot f(\theta_i) \qquad (5)$$
$$= [1 - R(\theta_i)] \cdot I(\theta_i, \phi_i) \sin\theta_i \cos\theta_i$$

Here, R ($\theta_i$) is the reflectance of the light which reflects at the interface of the above mentioned air layer and the medium 61 with the refractive index n. And the following relationship is established between the incident angle $\theta_i$ in the air layer and the incident angle $\theta_i'$ in the medium 61.

$$\sin\theta_i = n\sin\theta_i' \qquad (6)$$

Here, the refractive index of the air layer is 1, and the refractive index of the glass and liquid crystal is n. $\theta_i$ is an incident angle in the air layer, and $\theta_i'$ is an incident angle in the liquid crystal layer.

Figure 22:
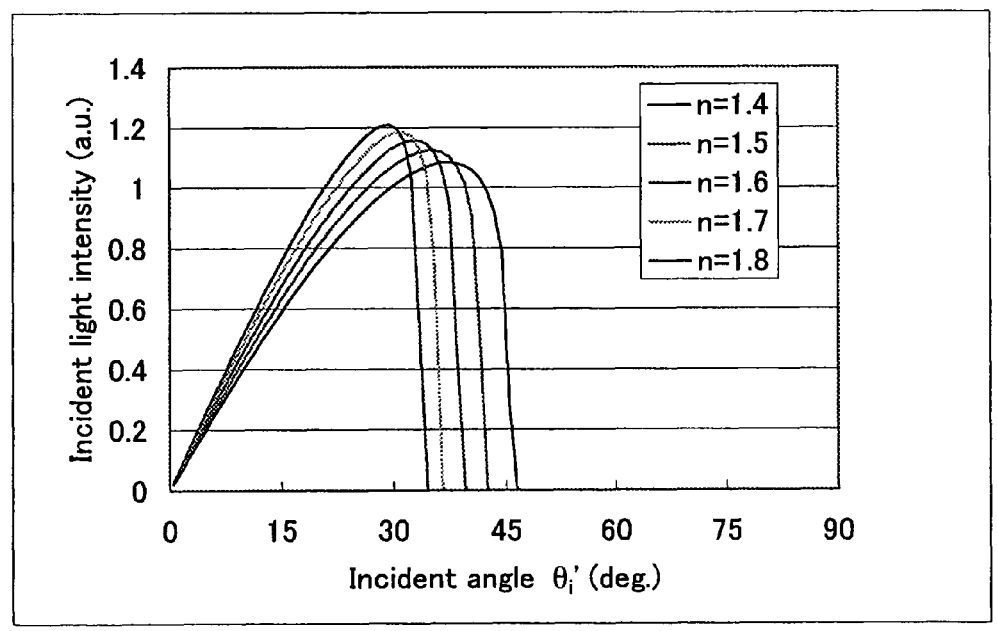
FIG. 22 is a diagram depicting the relationship between intensity f (θ$_i$') and incident angle θ$_i$' of light entered into the reflector.

FIG. 22 is a diagram depicting the relationship between the intensity of light $f(\theta_i')$ to enter the reflector 61 and the incident angle $\theta_i'$, calculated by substituting the formula (6) for the formula (5). Here the light intensity was calculated as $I(\theta_i, \phi_i)=1$. As FIG. 22 shows, if a uniform diffuse light from an integrating sphere is assumed, the intensity of the incident light to the reflector 60 increases as the incident angle from the incident angle $\theta_i'=0$ increases, the intensity of the incident light becomes the maximum in a certain range of the incident angle $\theta_i'$, and the incident light intensity attenuates considerably at around the incident angle 45°. In other words, an incident angle $\theta_i'$, at which the incident light intensity becomes maximum, exists, and the incident angle differs depending on the refractive index n of the medium.

Figure 23:
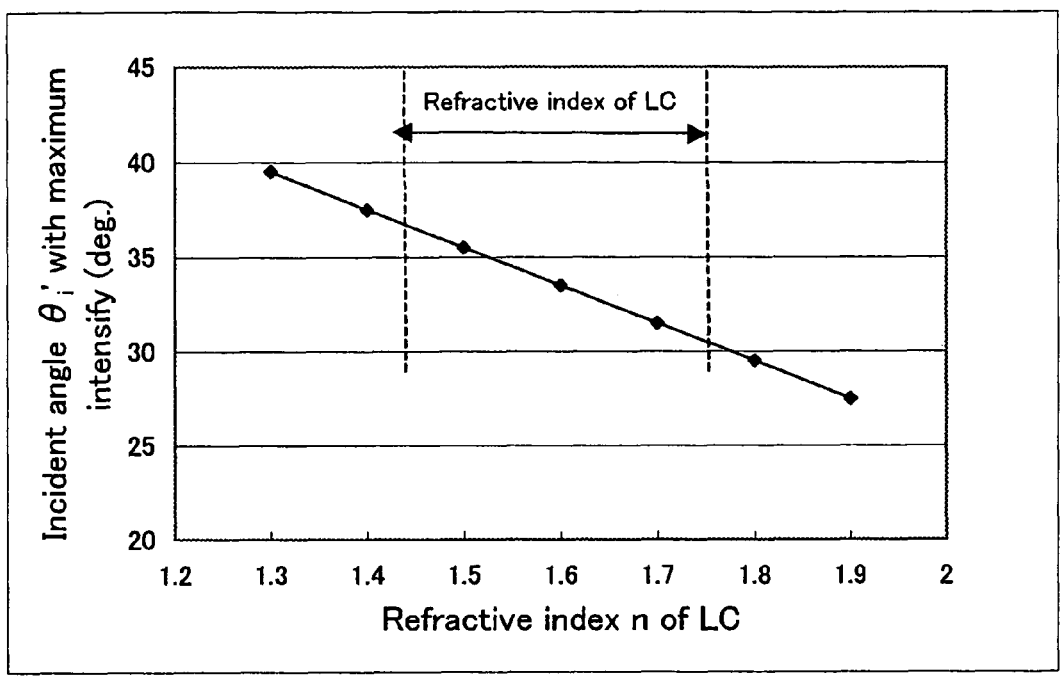
FIG. 23 is a diagram depicting the relationship between the incident angle θ$_i$', when the incident light intensity of FIG. 22 is at the maximum and refractive index n of the medium.

FIG. 23 is a diagram depicting the relationship between the incident angle $\theta_i'$, when the incident light intensity in FIG. 22 becomes the maximum, and the refractive index n of the medium. As FIG. 23 shows, as the refractive index n of the liquid crystal increases, the incident angle $\theta_i'$, when the incident light intensity becomes the maximum, decreases. Since the typical refractive index of a liquid crystal is about 1.4-1.8, the incident angle $\theta_i'$, when the incident light intensity becomes the maximum, is about 30-38°.

Figure 24:
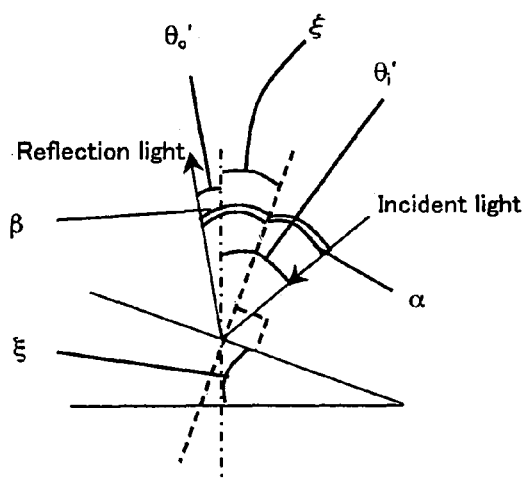
FIG. 24 is a diagram depicting the relationship of the incident angle, reflection angle and inclination angle with respect to the inclined face of the reflection undulation.

Next we will examine an incident light having the incident light intensity distribution shown in FIG. 22, which reflects on the inclined faces of the undulation of the reflector 61. FIG. 24 is a diagram depicting the relationship between the incident angle, reflection angle and inclination angle with respect to the inclined face of a reflection bump. The incident light and reflected light are symmetrical with respect to a line perpendicular to the inclined face, and a local incident-angle $\alpha$ on the micro-mirror face is equal to a local reflection angle $\beta$, so the inclination angle $\xi$, incident angle $\theta_i'$, and reflection angle $\theta_o'$, have the following relationship.

$$2\xi = \theta_i' + \theta_o' \qquad (7)$$

Generally a display is often observed in a direction perpendicular to the display panel. So when light which enters the reflector having undulation at the incident angle $\theta_i'$ is reflected in the 0° direction, the formula (7) becomes $\xi=\theta_i'/2$. In other words, light can be reflected in a direction perpendicular to the display panel when the inclination angle $\xi$ is ½ of the incident angle $\theta_i'$.

As FIG. 22 shows, the distribution of the incident light which enters the bump faces of the reflector with respect to the diffuse light of the integrating sphere has a peak in incident angle area 0-45°. Therefore it is preferable to set the distribution of the inclined faces of the undulation faces of the reflector to a distribution corresponding to the light intensity distribution in FIG. 22. In other words, it is preferable that the existence probability of the inclination angles corresponding to the incident angles at which light intensity is high is increased, and the existence probability of the inclination angles corresponding to the incident angles at which light intensity is low is decreased, so that the over all reflected light intensity is increased.

Figure 25:
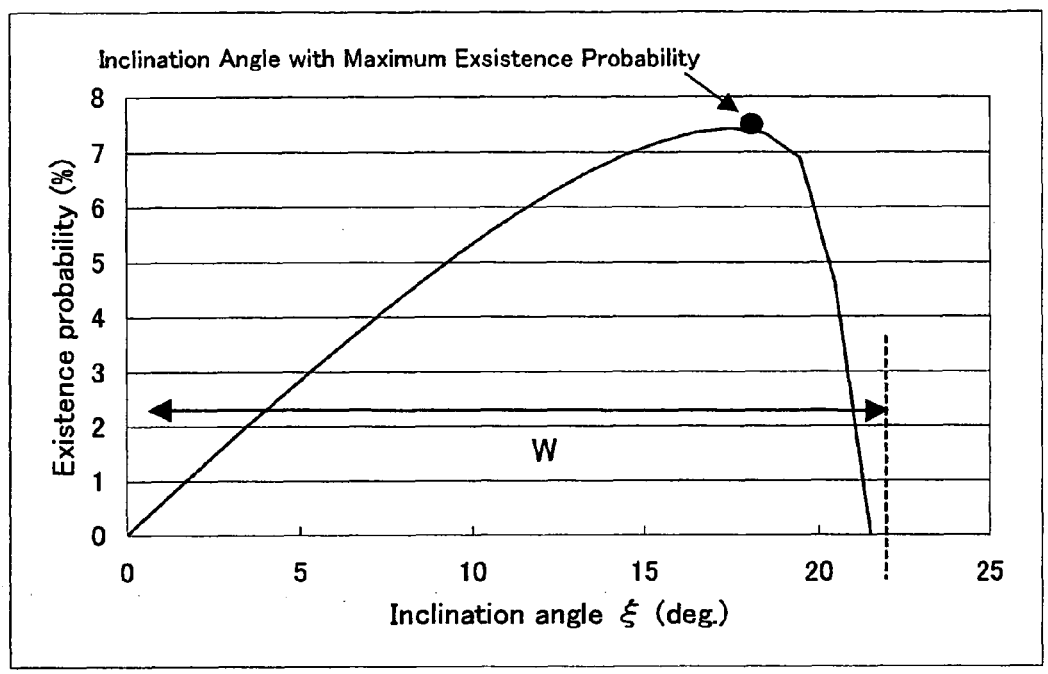
FIG. 25 is a diagram depicting the distribution of the existence probability of the inclination angle corresponding to the incident light intensity distribution in FIG. 22.
Figure 26:
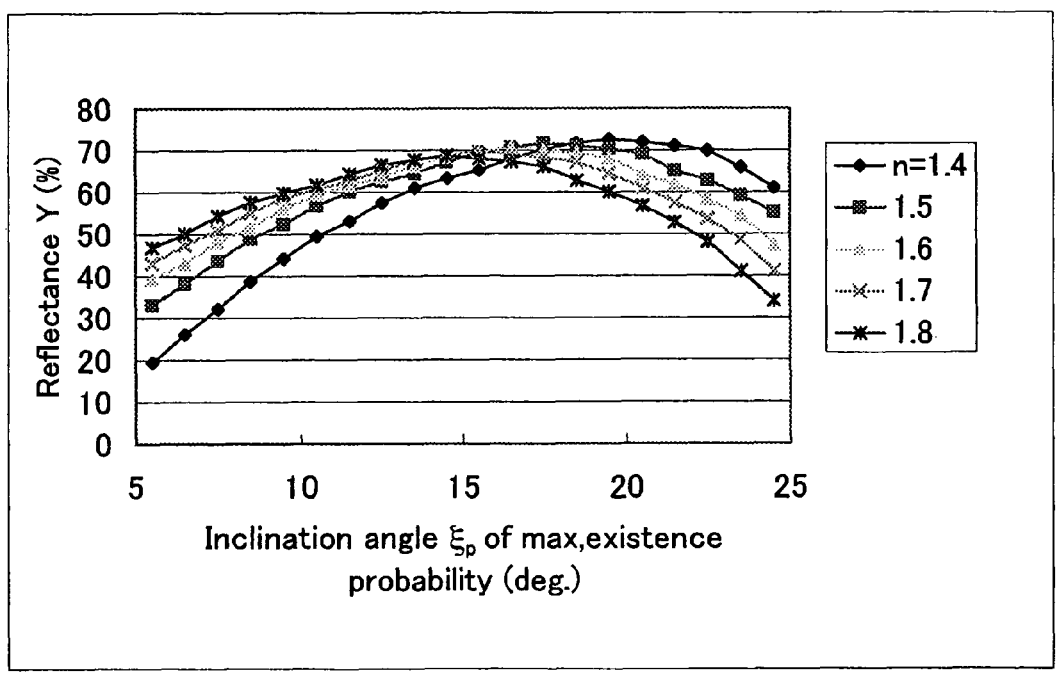
FIG. 26 is a diagram depicting the simulation result of reflection characteristics.

FIG. 25 is a diagram depicting the distribution of existence probability of the inclination angle corresponding to the incident light intensity distribution in FIG. 22. The example in FIG. 25 shows the case when the refractive index n=1.5 in FIG. 22, and is standardized so that the total sum of the probability becomes 1. The abscissa indicates the inclination angle $\xi$ of the reflection bump face, and the ordinate indicates the existence probability (%). Here, the reflectance of a sample which has the existence probability distribution of the inclination angle shown in FIG. 25 when the inclination angle at which the existence probability is the maximum is determined. FIG. 26 shows the simulation result of such refraction characteristics. Specifically, the inclination angle at which the existence probability is at the maximum is changed by changing the width W of the distribution shown in FIG. 25, and reflectance Y at this time was computed.

As FIG. 26 shows, the range of the inclination angle $\xi(=\theta_i'/2)$ at which the existence probability is the maximum is the range where the reflectance is the highest in the area of $\xi$=about 15-19° ($\theta_i'$=about 30-38°). In other words, in order to increase over all reflectance, it is preferable to maximize the existence probability of the inclination angle $\xi$=15-19°, at which the incident light with incident angle $\theta_i'$=30-38°, where the incident light intensity shown in FIG. 22 has a peak value, and can be reflected in a direction perpendicular to the display panel.

As described above, in order to reflect light effectively under the uniform diffused light of the integrating sphere, it is theoretically clear that the inclination angle by the undulation for reflection must have the maximum existence probability in about a 15-19° range.

Figure 27:
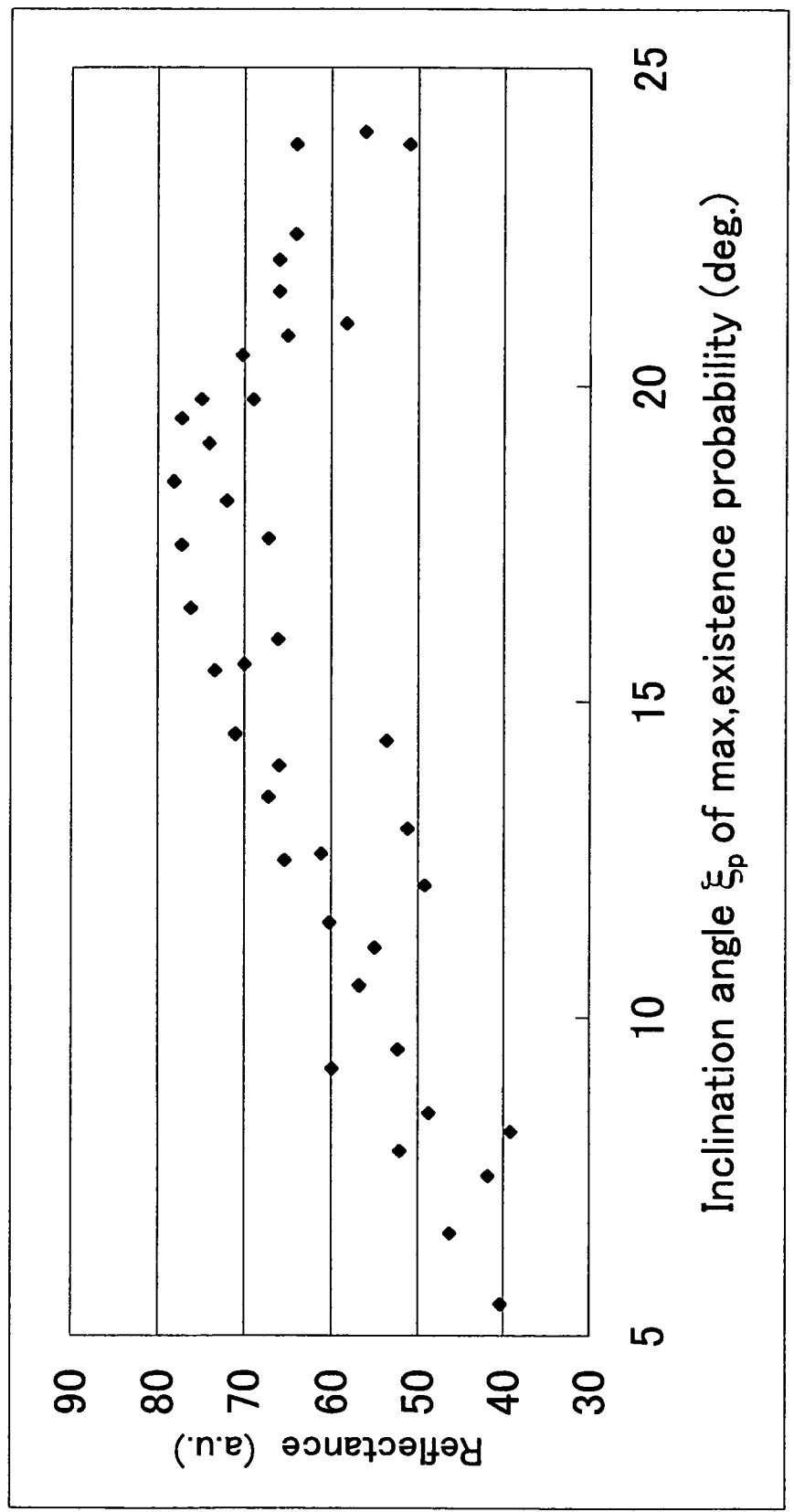
FIG. 27 is a diagram depicting the result of measuring reflectance with respect to the uniform diffused light of an integrating sphere using an actual prototype sample.

FIG. 27 is a diagram depicting the result of measuring the reflectance with respect to the uniform diffused light of an integrating sphere using an actual prototype sample. In the prototyped reflector, the relationship between the inclination angle $\xi_p$ when the existence probability is at the maximum and the measured reflectance is shown.

Figure 28A:
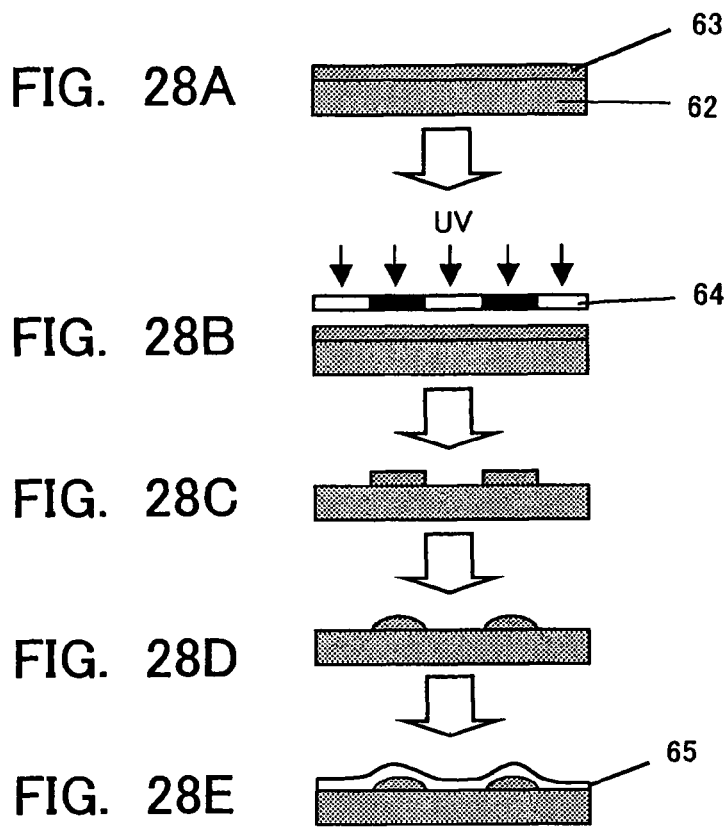

FIG. 28 shows cross-sectional views depicting a method of forming the reflector prototype. As FIG. 28A shows, resist (LC-200 made by Shipley) 63 is spin-coated on the glass substrate 62 for 20 seconds at 1000-2000 rpm. After pre-baking for 30 minutes at 90° C., UV exposure is performed using the mask 64, as shown in FIG. 28B. Then using a developer (MF 319 made by Shipley), development is performed so as to form the convex parts on the glass substrate, as shown in FIG. 28C. Then as FIG. 28D shows, post-bake is executed for 60 minutes at 120-200° C. so as to round the convex parts. Then an aluminum layer 65 is deposited for 200 nm, as shown in FIG. 28E, so as to fabricate the reflector.

Figure 28F:
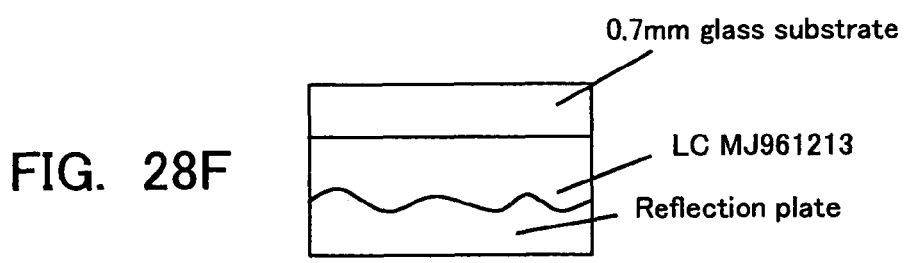

A liquid crystal layer was formed between the reflector and the glass substrate formed as above, and the reflection type liquid crystal display device, as shown in FIG. 28F, is fabricated. Here liquid crystal material MJ 961213 made by Merck was used for the liquid crystal layer, and the thickness thereof was controlled by a spacer with a 3.5 μm diameter. Then the reflectance when a diffused light is entered using an integrating sphere into the reflection type liquid crystal display device prototype fabricated like this was measured. Also the inclination angle distribution of the undulation of the reflector of the prototype and the inclination angle $\xi_p$ at which the existence probability becomes the maximum was determined. FIG. 27 shows the result.

According to this experiment result, a maximum reflectance is obtained when the inclination angle $\xi_p$ at which the existence probability is the maximum is set to around 16-19°. This experiment result roughly supports the simulation result shown in FIG. 26. Compared with the case of the 10° inclination angle, which has been regarded as the optimum value, the sample which the $\xi_p$ inclination angle, at which the existence probability is at the maximum, is around 16-19° has the higher reflectance.

Figure 29A:
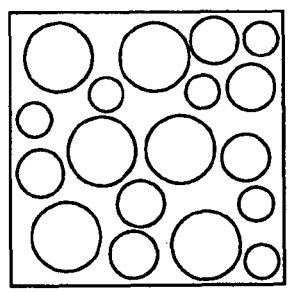
FIGS. 29A-29B show diagrams depicting examples of the pattern of the mask 64 for forming undulation of the reflector.
Figure 29B:
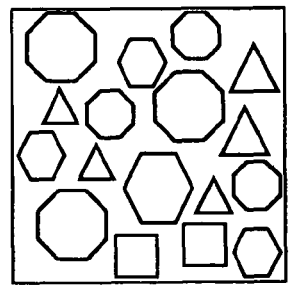

FIG. 29 shows diagrams depicting examples of the pattern of the mask 64 for forming undulation of the reflector. FIG. 29A is an example when the patterns of circles which sizes are different coexist, and FIG. 29B is an example when polygons, such as a triangle, square, hexagon and octagon, coexist. The present invention, however, is not limited to these patterns.

As another example of forming undulation for reflection, a process, where the distribution of thermal deformation characteristics is formed by irradiating UV as shown in FIGS. 3-6 and micro-grooves are formed by final baking thereafter, can be used. The bump shape of the micro-grooves can be controlled by the above mentioned process conditions, so the bump shape is controlled so that the inclination angle $\xi_p$ at which the existence probability is the maximum becomes around 15-19°.

In the present embodiment, the inclination angles of the undulation of the reflector distribute in at least a 0°-25° range, and the existence probability is the maximum at around 15-19°, so a reflection liquid crystal display device having higher reflectance in various environments can be provided.

[Control of Inclination Angle Distribution of Reflector (2)]

Figure 30:
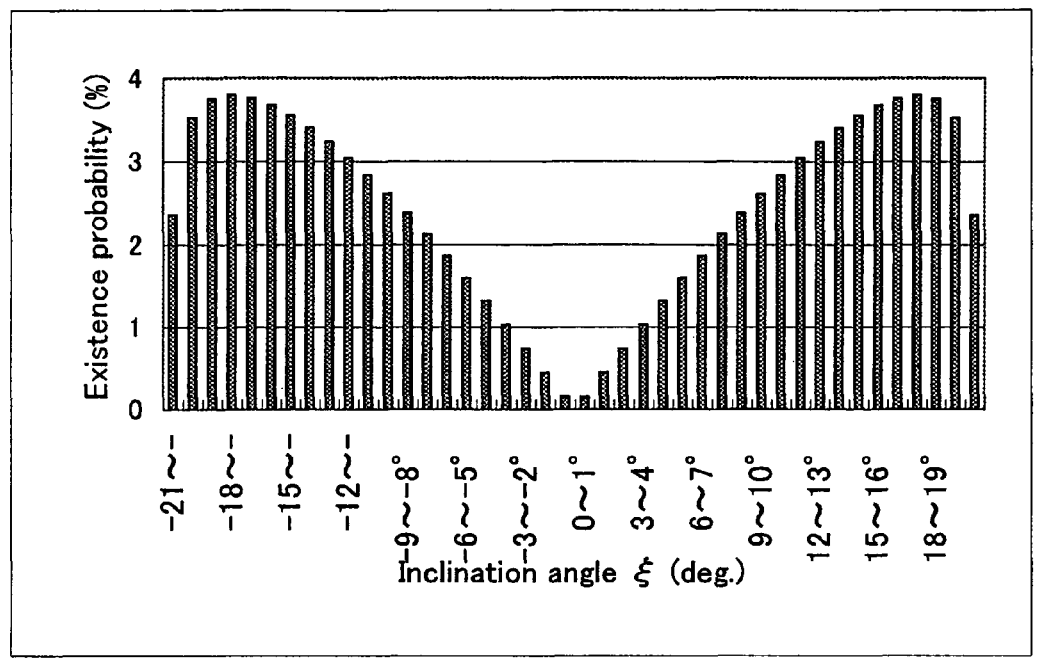
FIG. 30 is a diagram depicting the distribution of the inclination angles of the undulation of the reflector to obtain high reflectance with respect to the diffused light of the integrating sphere.

FIG. 30 is a diagram depicting the distribution of the inclination angles of the undulation of the reflector to obtain high reflectance with respect to the diffused light of the above mentioned integrating sphere. The abscissa indicates the inclination angle $\xi$, and the ordinate indicates the existence probability thereof. As described above, it is preferable that the existence probability of the inclination angles be a distribution such that the incident light of the incident angle, at which the incident intensity to the reflector is high, is reflected more in a direction perpendicular to the display panel. FIG. 30 shows a distribution where the existence probability of inclination angles around +15-19° and inclination angles around −15-19° is at the maximum. The + side and the − side exist because when the inclination angle is viewed from a predetermined direction of the display panel, the inclination angle of the incident light from one direction is shown at the + side, and the inclination angle of the incident light from the opposite direction is shown at the − side. Therefore if the distribution diagram in FIG. 30 is folded with the inclination angle 0° as the center, the inclination angle distribution becomes as shown in FIG. 25.

Figure 31:
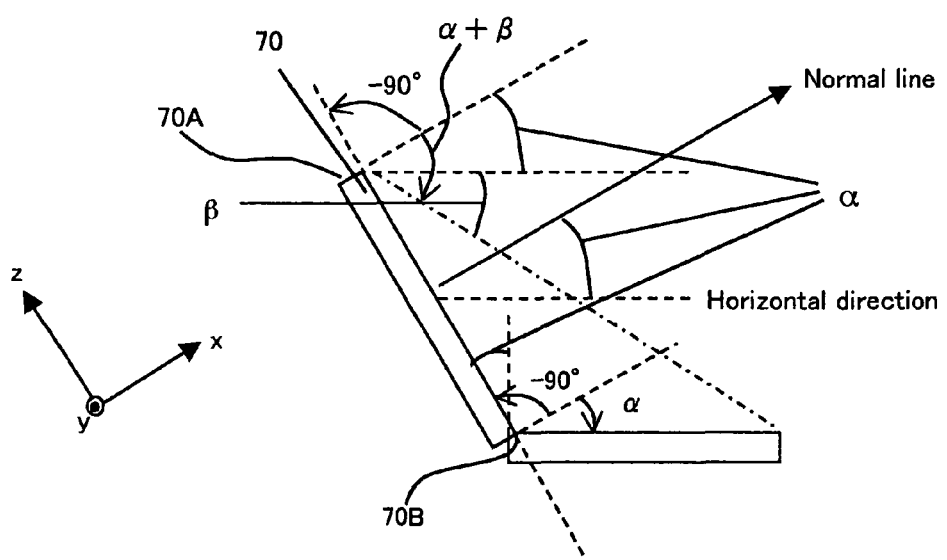
FIG. 31 is a diagram depicting a state when the reflection type liquid crystal display device is mounted as a monitor of a notebook personal computer.

A liquid crystal display is often used as a display panel of a notebook personal computer. FIG. 31 is a diagram depicting a state when the reflection type liquid crystal display device is mounted as the monitor of a notebook personal computer. As FIG. 31 shows, the reflection type liquid crystal display device 70 is often used in a state where angle α is inclined from the horizontal direction. In this case, the display device 70 is a plane perpendicular to the paper face, as shown in FIG. 31. The directions of the X, Y and Z axes are defined as illustrated here.

Considering incident light to the display device 70, the incident angle $\theta_i$ distribution along the XY plane of the coordinate is $\theta_i=-90\text{-}90°$, since nothing blocks incident light. The incident angle distribution along the XZ plane of the coordinate, on the other hand, is not always $\theta_i=-90\text{-}90°$, since incident light is blocked by the keyboard part. In other words, the incident angle range differs between the highest position 70A and the lowest position 70B of the display device 70. The highest position 70A has the widest incident angle range, $\theta_i=-90-\alpha+\beta°$, and the lowest position 70B has the narrowest incident angle range, $\theta_i=-90-\alpha°$.

Therefore, in the incident lights in the XZ plane direction along the direction perpendicular to the display panel, almost no light enters from the incident angle α−90° (or α+β°−90°). Therefore for the inclination angle of the micro-mirror faces arranged in the XZ plane direction of the display panel, incident angles for reflecting the incident light, which enters from this angle range, to the normal line (0°) direction of the display panel, are unnecessary.

For example, if the inclination of the display panel is α=300 and the refractive index of the liquid crystal layer and the glass substrate is $n_{LC}=1.5$, then the inclination angle for reflecting light which enters at 30-90° to the 0° normal line direction is 10-21°, according to the above formulas (6) and (7). In other words, an inclination angle in a 10-21° range is unnecessary for the inclination distribution of undulation in a direction perpendicular to the display panel (XZ plane direction).

Figure 32:
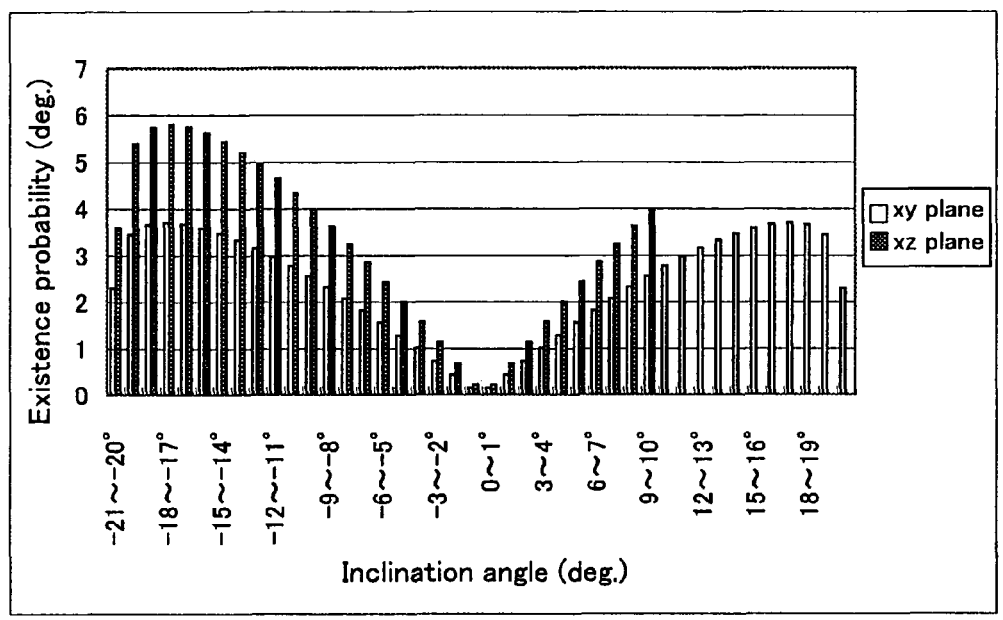
FIG. 32 is a diagram depicting the distribution of the inclination angles in the XY plane direction and XZ plane direction having high reflectance when the reflection type liquid crystal device is used as a display device of a notebook personal computer.
Figure 33:
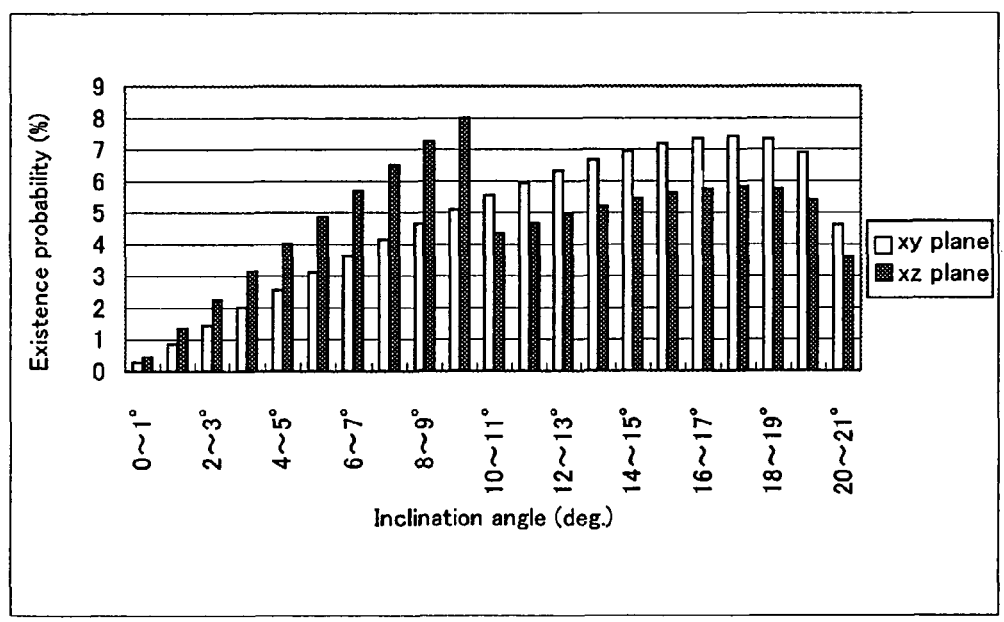
FIG. 33 is a diagram depicting the distribution when the inclination angle distribution in FIG. 32 is folded at the inclination angle 0° as the center.

Therefore it is desirable that the distribution of the inclination angles in the XY plane direction and the XZ plane direction are as shown in FIG. 32. In other words, the inclination angle distribution in the XY plane direction is the same as the distribution shown in FIG. 30, and for the inclination angle distribution in the XZ plane direction, the − side is the same as in FIG. 30, and the + side is distribution which does not exist in a 10-21° range. FIG. 33 shows the distribution when the distribution in FIG. 32 is folded with the inclination angle 0° as the center.

FIG. 33 shows the inclination angle distribution formed by the undulation of the reflector, including the distribution in the inclined face in the XY plane direction, and distribution in the inclined face in the XZ plane direction. As FIG. 33 shows, when a notebook personal computer is tilted and used, it is preferable that the distribution of the inclined face in the horizontal direction in the display panel is set such that the existence probability is the maximum in a 15-19° inclination angle range, and the distribution of the inclined face in the vertical direction in the display panel is set such that the existence probability has a peak in an 8-10° inclination angle range, and in a 15-19° inclination angle range. In this way, if the angle distribution of the inclined face by reflection undulation is set such that one direction has one peak of existence probability and another direction has two peaks of existence probability according to the direction of the display panel, maximum reflectance can be implemented, even if the display panel is used in an environment which has anisotropy in the incident light direction.

The present inventors manufactured a reflector prototype with the above mentioned inclined face distribution, and confirmed the reflectance thereof. FIG. 34 shows cross-sectional views depicting a method of forming this reflector sample. As FIG. 34A shows, resist (e.g. LC-200 made by Shipley) 63 is spin-coated on the glass substrate 62 for 20 seconds at 1000 rpm. After pre-baking for 20 minutes at 90°, UV exposure is performed using the mask 64, as shown in FIG. 34B. Then using a developer (e.g. MF 319 made by Shipley), development is performed, and convex parts are formed by resist on the glass substrate, as shown in FIG. 34C. The processes in FIG. 34A-34C are repeated four times by sequentially using the mask patterns (a)-(d) shown in FIG. 35, so as to form convex parts which inclination angles are different, as shown in FIG. 34D. Then as FIG. 34E shows, a post-bake is performed for 80 minutes at 200° C. so as to round the convex parts. Then aluminum 66 is deposited for 200 nm, as shown in FIG. 34F, so as to fabricate the reflector.

Figure 36:
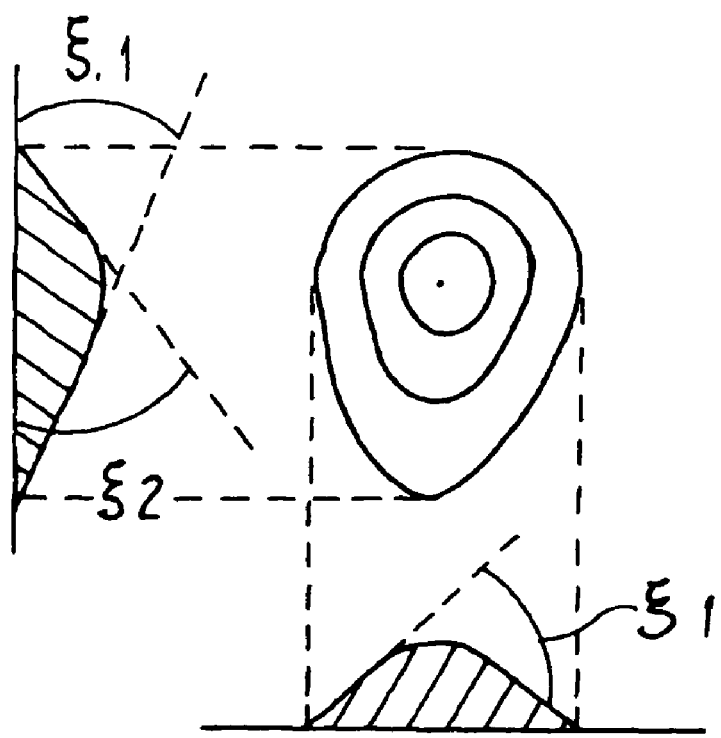
FIG. 36 is a plan view and cross-sectional view depicting an example of the convex part in FIG. 34.

FIG. 36 shows a plane shape and cross-sectional shape depicting an example of the convex part of the reflector formed as above. The plane shape of the convex part 67 has different inclined faces in the vertical direction V of the substrate 62, and has the same inclined faces in the horizontal direction H of the substrate 62. In the plan view shown in FIG. 36, contour lines are shown in the convex part 67 so as to show the shape of the inclined face thereof. Since the convex part is rounded by the post-bake, the inclination angle distribution is in about a 0-20° range. And in the vertical direction V of the substrate, inclined faces ($\xi 1 > \xi 2$) are different, so there are two areas where the existence probability is at a peak, as shown in FIG. 33, and in the horizontal direction H of the substrate, the inclined face ($\xi 1$) is symmetrical, so there is one area where the existence probability is at a peak, as shown in FIG. 33.

By changing the direction of the undulation for reflection between the horizontal direction and the vertical direction as above, the distribution of the inclination angle in the horizontal direction and the distribution of the inclination angle in the vertical direction can be different. As FIG. 36 shows, the distribution of the inclination angles in the horizontal direction and the inclination angles in the vertical direction can be different from each other by combining a semi-circular shape and semi-elliptical shape, as shown in FIG. 36.

The present inventors measured the shape using a non-contact three-dimensional shaped measurement device, nh-3, made by Hishiko, and determined the inclination distribution of the reflector prototype. FIG. 37 shows the measurement result of the inclination angle distribution of the reflector prototype. As FIG. 37 shows, the reflector prototype has the maximum existence probability at absolute values 8° and 18°. For comparison, FIG. 37 also shows the inclination angle distribution of a reflector which maximum existence probability is at 0° and 10°, and also shows the inclination angle distribution of prior art 1 and prior art 2 respectively.

FIG. 38 is a rough cross-sectional view of the reflection type liquid crystal display device created using the above mentioned reflector prototype. The liquid crystal layer (e.g. liquid crystal material MJ 961213 made by Merck) is injected between the reflector and the glass substrate while controlling the thickness with a 3.5 μm diameter spacer. The reflection type liquid crystal display device is secured in a state inclining 30° with respect to a vertical direction, uniform diffused light of the integrating sphere is irradiated, and reflectance was measured using a luminance meter (e.g. BM-5 made by Topcon). FIG. 39 shows the measurement result of the reflectance thereof. As FIG. 39 shows, if the reflector of the present invention is used, reflectance is 61%, where the reflectance improved 10-25% compared with 31% and 53% of the prior arts 1 and 2.

FIG. 33 shows the ideal inclination angle distribution where the refractive index n of the liquid crystal layer and the glass substrate is 1.5, and the angle with respect to the horizontal line of the reflection type liquid crystal display device (inclination angle α shown in FIG. 31) is α=30°. When the refractive index $n_{LC}$ of the liquid crystal layer and the inclination angle α of the reflection liquid crystal display device are changed, the inclination angle range when the existence probability is at the maximum in the ideal undulation for reflection was examined respectively.

Figure 40:
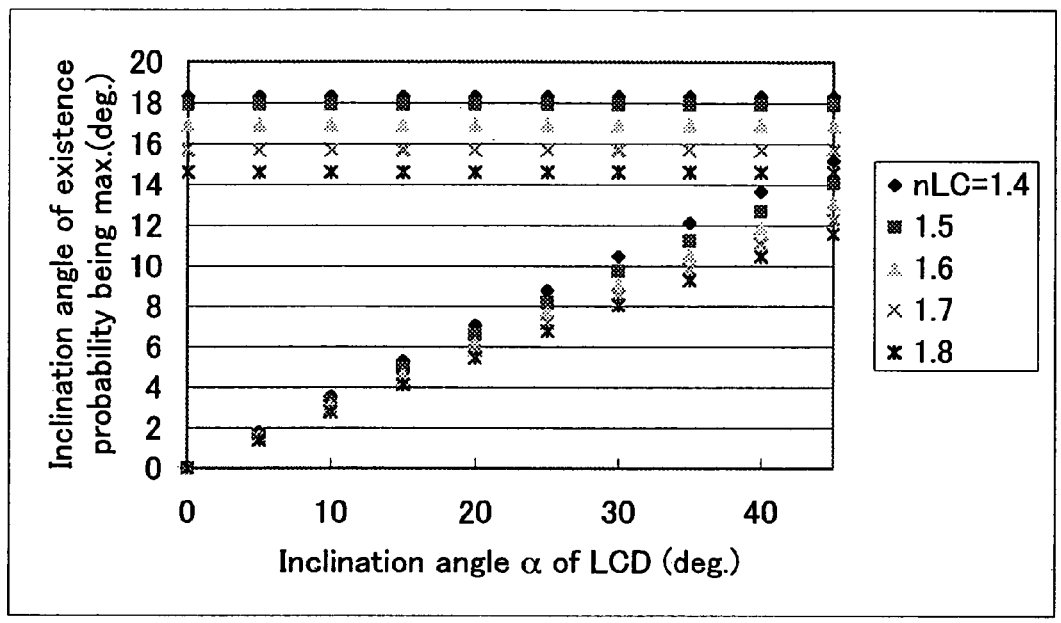
FIG. 40 is a diagram depicting the inclination angle of a reflection type liquid crystal display device, and the inclination angle range when the existence probability becomes the maximum with respect to the refractive index of the liquid crystal layer.

FIG. 40 is a diagram depicting the inclination angle α of a reflection type liquid crystal display device, and the inclination angle range when the existence probability becomes the maximum with respect to the refractive index of the liquid crystal layer. Since the refractive index $n_{LC}$ of a typical liquid crystal material is 1.4-1.8, the refractive index $n_{LC}$ was changed in a 1.4-1.8 range. In a general use case, the inclination α tends to increase as the size of the reflection type liquid crystal display device size decreases, and the inclination α of the display panel is changed in a 0-45° range.

When the inclination angle α of the display panel is 30°, as shown in FIGS. 32 and 33, it is desirable that the existence probability of the inclination angle of the undulation becomes the maximum in a 15-19° range on one hand, and the existence probability of the inclinations angles of the undulation becomes the maximum in two ranges, 8-10° and 15-19° on the other hand. In the case when the inclination angle α of the display panel is 0°, that is the case when the display panel is set vertically, for the inclination angle $\xi$ of the display panel in the vertical direction, the existence probability of the inclination angles of the undulation is the maximum in a 15-19° range, since mainly the incident light from above is reflected in the vertical direction. And there is little incident light coming from the bottom, so an inclined face inclining downward is unnecessary. In the case when the inclination angle α of the display panel is 90°, that is the case when the display panel is set horizontally, it is preferable that the existence probability of the inclination angles of the undulation is at the maximum in a 15-19° range, although this is not shown in FIG. 40. The case when the display panel is horizontal is the same as the distribution example shown in FIG. 30.

As FIG. 40 shows, when the inclination angle α of the display panel is in a 0-45° range, the reflectance can be at the maximum if one inclination angle where the existence probability in the undulation for reflection is at the maximum is 0-16°, and the other inclination angle is in a 14-19° range. As the refractive index $n_{LC}$ is smaller, the inclination angle to be at the maximum tends to increase.

For a notebook personal computer, the inclination of the display panel differs depending on the user. So it is desirable to form a plurality of areas, where the existence probability of the inclination angle of the undulation for reflection is at the maximum, in the pixel area, so that the maximum reflectance can be implemented at a plurality of inclinations. For example, as FIG. 40 shows, a first combination of 8-10° and 15-19° and a second combination of 10-12° and 15-19° coexist in the same pixel area, as an inclination angle area where the existence probability is at the maximum, which was determined corresponding to cases when the inclination angle α of the display device is 30° and 40°. Or three combined areas determined corresponding to cases when the inclination angle α of the display device is 30°, 35° and 40°, and which coexist. Or three convex patterns coexist. By this, a relatively large reflectance can be implemented even if the inclination angle of display panels are somewhat different.

Using a reflection electrode having the above mentioned inclination angle distribution of undulation for reflection for a pixel electrode, the reflection type liquid crystal display device with the structure shown in FIG. 2 is formed, and a desired display can be implemented by applying a predetermined electric field from the pixel electrode and the transparent electrode of the display side to the liquid crystal layer 34, so as to provide a double defraction function to the liquid crystal layer 34. In other words, the liquid crystal layer 34 is driven in field effect double defraction mode. Also, a guest-host type liquid crystal display device can be implemented by including dye into the liquid crystal layer 34.

[Example of Undulation for Reflection where Different Directivities Coexist]

Japanese Patent Laid-Open No. H11-295750 discloses a reflection type liquid crystal display device which uses a pixel electrode as a reflection electrode. According to this disclosure, the pixel electrode is divided into two areas, bump shapes having reflection characteristics with strong directivity are formed in one area, and bump shapes having reflection characteristics with strong diffusibility are formed in the other area.

However, in the case of a higher precision liquid crystal display device, the pixel area becomes smaller, and it is probably difficult to form different bump shapes respectively for the pixel areas divided into two, as seen in the prior art.

Figure 41:
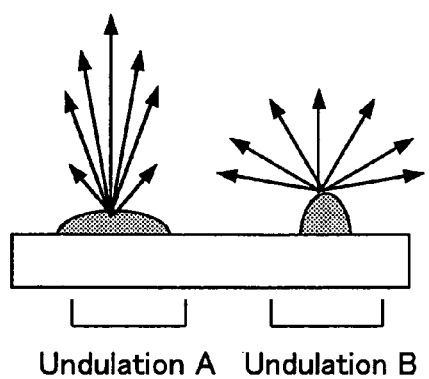
FIG. 41 is a cross-sectional view depicting two reflection bump shapes coexisting in a pixel area.

Therefore in the present invention, bump shapes having reflectance characteristics with strong directivity and bump shapes having reflection characteristics with strong diffusibility coexist in a pixel area. FIG. 41 is a cross-sectional view depicting two reflection bump shapes coexisting in such a pixel area. Bump A has a gentle inclined face with a thin film thickness, where the top face is relatively flat, so reflected light is directed to the vertical direction. And bump B, on the other hand, has a sharp inclined face with thick film thickness, the top face protrudes, so reflected light diffuses widely.

Figure 42:
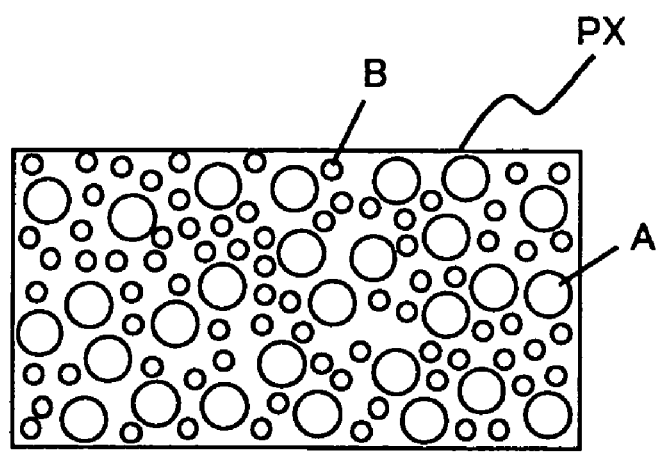
FIG. 42 is a plan view of the pixel area PK in the present embodiment.

FIG. 42 is a plan view of the pixel area PX in the present embodiment. As illustrated, bump A and bump B, shown in FIG. 41, coexist in the pixel area PX.

Figure 43:
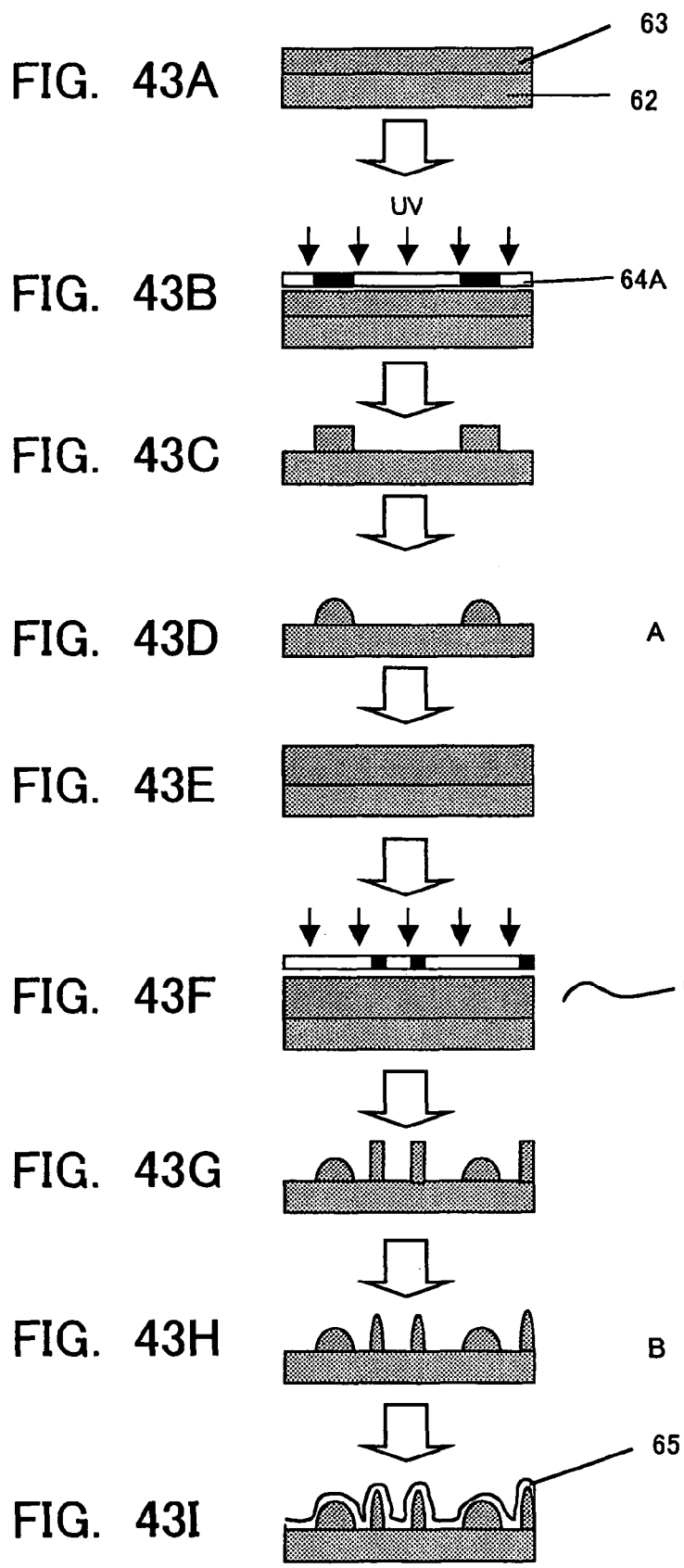
FIGS. 43A-43I show cross-sectional views depicting the manufacturing process for forming the undulation for reflection in FIG. 42.

FIG. 43 shows cross-sectional views depicting the manufacturing process for forming the undulation for reflection in FIG. 42. At first, as FIG. 43A shows, resist (e.g. LC-200 made by Shipley), which is a photo-sensitive resin, is spin-coated for 20 seconds at 2000 rpm on the glass substrate 62. After pre-bake is performed for 20 minutes at 90° C., UV exposure is performed using the mask 64A shown in FIG. 43B. Then using a developer (e.g. MF 319 made by Shipley), development is performed so as to form the convex part corresponding to bump A on the glass substrate 62, as shown in FIG. 43C. Then, as FIG. 43D shows, a post-bake is executed for 80 minutes at 200° C., so as to round the convex part to form bump A.

Then as FIG. 43E shows, the resist is spin-coated for 20 seconds at 1000 rpm. By this, a resist layer thicker than the above mentioned resist can be formed. After pre-baking for 20 minutes at 90° C., UV exposure is performed using the mask 64B, as shown in FIG. 43F. Then development is performed using the above mentioned developer, and a convex part corresponding to bump B is formed on the glass substrate, as shown in FIG. 43G. Then a post-bake is performed for 80 minutes at 200° C., as shown in FIG. 43H to round the convex part, and bump B is formed. Since this post bake is performed at a temperature lower than that for forming bump A, sagging of the thick resist film by heating is less, and bump B with stronger diffusibilty can be formed.

Then as FIG. 43I shows, the reflector (pixel electrode) is fabricated by depositing aluminum 64 for 200 nm. As mentioned above, the roundness of the undulation can be changed by changing the resist film thickness and the post-bake temperature between bump A and bump B, and a reflection face, where undulation with different directivity during scattering coexist, can be created.

As mentioned above, it is preferable that the reflector of the reflection type liquid crystal display device reflect incident light from various directions to a direction perpendicular to the display face. Therefore, when the resist layer is patterned and rounded by baking to form the inclined face, it is preferable that the inclined face direct 360°. Therefore a circular pattern has been proposed as a pattern of the resist film. Examples are disclosed in Japanese Patent Laid-Open No. H11-337935, Japanese Patent Laid-Open No. H11-337964, and Japanese Patent Laid-Open No. H5-281533. These patents proposed forming the circular patterns at random so as to prevent the formation of moiré patterns by the interference of reflected light, or forming doughnut patterns with a large radius and small circular patterns with a small radius at random, so as to improve the reflection characteristics.

Figure 44:
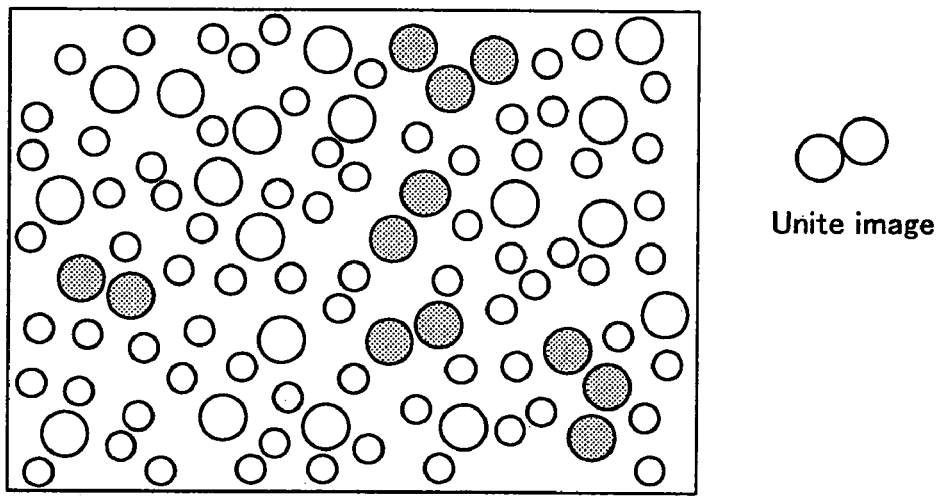
FIG. 44 is a diagram depicting a circular pattern example of a conventional resist.

Japanese Patent Laid-Open No. H5-281533 discloses forming coexisting large circular patterns and small circular patterns at random. An example is shown in FIG. 44. However, if large circular patterns with a large radius are arranged at random, adjacent resist patterns unite by sagging in a cross-sectional shape by heating during the post-baking process after exposure and development. The shaded circular patterns shown in FIG. 44 show the state when the patterns are too close to each other, and which unite during baking.

Figure 45:
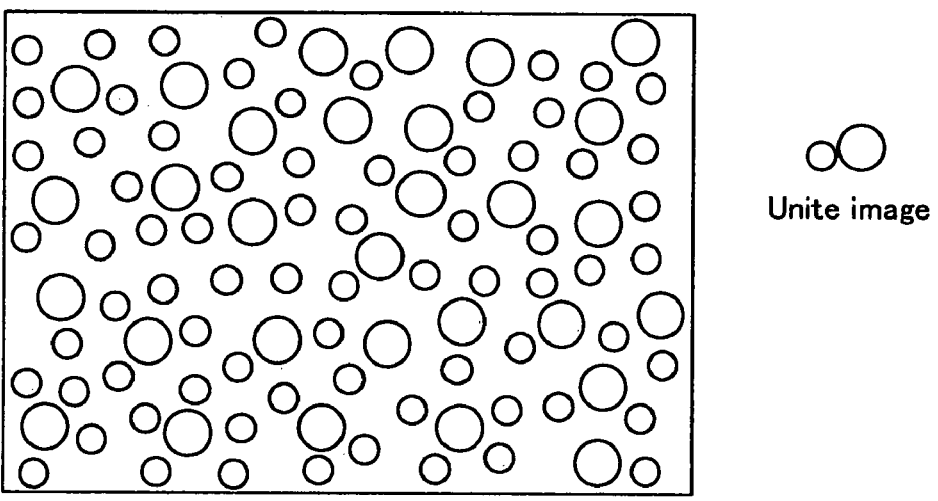
FIG. 45 is a diagram depicting a circular pattern example of resist in the present embodiment.

So in the present embodiment, as FIG. 45 shows, the circular patterns with a large radius and circular patterns with a small radius coexist in the resist pattern, and are arranged such that the distance between a large circular pattern and a small circular pattern is always smaller than the distance between large circular patterns. In other words, a large circular pattern coming too close to another large circular pattern is prevented. If possible, small circular patterns are arranged around a large circular pattern, so that large circular patterns do not come close to each other. By this, the density of an inclined face can be increased, and areas where patterns are united during baking can be decreased.

FIG. 46 shows diagrams depicting the resist pattern of the present embodiment.

Figure 46A:
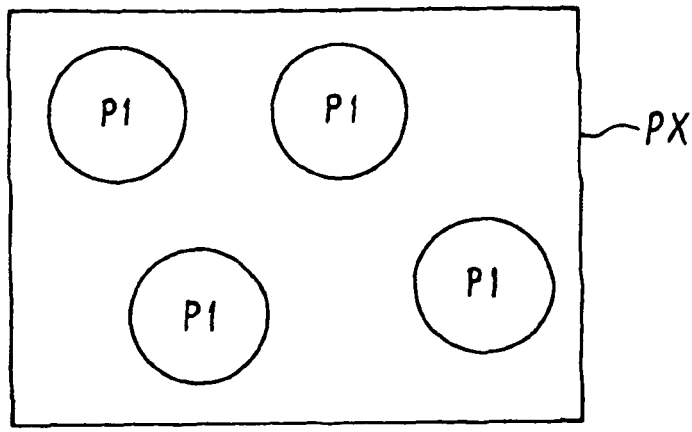
FIGS. 46A-46C show diagrams depicting the circular pattern in FIG. 45.

FIG. 46A is an example when relatively large circular patterns are arranged. Four large circular patterns P1 are arranged in the pixel area PX. The resist pattern must have a certain size. If the pattern is too small, the inclination angle will be insufficient because of sagging in the cross-sectional shape during post-bake. In the case of the pattern in FIG. 46A, however, reflectance cannot be increased since the density of the inclined face to be formed is low.

Figure 46B:
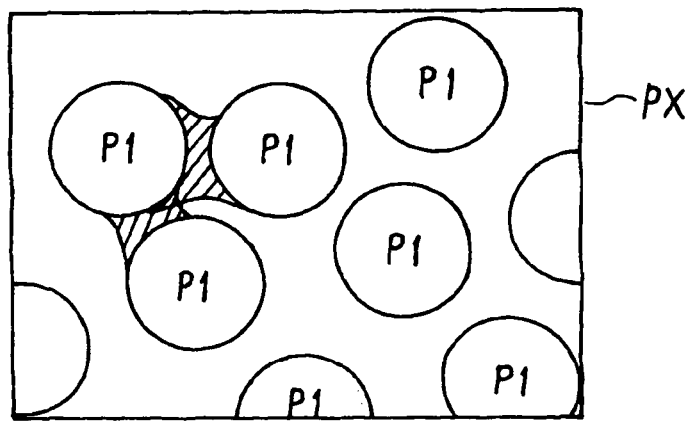

As FIG. 46B shows, it is possible to increase the density of the large circular patterns P1. However, if the large circular patterns P1 come too close to each other, the edges of the circular patterns may unite, as shown by shading, because of sagging by heat during post-bake. Such a uniting decreases the area of the inclined face to be designed, which is not desirable.

Figure 46C:
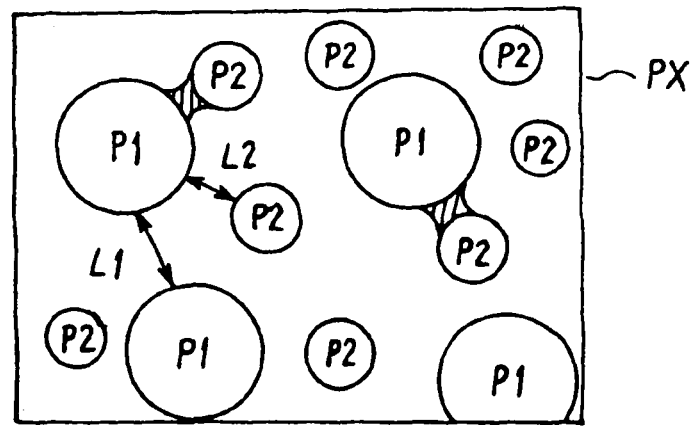

As in the present embodiment, the density of the relatively large circular patterns P1 is not dense, as shown in FIG. 46A, and the distance L1 between the patterns P1 is maintained to be relatively large, and the relatively small circular patterns P2 are arranged in the space between the large circular patterns P1, so as to increase the density of the inclined faces, as described referring to FIG. 45 and as shown in FIG. 46C. By this, the relatively large circular patterns do not unite with each other, and even if they do unite, this is limited to the space between a large circular pattern P1 and a small circular pattern P2 (shaded area in FIG. 46C). Such a united area is relatively small compared with the united area between the large circular patterns P1, and the decrease of the inclined face area can be minimized.

As FIG. 46C shows, the distance L1 between the large circular patterns P1 is long enough not to cause uniting, and the small circular patterns P2 are arranged in the areas between the circular patterns P1. As a result, the distance L2 between the large circular pattern P1 and the small circular pattern P2, which is closest to P1, is always shorter than the distance L1 between the large circular pattern P1 and the large circular pattern L1 closest thereto.

Figure 47:
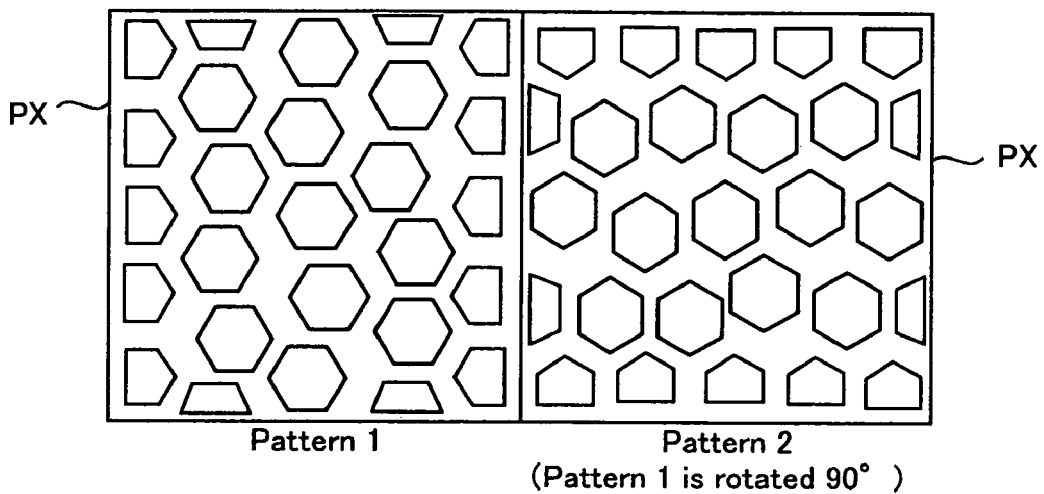
FIG. 47 is a diagram depicting a polygon pattern example of resist in the present embodiment.

FIG. 47 is a diagram depicting another resist pattern. The above example uses circular patterns so that the inclined face of the undulation for reflection turn in 360° directions, but a polygon, which sides direct a plurality of directions, preferably three or more, instead of a circle, can implement a similar high reflectance.

FIG. 47 is an example of a pattern of resist where many hexagons are arranged close to each other so that adjacent sides are parallel to each other in the pixel area PX. At the edge of the pixel area PX, an entire hexagon cannot fit, and trapezoids and pentagons are arranged, but basically hexagons are arranged like tiles in this resist pattern. By arranging each side to be in parallel, uniting during post-bake can be prevented even if a hexagon comes very close to another.

Using such a mask pattern, the resist layer is exposed and developed, and post-bake is executed, then the cross-sectional shape sags due to heat, and undulation for reflection, which has an inclined face inclined in at least three directions, can be formed.

Figure 48:
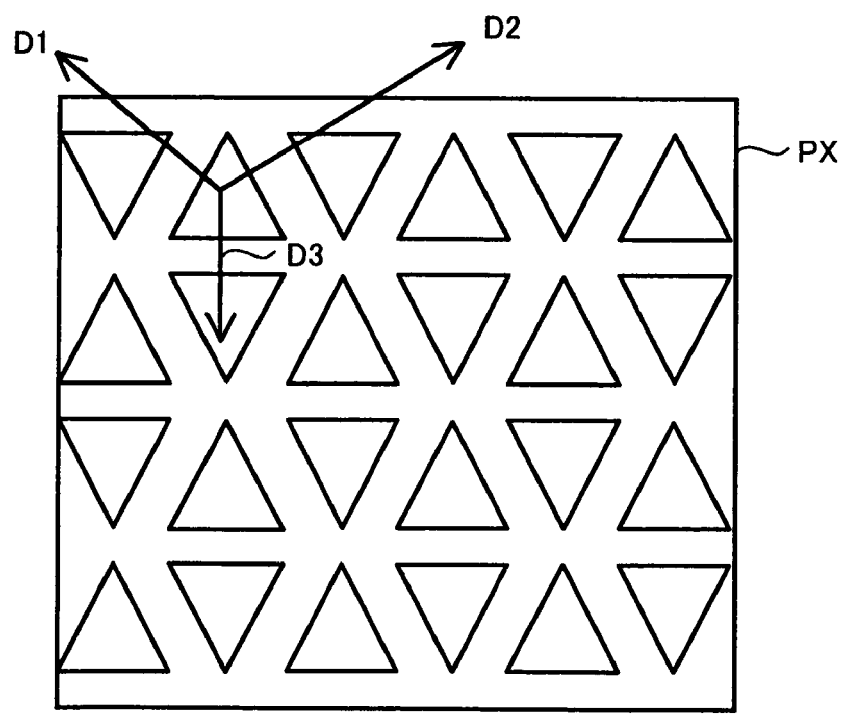
FIG. 48 is a diagram depicting a polygon pattern example of resist in the present embodiment.

FIG. 48 is a diagram depicting another resist pattern. In the example in FIG. 48, not hexagons but a plurality of equilateral triangles are arranged such that each side comes close to another in parallel. In this case as well, the resist layer is exposed and developed, and post-bake is executed, then the cross-sectional shape sags due to heat, and undulation for reflection, which has inclined faces inclining in at least three directions, can be formed. The present embodiment can form the undulation for reflection having inclined faces at high density even if another polygon shape is used.

The process of forming the undulation for reflection using the patterns in FIGS. 45, 47 and 48 is the same as the process shown in FIG. 28. For the mask 64 in the exposure process of the resist layer, the patterns in FIGS. 45, 47 and 48 are used. By this, high density inclined face distribution can be formed without allowing to patterns unite with each other, and the reflectance of the reflector can be increased.

[Embodiment of Guest-Host Liquid Crystal Layer]

The rough configuration of the reflection liquid crystal display device of the present embodiment is the same as FIG. 2. In this embodiment, however, a guest-host liquid crystal layer where dichroic dye are mixed in the liquid crystal is used.

[Forming Undulation by Half Exposure]

The main point of the present embodiment is that in order to control undulation shapes on the surface of the reflection layer, the reflection layer is configured such that the reflected light scattering width in the incident plane when parallel light enters depends on the azimuth of incident light, by forming a light absorption layer which light absorption characteristics depend on the azimuth in the front face of the reflection layer, and bump shapes on the surface of the reflection layer are controlled by adjusting such that the azimuth, when the reflection light scattering width is at the maximum, and the azimuth when the light absorption of the light absorption layer is at the maximum or at the minimum, roughly match.

[Concrete Configuration]

Fabrication Example 1

As FIG. 83 shows, we fabricated diffuse reflectors comprised of (a) a circular pattern, (b) an elliptical pattern, (c) a trapezoidal pattern, (d) a cocoon-shaped pattern, and (e) a wrinkle pattern.

The circular, elliptical, trapezoidal and cocoon-shaped patterns were fabricated as follows. Resist AFP 750 (made by Shipley) was coated on a 0.7 mm thick glass substrate to be 3 µm, then using a mask pattern where circular, elliptical, trapezoidal or cocoon-shaped patterns are arranged at random, half exposure was performed at a 80 mJ/cm$^2$ exposure energy. After the half exposure and development, bake is performed for 40 minutes at 135° C., so that each pattern is smoothed by heat and inclination is controlled. Then bake is performed for 1 hour at 200° C. to completely cure the resist, and the reflector was fabricated by vacuum deposition of Al on the resist to be about a 200 nm thickness.

For the wrinkle patterns of the micro-grooves, resist AFP 750 was coated on the 0.7 mm thick glass substrate to be 3 µm, and UV with a 3900 mJ/cm$^2$ exposure energy was irradiated. After UV irradiation, bake was performed for 90 minutes at 135° C. to generate fine wrinkles on the resist surface. Then final bake was performed for 1 hour at 200° C., and the reflector was fabricated by vacuum deposition of Al on the resist to be about a 200 nm thickness.

To generate more wrinkle patterns in a predetermined direction, a rectangular transparent electrode made of indium tin oxide (ITO) was formed on the glass substrate.

By using this pattern, more wrinkles are generated in a direction parallel with the sides of the ITO rectangle (azimuth: 0-180° and 90-270°).

Parallel lights are entered into these reflectors changing incident angles, and the reflection characteristics in a 0° direction were measured.

FIG. 84 shows the result of measuring the reflection characteristics. This shows the reflectance on the ordinate when the polar angle of the incident light (incident angle on the abscissa) and the azimuth angle are changed.

As FIG. 84 shows, the reflection characteristics do not depend on azimuth (shown in rectangular) in the case of a circular pattern, but in the case of an elliptical, trapezoidal, cocoon-shape and wrinkle patterns, the is reflection characteristics change considerably depending on the azimuth. In other words, in the case of elliptical, trapezoidal and cocoon-shaped patterns, the scattering width is wider in the minor axis direction than the major axis direction, and in the case of a wrinkle pattern, the scattering width in a direction parallel with the sides of the ITO rectangle is wider than that of other directions. Therefore it is preferable to select an optimum pattern according to the intended use of the liquid crystal display panel.

Fabrication Example 2

Dichroic dye MA 981103 (made by Mitsubishi Chemical) was mixed into the n-type liquid crystal MJ 95785 (made by Merck), the density of the dye was changed to obtain contrast 5, and the relationship between the twist angle and the reflectance of the liquid crystal layer was examined.

Figure 85:
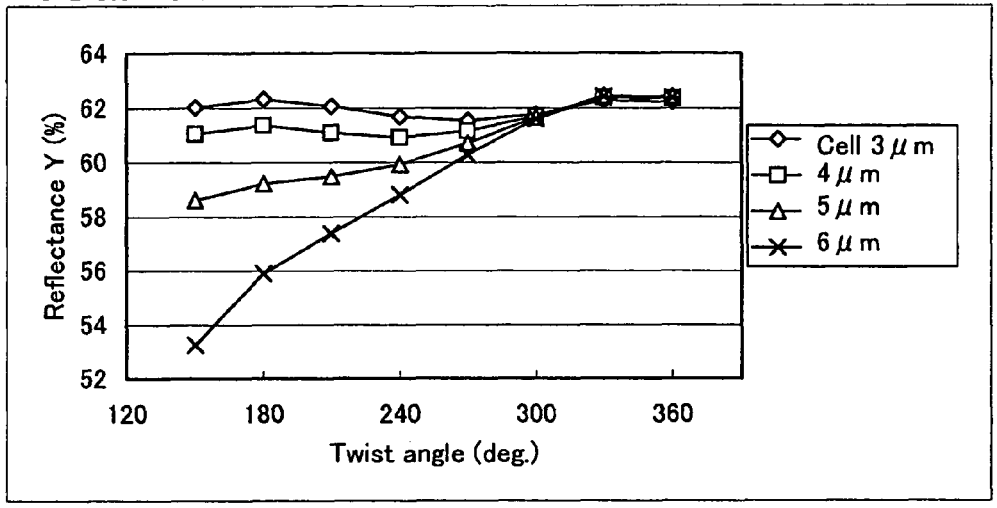
FIG. 85 is a characteristic diagram depicting the result of examining the relationship of the twist angle and reflectance of the liquid crystal layer.

FIG. 85 shows the result.

As FIG. 85 shows, a brighter reflectance is obtained as the cell thickness decreases, and a maximum reflectance is obtained at a 180° twist or 330° twist. However, if a 330° twist is implemented, the voltage reflectance characteristics has hysteresis, so generally the twist angle must be 240° or less. So we examined the viewing angle characteristics of the bright state and the dark state of the reflection guest-host liquid crystal when the cell thickness of the guest-host liquid crystal is 3 μm, and a 180° twist structure was created by performing parallel rubbing processing in the azimuth 0° of the top and bottom substrates.

Figure 86:
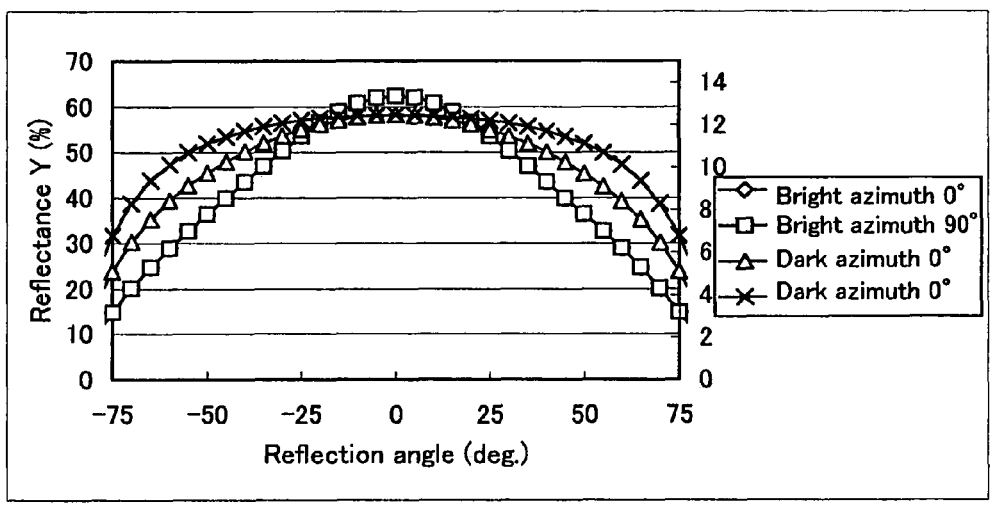
FIG. 86 is a characteristic diagram depicting the result of examining the viewing angle characteristic in a bright state and dark state of a reflection guest-host liquid crystal.

FIG. 86 shows the result.

In the bright state, the reflection characteristics do not change between the azimuth 0° direction and the azimuth 90° direction, so the reflection characteristics do not depend on the azimuth, but in the dark state, the characteristics differ considerably between the azimuth 0° direction and the azimuth 90° direction. In other words, the light absorption characteristics depend on the azimuth in the dark state, where absorption in the larger incident angles is higher in the azimuth 0° direction than in the azimuth 90° direction.

In the case of an elliptical pattern, for example, fabricated in the fabrication example 1, the reflection characteristics depend on the azimuth angle.

Figure 87:
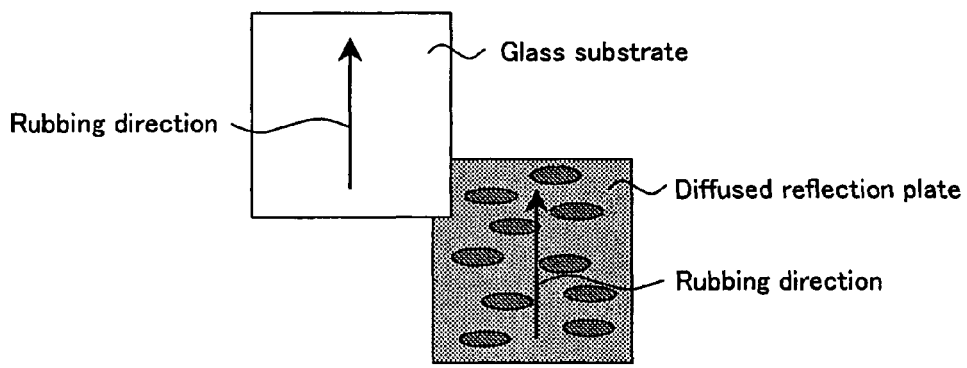
FIG. 87 is a schematic diagram depicting a guest-host liquid crystal twisted at 180°.

Here a guest-host liquid crystal, which is twisted 180°, is considered, as FIG. 87 shows. When the intensity of light, which enters at incident angle $\theta$ and azimuth angle $\phi$ is IO $(\theta,\phi)$, the guest-host layer transmittance of light which enters at incident angle $\theta$ and azimuth angle $\phi$ is T $(\theta,\phi)$, and the reflectance of the reflector when the light at incident angle $\theta$ and azimuth angle $\phi$ reflects in the 0° direction is R $(\theta, \phi)$. The light intensity I $(\theta, \phi)$ when the light enters the reflection guest-host liquid crystal at incident angle $\theta$ and azimuth angle $\phi$ and is reflected in the 0° direction is given by the following formula.

$$I(\theta,\phi)=I_0(\theta,\phi) \cdot T(\theta,\phi) \cdot R(\theta,\phi) \cdot T(\theta=0°,\phi=0°) \quad (11)$$

Since light enters from various directions in an environment where a reflection type liquid crystal display device is used, it is necessary to assume that light which enters at incident angle $\theta$ actually enters from all azimuths. When light at incident angle $\theta$ enters from all azimuths, formula 1 is integrated for all azimuths, but an approximate light value can be given by an average value of the azimuth $\phi$ and an azimuth perpendicular thereto, $\phi+90°$. (To obtain a more accurate value, increase the number of azimuths and average the values).

In the case of an elliptical pattern, for example, azimuth 0° and 180°, and 90° and 270° are almost the same, so light from all azimuths can be approximated by the sum of the azimuth 0° direction and the azimuth 90° direction, as shown in the formula (12).

$$I(\theta,\phi) \approx (1/2)I_0(\theta,\phi=0°) \cdot T(\theta=0°,\phi=0°) \cdot [T(\theta=0°,\phi=0°) \cdot R(\theta,\phi=0°)+T(\theta,\phi=90°) \cdot R(\theta,\phi=90°)] \quad (12)$$

So we estimated the reflectance based on the formula (12) for the case when a diffuse reflector with an elliptical pattern and a guest-host liquid crystal are combined. Table 4 shows the result when the reflectance was calculated by the formula (12) for the case when the major axis of the ellipse and the rubbing direction are the same (case 1), the case when the minor axis of the ellipse and the rubbing direction are the same (case 2), and the case when a circular reflector is used (case 3). Reflectance and contrast were calculated in Table 4. As Table 4 shows, contrast is higher in the elliptical pattern than in the circular pattern, and especially under the conditions of case 2, contrast increased considerably.

TABLE 4

| | Reflectance estimation result | | | | | | | | |
|---|---|---|---|---|---|---|---|---|---|
| | Bright state | | | Dark state | | | Contrast | | |
| | $\theta = 30°$ | 45° | 60° | $\theta = 30°$ | 45° | 60° | $\theta = 30°$ | 45° | 60° |
| Case 1 | 74.7% | 32.9% | 3.6% | 16.2% | 5.9% | 0.9% | 4.6 | 5.6 | 4.0 |
| Case 2 | 74.7% | 32.9% | 3.6% | 16.1% | 5.3% | 0.2% | 4.6 | 6.2 | 18.0 |
| Case 3 | 75.2% | 32.9% | 3.5% | 16.4% | 8.4% | 1.3% | 4.6 | 4.3 | 2.7 |

In other words, as FIG. 87 shows, contrast increases considerably by making the minor axis of the ellipse and the rubbing direction the same.

We actually fabricated cells for each case 1-3. Dichroic dye MA 981103 is mixed at 4.3 wt % to liquid crystal MJ 95785, and the amount of mixing chiral material CB-15 (made by Merck) was adjusted so that the chiral pitch becomes 8 μm. The cells were implemented by sealing this guest-host liquid crystal into the cells using a 4 μm diameter spacer.

Considering the environment where a reflection liquid crystal display device is used, the reflection characteristics and the contrast were measured using an integrating sphere. Table 5 shows the result. As Table 5 shows, it was confirmed that contrast becomes higher than the case 3 which is the conventional approach, by structuring an actual cell, as in case 2.

TABLE 5

| Integrating sphere measurement result | | |
|---|---|---|
| | Reflectance | Contrast |
| Case 1 | 44.2% | 5.3 |
| Case 2 | 44.2% | 6.2 |
| Case 3 | 45.2% | 5.1 |

A similar result was obtained when trapezoidal, cocoon-shaped and wrinkled patterns were used as the bump pattern of a diffusion reflector, and high contrast characteristics were obtained by combining the axis of a guest-host liquid crystal and azimuth of a reflector appropriately.

Fabrication Example 3

Figure 88:
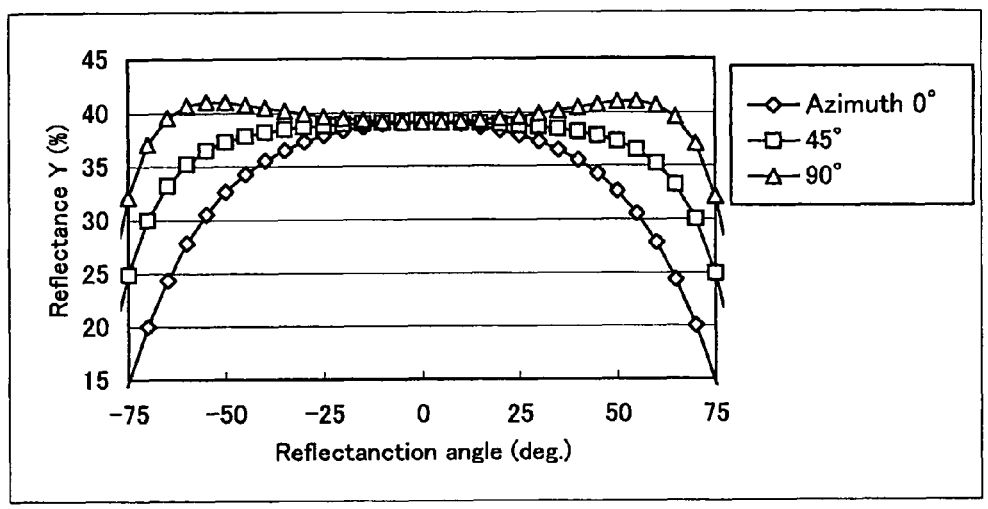
FIG. 88 is a characteristic diagram depicting the reflection characteristics of a polarizer.

FIG. 88 shows the result of measuring the incident light angle characteristics of polarizer G 1220 DU (made by Nitto Denko). The azimuth 0° is the direction of absorption axis of the polarizer, and the azimuth 90° is the direction of the transmission axis.

As FIG. 88 shows, the transmission axis direction (azimuth 90°) has a higher transmittance in a wide angle range than the absorption axis direction (azimuth 0°). So this polarizer is optically contacted to the elliptical pattern, and the reflectance was measured using an integrating sphere.

Table 6 shows the measurement result. Case 1 is when the major axis direction of the elliptical pattern and the absorption axis direction of the polarizer are matched, and case 2 is when the minor axis direction of the elliptical pattern and the transmission axis direction of the polarizer are matched. As Table 6 shows, it was confirmed that case 1 can implement a higher reflectance than case 2.

TABLE 6

Reflection characteristics when polarizer G 1120 DU and elliptical reflector are combined (integrating sphere)

|  | Reflectance |
| --- | --- |
| Case 1 | 38.2% |
| Case 2 | 36.5% |

Figure 89:
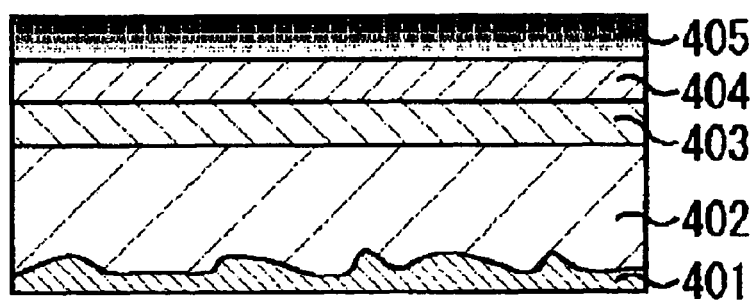
FIG. 89 is a cross-sectional view depicting a rough configuration of a fabricated one polarizer type reflection liquid crystal display device.

Therefore as FIG. 89 shows, one polarizer type reflection liquid crystal display device was fabricated by layering liquid crystal layer 402 FT-5045LE (made by Chisso)), λ/4 plate 403, λ/2 plate 404, and polarizer 405 (G1220DU) on the diffuse reflector 401. Table 7 shows the reflectance and the contrast characteristics measured using an integrating sphere.

TABLE 7

Reflectance and contrast of one polarizer type (integrating sphere)

|  | Reflectance | Contrast |
| --- | --- | --- |
| Case 1 | 35.3% | 17.5 |
| Case 2 | 34.1% | 17.1 |
| Case 3 | 35.1% | 17.2 |

Here case 1 is when the major axis direction of the elliptical pattern and the absorption axis direction of the polarizer are matched, case 2 is when the minor axis direction of the elliptical pattern and the transmission axis direction of the polarizer are matched, and case 3 is when a circular pattern diffuse reflector is used. As Table 7 shows, compared with case 3 which is prior art, the reflectance increased somewhat in case 1. In other words, in the case of a polarizer type as well, the reflectance improved by combining the axis of the polarizer and the azimuth of the reflector appropriately.

As described, according to the present embodiment, a reflection electrode, which can implement stable high reflectance characteristics, can be formed, and a guest-host type and one polarizer type reflection liquid crystal display devices with high reliability, which allows a display with high lightness, can be implemented.

[Front Light Structure]

The reflection type liquid crystal display device lights the display face by reflecting external light without disposing backlight. Therefore, the reflection type liquid crystal display device has low power consumption and is useful as a display panel of portable information terminals and portable telephones. However, use is limited to a bright place, since external light is used. So a liquid crystal display device with a front light which is turned on only when the unit is in use in a dark place has been proposed.

Figure 49:
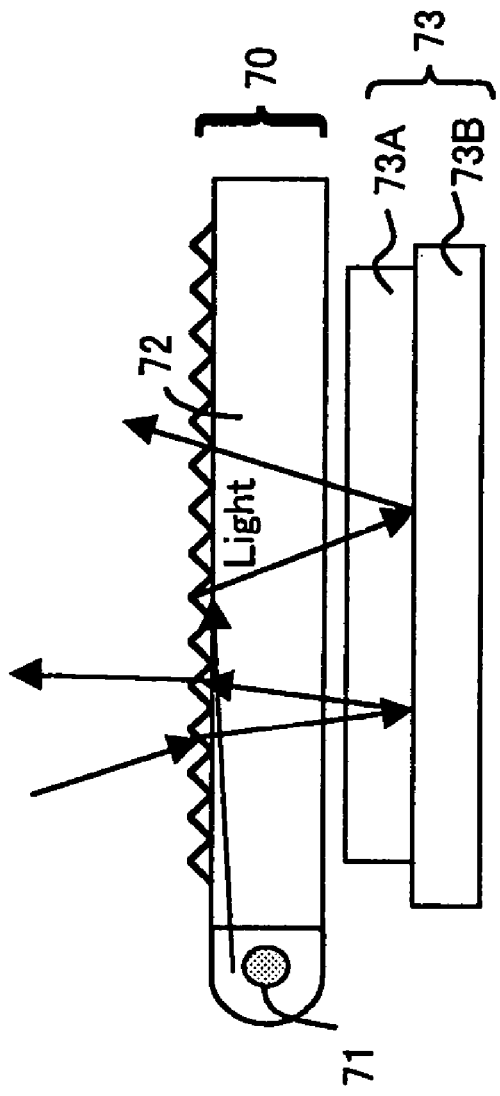
FIG. 49 is a diagram depicting the configuration of a conventionally proposed reflection type liquid crystal display panel with a front light.

FIG. 49 is a diagram depicting the configuration of a conventionally proposed reflection type liquid crystal display panel with a front light. As FIG. 49 shows, a front light 70 is installed on the display side of the reflection liquid crystal display panel 73. In the reflection type liquid crystal display panel 73, a liquid crystal layer, which is not illustrated, is inserted between the rear side substrate 73B, having a reflector structure, and the display side substrate 73A. And on the display side substrate 73A, the front light 70 is installed, and the front light 70 is comprised of a light source 71 and a transparent substrate 72 which guides the light from the light source to the entire surface of the display, and scatters the light to the display panel 73 side using the scattering layer or the prism layer formed on the surface. The light of the light source 71 is scattered by the difference of the refractive index between the scattering layer or the prism layer formed on the surface of the transparent substrate 72 and the air layer, and a part of the scattered light is scattered to the display panel 73 side.

However, in the case of the reflection type liquid crystal display device configured as in FIG. 49, the scattering layer or the prism layer is formed on the surface of the transparent substrate 72, and an observer sees characters and images on the display panel 73 via this scattering layer and prism layer. Therefore characters and images are distorted or blurred by the scattering layer or the prism layer, which drops the image quality.

So the present embodiment has a front light structure such that the transparent substrate, which-guides light only when the light source is turned on, has a scattering characteristic, and the transparent substrate does not have this scattering characteristic when the light source is not turned on. By using this structure, where the front light structure does not use the scattering function when in normal use using external light, characters and images observed on the display panel are not distorted or blurred. Only in limited cases, such as use in a dark place, the front light structure provides light from the light source via the scattering characteristic, so the display panel is brightened and minimum functions required as the display panel can be secured, even if characters and images are somewhat distorted and blurred.

FIG. 50 shows diagrams depicting a first example of the front light. The front light 70 shown in FIG. 50 comprises a transparent substrate 74, where the surface of a transparent substrate made of acrylic is sand-blasted so as to form a scattering layer 75 on the surface, a transparent substrate 76 made of acrylic, a fluid 77, such as silicon oil to be filled between the substrates, a fluid pump 78 and a fluid tank 79. The front light 70 further comprises a linear light source 71 made of a cold cathode fluorescent tube. Between the substrates 74 and 76, the fluid stored in the fluid tank 79 is filled in or taken out by the fluid pump 78. The refractive index of this fluid 77 is n=1.5, which is roughly the same as the transparent substrates 74 and 76.

As FIG. 50A shows, when the reflection liquid crystal display panel is used in a bright place, the light source 71 is in the off state, and the fluid 77 is filled into the gap between the transparent substrates 74 and 76. By this, an observer cannot see the scattering layer 75 since the refractive index is the same as the fluid 77. Therefore when the liquid crystal display panel is used in a bright place, characters and images on the display panel 73 are not blurred or distorted.

When the reflection liquid crystal display panel is used in a dark place, on the other hand, the light source is in the on state, and the fluid 77 is taken out of the gap between the transparent substrates 74 and 76 by the fluid pump 78, and the air layer is filled into the gap of the substrates, as shown in FIG. 50B. Therefore the refractive index difference is generated between the acrylic of the transparent substrate material (refractive index is about 1.5) and air (refractive index of 1.0) in the scattering layer 75, and the original function of the scattering layer is presented. So lights which have been guided, repeating internal reflection from the light source 71 which is at the end of the transparent substrates 74 and 76, are scattered by this scattering layer 75, and lights the reflection liquid crystal display panel 73. As a result, a bright display panel can be implemented even in a dark place.

When this front light 70 is viewed from the observer side, the scattering layer 75 of the transparent substrate 74 is seen, and the display of the reflection liquid crystal display panel 73 is distorted. However such distortion is equivalent to that of a conventional reflection liquid crystal display panel with a front light.

As described above, the same display as a reflection display panel without a front light is obtained when used in a bright place, and light from the light source can be used for illuminating the reflection liquid crystal display panel when used in a dark place, therefore a bright display is implemented.

FIG. 51 shows diagrams depicting a second example of a reflection liquid crystal display panel with a front light according to the present embodiment. In this example, a transparent electrode (ITO) 81 whose the main component is indium oxide is formed on the surface of two transparent substrates 74 and 76 made of glass, for example, and the liquid crystal layer 80, which state changes depending on the electric field, is sandwiched in the gap between the transparent substrates. Voltage V1 is applied or not applied between the transparent electrodes 81 depending on the switch SW. Normally, this liquid crystal layer 80 becomes a transparent state when voltage V1 is applied between the transparent electrodes, and becomes a scattering state when the voltage between the transparent electrodes is 0. Therefore in a bright place, the switch SW is turned on to make the liquid crystal layer 80 to be transparent, and in a dark place, the switch SW is turned off to make the liquid crystal layer 80 to be a scattering state.

The liquid crystal materials for which the scattering state and transmission state can be switched are (1) a liquid crystal using a dynamic scattering effect, (2) a liquid crystal using a phase transition effect between the cholesteric phase and the nematic phase, and (3) a polymer dispersion type liquid crystal, and one of these liquid crystals can be used.

In the case of the example in FIG. 51, compared with the example in FIG. 50, a transparent substrate with a scattering layer, pump and tank are unnecessary, where the time for filling and taking out fluid can be saved. Also in the case of the polymer dispersion type liquid crystal, the degree of anisotropy of the refractive index of spherical liquid crystals in the polymer can be adjusted by applied voltage. Therefore the degree of scattering of the liquid crystal layer 80 can be adjusted by adjusting the applied voltage, and an observer can adjust the degree of scattering of the lights from the light source 71 to increase the brightness, or the degree of scattering of the lights is decreased to control the distortion of the display screen.

Even in the example of FIG. 51, the display of the reflection type liquid crystal display panel looks as if viewing through frosted glass when the light source 71 is turned on and the liquid crystal layer 80 has the scattering characteristic, but this is equivalent to a conventional reflection type liquid crystal display panel with a front light. And when the light source 71 is off in a bright state, the liquid crystal layer 80 is transparent, and the display is not blurred or distorted. In other words, this example, which is a reflection type liquid crystal display panel with a front light, allows a display quality equivalent to a reflection type liquid crystal display panel without a front light when the front light is not on, and allows a display quality equivalent to a normal reflection type liquid crystal display panel with a front panel when the front light is on.

FIG. 52 shows diagrams depicting a third example of a reflection liquid crystal display panel with a front light. In this example, the transparent electrode 81 is formed on the inner face of the transparent substrates 74 and 76, such as glass, and a prism layer 82 having prism-shaped fine undulation is formed inside the transparent substrate 74. And the liquid crystal layer 80 having refractive index anisotropy is sealed inside the transparent substrates 74 and 76. The molecule alignment direction of the crystal molecules having refractive index anisotropy is changed by the electric field, and the direction of the refractive index anisotropy changes. Here one refractive index of the liquid crystal layer 80, having refractive index anisotropy, is matched with the refractive index of the prism layer 82.

Figure 52A:
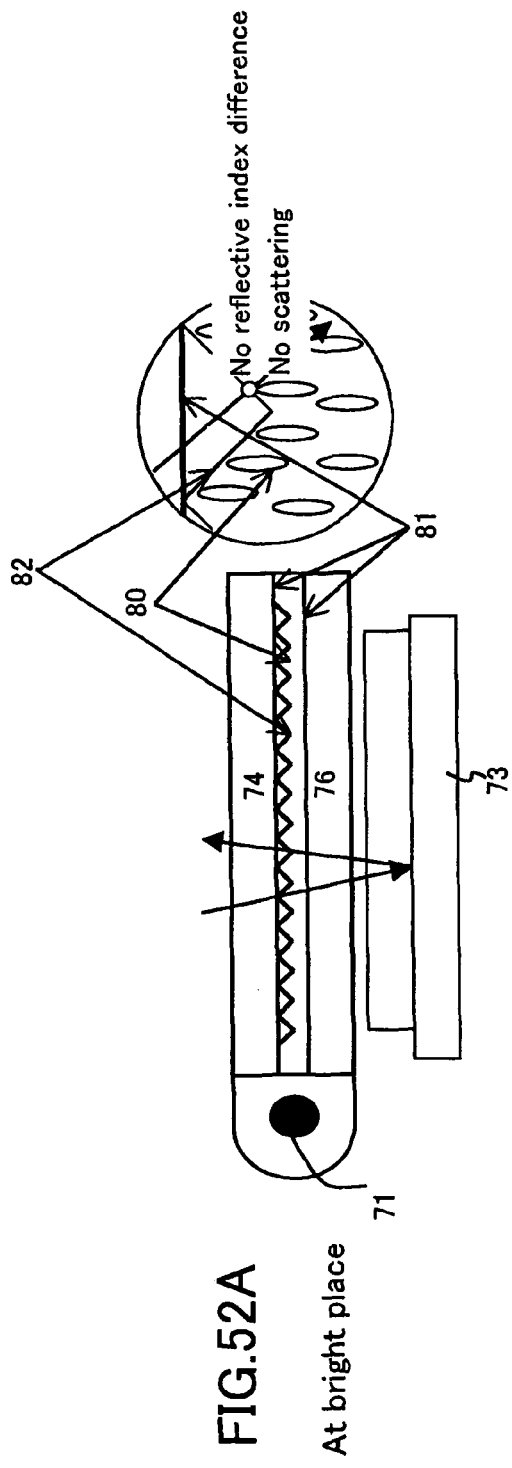
FIGS. 52A-52B show diagrams depicting a third example of a reflection type liquid crystal display panel with front light.

As FIG. 52A shows, when the display panel is used in a bright place, voltage is applied to the liquid crystal layer 80, or no voltage is applied, so that the refractive index of the prism layer 82 and the refractive index of the liquid crystal layer 80 are matched in the direction from the display side to the reflection display panel 73. In this state, the refractive index of the prism layer 82 and the refractive index of the liquid crystal layer 80 match in the direction from the display side to the reflection display panel 73, where a scattering state caused by the prism layer 82 disappears and the front light structure becomes transparent. As a result, the state becomes the same as the state of a reflection type liquid crystal display panel without a front light, where the display screen is not blurred or distorted.

Figure 52B:
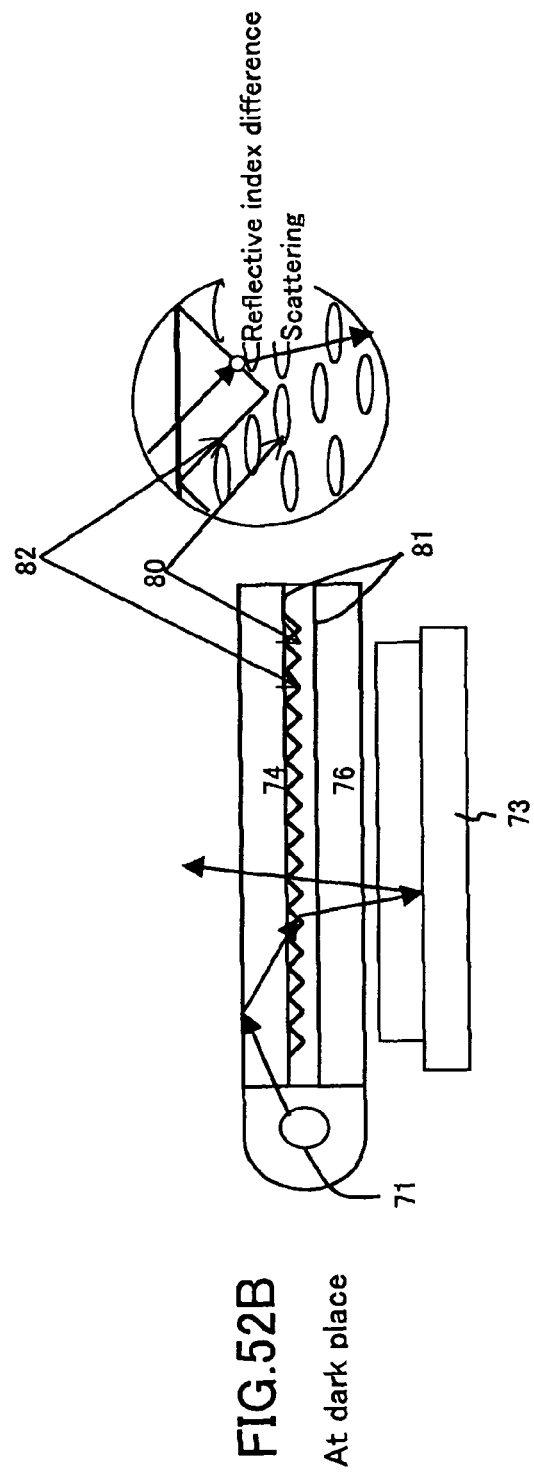

For use in a dark place, on the other hand, no voltage is applied or voltage is applied to the liquid crystal layer 80, so that the refractive index of the prism layer 82 and the refractive index of the liquid crystal layer 80 are different in the direction from the display side to the reflection display panel 73, as shown in FIG. 52B. Because of this, a refractive index difference is generated at the interface between the prism layer 82 and the liquid crystal layer 80, and light from the light source 71 is refracted. This refracted light becomes the illumination light to the reflection type liquid crystal display panel 73, and a bright display can be implemented.

In this example, prism shapes are formed on the surface of the transparent substrate 74, but a similar effect can be expected by forming a scattering layer on the surface of the transparent substrate 74 by a sand-blast process.

By applying this structure, a similar effect as example 2 can be obtained, and a transmission state and scattering state can be switched much faster due to the nature of the liquid crystal layer 80. Also compared with the polymer dispersion type liquid crystal in example 2, voltage can be directly applied to the liquid crystal layer 80, so the applied voltage to the liquid crystal layer 80 can be lower than using the polymer dispersion type liquid crystal. And by matching the refractive index of the liquid crystal layer with the refractive index of the prism layer 82 in a state where voltage is not applied to the liquid crystal layer 80, it is unnecessary to apply voltage to the light source 71 and the transparent electrode 81 when the display panel is used in a bright place, which further decreases power consumption.

Figure 53A:
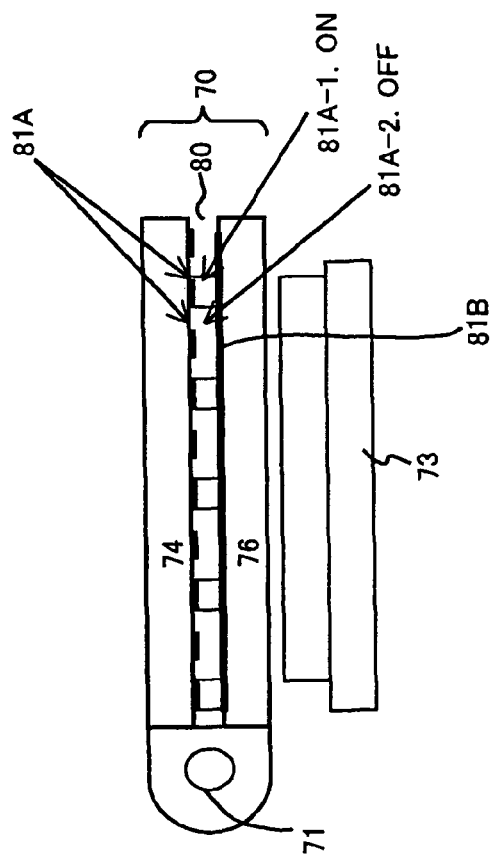
FIGS. 53A-53B show diagrams depicting a fourth example of a reflection type liquid crystal display panel with front light.
Figure 53B:
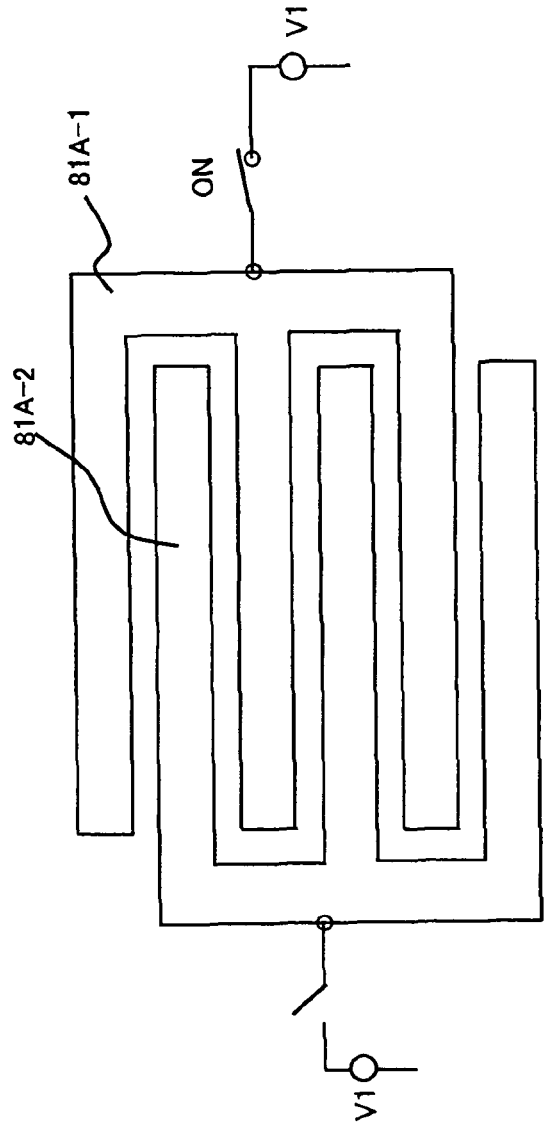

FIG. 53 shows diagrams depicting a fourth example of a reflection type liquid crystal display panel with a front light. In this example, the transparent electrode 81A, which is formed on the transparent substrate 74, which is the light guiding plate of the front light 70, is separated into strips, so that applying voltage 81A-1 or not applying voltage 81A-2 can be selected for each strip. And a liquid crystal layer, which state changes depending on whether voltage is applied, is filled between the transparent substrates 74 and 76. FIG. 53A shows a cross-sectional structure, and FIG. 53B shows a plane structure of the separated transparent electrode 81A.

If this structure is used, the area of the liquid crystal layer to be the scattering state can be appropriately changed by changing the number of transparent electrodes 81A to which voltage is applied, and the quantity of illumination light can be adjusted to a certain degree. Therefore in this configuration, the degree of scattering can be adjusted by selecting the transparent electrodes to which voltage is applied, even if a scattering type liquid crystal where the degree of scattering cannot be adjusted, a liquid crystal using a dynamic scattering effect, or a liquid crystal using a phase transition effect between the cholesteric phase and the nematic phase, is used for the liquid crystal layer 80.

If the degree of scattering by the liquid crystal layer of the front light is high, the reflection type liquid crystal display panel with a front light scatters the light from the light source 71 very well, and illuminates the reflection liquid crystal display panel 73 very well, therefore the brightness of the reflection liquid crystal display panel increases. However, the display image clouds and the resolution drops since the scattering layer exists between the observer and the reflection type liquid crystal display panel. Therefore, if a degree of scattering is possible, the observer can adjust it to optimize the display quality for viewing.

FIG. 54 shows diagrams depicting a fifth example of a reflection type liquid crystal display panel with a front light. In the front light 70 of this example, just like the second example shown in FIG. 52, a transparent electrode 81 is formed inside the transparent substrates 74 and 76 and the liquid crystal layer 80 is filled between them. The liquid crystal layer 80 is a polymer dispersion type liquid crystal where refractive index anisotropic resin is used for the polymer, and is configured such that the normal light refractive index and the abnormal light refractive index of the liquid crystal grains 90 match the refractive index of the polymer in two directions in a state where voltage is not applied between the transparent electrodes.

Details of the polymer dispersion type liquid crystal are shown at the right in FIG. 54. While liquid crystal grains 90 having refractive index anisotropy are dispersed in polymer not having refractive index anisotropy in the case of polymer dispersion type liquid crystal A, liquid crystal grains 90 having refractive index anisotropy are dispersed in polymer having refractive index anisotropy in the case of polymer dispersion type liquid crystal B.

It is assumed that in crystal grains 90, molecules are aligned in the thickness direction of the front light 70, the refractive index in the thickness direction of the front light matches with the polymer 92 and the transparent substrates 74 and 76 when voltage is not applied between the transparent electrodes, and these refractive indexes do not match when voltage is applied between the transparent electrodes.

In this case, in the polymer dispersion type liquid crystal A, the refractive index of the liquid crystal grains 90 in the vertical direction match the polymer 92 and the transparent substrates 74 and 76, and lights in the vertical direction do not have a refractive index difference, so no refraction and scattering occur. However, the horizontal refractive index is different between the polymer 92 and the liquid crystal grains 90, so refraction occurs to not only horizontal light but also to diagonal light, that is, to the horizontal direction vector component of the lights. Therefore, when the reflection type liquid crystal display panel 73 is viewed diagonally, the front panel 70 looks clouded, due to this refraction.

If polymer dispersion type liquid crystal B is filled between the transparent substrates 74 and 76, on the other hand, liquid crystal molecules align in the thickness direction of the front light when voltage is not applied between the transparent electrodes, and the direction of the refractive index anisotropy of the liquid crystal grains 90 and the direction of the refractive index anisotropy of the polymer 92 match. Therefore, in this state, a refractive index difference between the liquid crystal grains 90 and the polymer 92 is not generated at all from any direction, and the front light becomes transparent from all directions. Therefore, compared with the case of using polymer dispersion type liquid crystal A, a distortion and fogging of images viewed from a diagonal direction can be prevented when the panel is used in a bright place of FIG. 54A.

When the panel is used in a dark place and voltage is applied between the transparent electrodes as FIG. 54B, the direction of refractive index anisotropy of the liquid crystal grains 90 mismatches with the direction of the refractive index anisotropy of the polymer 92. This is because the direction of the anisotropy of the polymer 92 is not changed by an electric field. Therefore the front light 70 becomes a scattered state, and light from the light source 71 is scattered to the reflection type liquid crystal display panel 73 side, which brightens the liquid crystal display surface. However, the color of the liquid crystal layer 80 becomes cream-yellow, and blurring and distortion occur to the display screen.

In this case, the direction of the refractive index anisotropy of the liquid crystal grains 90 can be adjusted by adjusting the voltage to be applied between the transparent electrodes. In other words, if the applied voltage is increased, the degree of scattering in the liquid crystal layer increases, incident light to the reflection liquid crystal display panel 73 increases, and the screen brightens, but the screen may become too white, making it difficult to view. If the applied voltage is decreased, on the other hand, the degree of scattering in the liquid crystal layer decreases, and the screen darkens, but the transparency of the screen increases. So by adjusting the applied voltage, the degree of brightness of the screen and the degree of contrast can be set as the observer desires.

Figure 55:
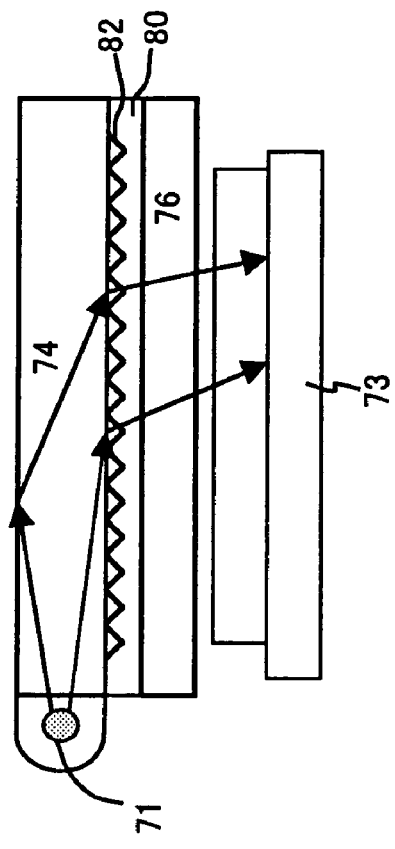
FIG. 55 shows a diagram depicting a sixth example of a reflection type liquid crystal display panel with front light.

FIG. 55 is a diagram depicting a sixth example of a reflection type liquid crystal display panel with a front light. In the previous examples in FIGS. 50-54, light from the light source 71 are guided in the two transparent substrates. Whereas in the example in FIG. 55, the light source 71 is disposed on the side face of the substrate 74 at the display face side of the two transparent substrates, and light is guided mainly in the substrate 74 in the display face side. Light is scattered by the prism-shaped undulation 82 arranged on the side face of the reflection type liquid crystal display panel 73 of the substrate 74, so as to illuminate the reflection type liquid crystal display panel 73. On the transparent substrates 74 and 76, a transparent electrode, which is not illustrated, is formed, and the liquid crystal layer 80 is filled between the substrates.

When light is guided in the two transparent substrates 74 and 76 at the top and the bottom, as shown in FIGS. 50-54, light guided from the top and bottom transparent substrates contact the prism-shaped undulation 82. In this case, it is desirable that light from the top transparent substrate 74 is refracted, scattered and transmitted downward, and light from the bottom transparent substrate 76 is reflected, scattered and reflected downward as well. However, more light is actually refracted, scattered and transmitted than light reflected, scattered and reflected downward, so it is difficult to efficiently reflect and scatter light from the bottom substrate.

Whereas in the case of the configuration in FIG. 55, a prism layer 82 is disposed at the display panel 73 side of the transparent substrate 74, where light from the light source is transmitted. Therefore light irradiated to the prism layer 82 is the light transmitted through the top transparent substrate 74, and more light refracted and scattered through the prism layer 82 enters the reflection type liquid crystal display panel 73 side. Therefore the prism-shaped undulation 82 only needs to be refraction scattering shapes, and a simplification of shapes and an improvement of illumination efficiency can be implemented.

When the liquid crystal layer 80 having scattering characteristics is also sealed, more light from above is scattered to the liquid crystal layer 80 and is transmitted downward, and the quantity of light to be reflected and scattered is low. Therefore, in the above structure, illumination efficiency is higher. For light from the light source 71, the quantity of incident light from the light source decreases since only one transparent substrate 74 guides light, but the quantity of incident light from the light source 71 can be improved by increasing the thickness of the transparent substrate 74.

Figure 56:
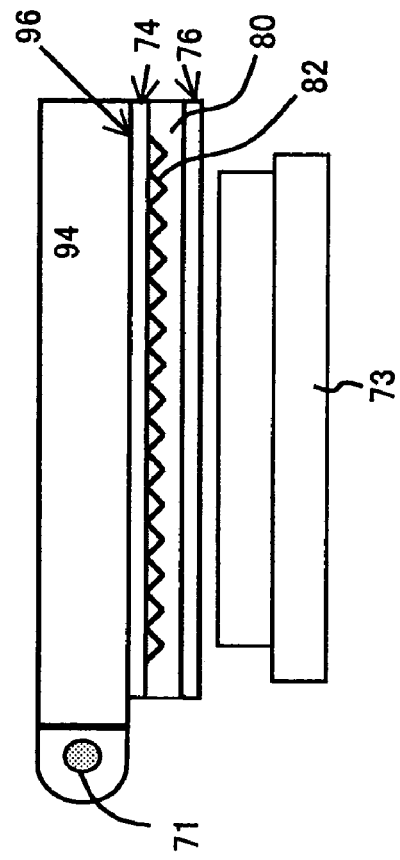
FIG. 56 show a diagram depicting a seventh example of a reflection type liquid crystal display panel with front light.

FIG. 56 is a diagram depicting the seventh example of a reflection type liquid crystal display panel with a front light. The configuration of FIG. 56 improves on the structure of FIG. 55. In other words, FIG. 56 shows a structure wherein a transparent light guiding plate 94 which has a light source 71 on the side face, is bonded with a substrate where an element which exhibits scattering characteristics is sealed between the two transparent substrates 74 and 76. Specifically, a prism layer 82 is formed between the transparent substrates 74 and 76 made of glass, and the substrate for scattering, where the liquid crystal layer 80, which refractive index status is changed by an electric field is filled, is bonded with the transparent light guiding plate 94 by optical bonding 96. In the case of this structure, fabrication of the two transparent substrates 74 and 76, where an element which exhibits scattering characteristics is sealed, and fabrication of the light guiding plate with a light source 94, can be separated, so that the fabrication process steps are separated each other and improves yield. The glass substrates 74 and 76 sandwiching the liquid crystal layer 80 are thin, 0.5-0.7 mm for example, and the plate thickness of the transparent light guiding plate 94, where the light source 71 is disposed, is thicker, so as to improve the light entering efficiency from the light source.

The front light structure of the present embodiment does not have scattering characteristics during normal use when the light source is not turned on, and the illumination light from the light source is scattered and entered to the reflection type liquid crystal display panel side only when the light source is turned on for use in a dark place. Therefore, blurred and distorted characters and images on the display screen can be prevented in normal use, and contrast can be improved. Also a bright display screen can be implemented even in a dark place.

[Modification of Reflection Type Liquid Crystal Display Device with Front Light Structure]

In the present embodiment, a reflection type liquid crystal display device having a front light structure as an illumination device is described.

Figure 102:
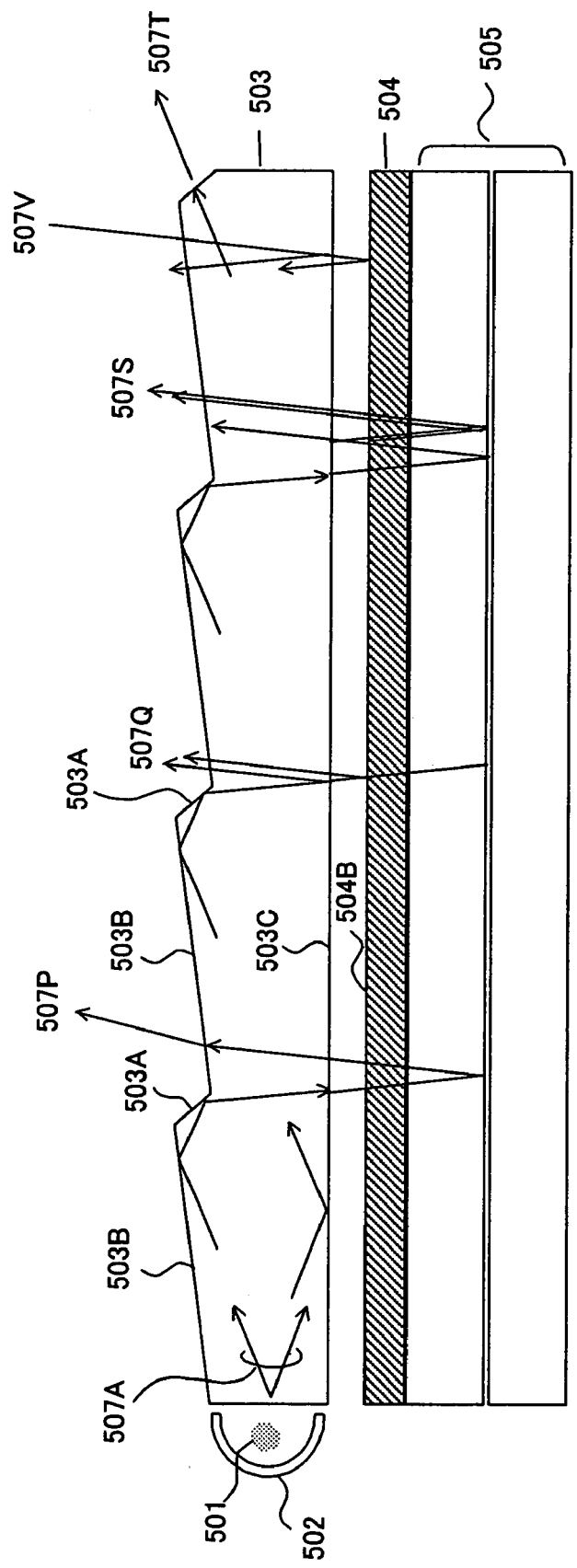
FIG. 102 is a cross-sectional view depicting a conventional reflection liquid type crystal display device with a front light structure.

FIG. 102 is a cross-sectional view depicting a reflection type liquid crystal display panel comprising a conventional front light structure. A polarizer 504 is formed on the surface of a liquid crystal panel 505, which has a reflection film and a liquid crystal layer inside, and a front light structure comprised of a light source 501, reflector 502 and a light guiding plate 503, is layered on the front. An air layer intervenes between the polarizer 504 and the light guiding plate 503.

Light from the light source enters the light guiding plate 503 as incident light 507A, which has some degree of spreading. The light guiding plate 503 is a prism where a sharp slope 503A and a mild slope 503B are combined, and the incident light 507A is guided in the light guiding plate 503 while being totally reflected on the mild slope 503B and the face 503C at the liquid crystal panel side. This light, which is totally reflected on the mild slope 503B, is also totally reflected on the shape slope 503A, advances to the liquid crystal panel 505 side, is reflected on the reflection face in the liquid crystal panel, and is emitted to the display side as light 507P. By this light 507P, the reflection type liquid crystal display panel can be used in a dark palace with no external light.

Actually however, reflection occurs at the interface 503C between the light guiding plate 503 and the air layer, or at the interface 504B between the polarizer 504 and the air layer, and the light 507Q, which does not transmit to the liquid crystal panel 505, leaks to the display side. Also, the light reflected at the sharp slop 503A of the light guiding plate 503 reflects on the interfaces 503C and 504B. It is also possible that light reflected inside the liquid crystal panel 505 reflects again on the interfaces 503C and 504B, reflects inside the liquid crystal panel 505, and this light 507S becomes the cause of a ghost image on the display. Normal external light also reflects on the interfaces 503C and 504B without transmitting to the liquid crystal panel 505, and leaks to the display side as light 507V.

In this way, in the case of a reflection type liquid crystal display panel with a conventional front light structure, there are many reflected light components which do not transmit to the liquid crystal panel and do not contribute to the display, therefore contrast drops considerably.

Therefore it is a first feature of the present embodiment that a low refractive index material, which can be formed at low cost, is disposed between the light guiding plate and the polarizer of the front light, so that normal light components which enter the liquid crystal panel are not reflected to the display side, while maintaining the light guiding components.

It is a second feature that a low refractive index material, which can be formed at low cost, is disposed between the touch panel and the light guiding plate of the front light, so that guided light does not enter the transparent conductive film while sufficiently controlling reflectance.

It is a third feature that a light shielding layer is formed at the sharp slope side of the prism faces of the light guiding plate via a low refractive index layer, so that leak light can be blocked without damaging the functions of the light guiding plate.

Concrete Configuration Example

Fabrication Example 1

Figure 90:
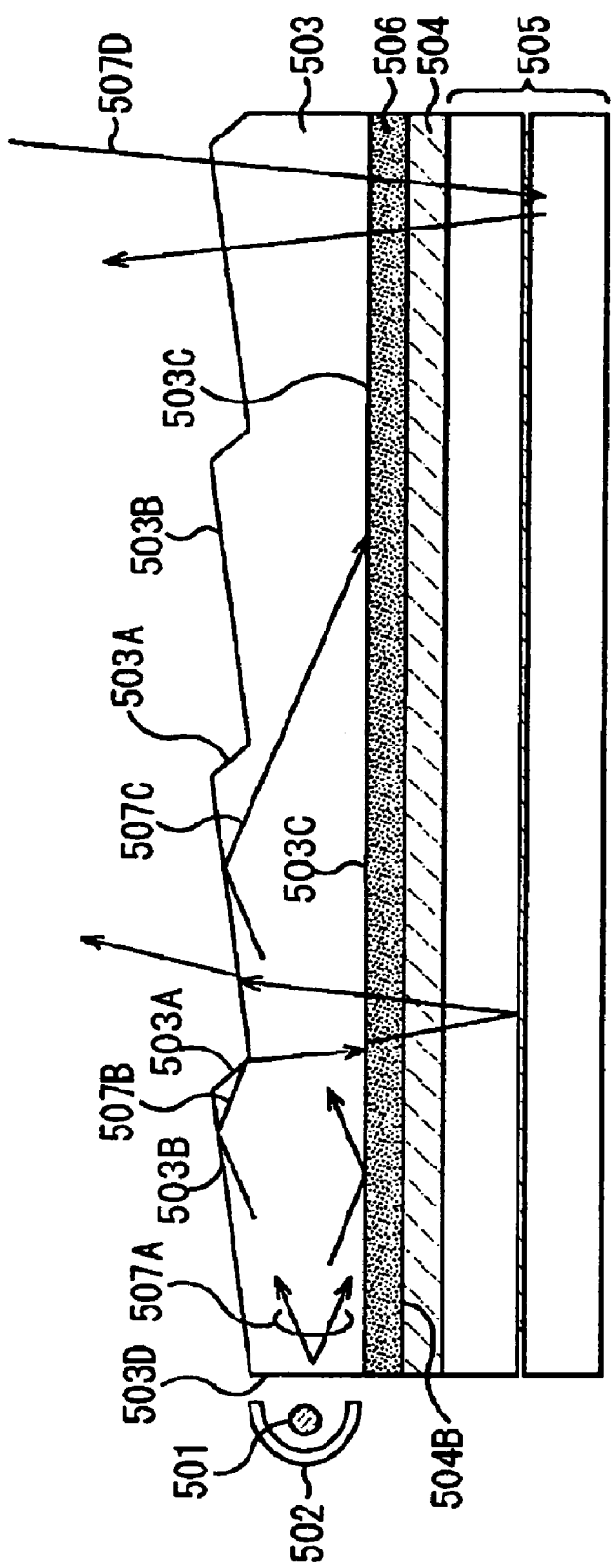
FIG. 90 is a cross-sectional view depicting a rough configuration of the reflection type liquid crystal display device of the fabrication example 1.

FIG. 90 is a cross-sectional view depicting a rough configuration of the reflection type liquid crystal display device of the fabrication example 1. This example has the above mentioned first feature where 501 is a cold cathode tube, 502 is a reflector, 503 is a light guiding plate, 504 is a circular polarizer, 505 is a reflection type liquid crystal panel, and 506 is a low refractive index layer.

The light guiding plate 503 is fabricated by press-molding acrylic resin with refractive index n=1.49. The surface of the light guiding plate 503 is comprised of a first inclined face 503B, which rises from a flat plane, or from a plane in parallel with the flat plane at a first angle, and a second inclined face 503A, which is adjacent to the first inclined face 503B, and which falls at a second angle which is larger than the first angle. As FIG. 90 shows, the incident face 503D and the plane 503C (the above mentioned flat plane) are almost perpendicular to each other, the plane 503C and the first inclined face 503B have a 2° angle, and the plane 503C and the second inclined face 503A have a 45° angle. The plane 503C and the first inclined face 503B may be in parallel (0°).

The circular polarizer 504 is comprised of a polarizer and λ/4 plate (returdation film), which are layered from the light guiding plate 503 side.

In this example, a low refractive index layer 506, comprised of fluorine resin material, is formed between the light guiding plate 503 and the polarizer 504 of the liquid crystal panel, so that the light guiding plate 503, the polarizer 504, and the liquid crystal panel 505 are integrated without intervening with the air layer. For the low refractive index layer 506 comprised of fluorine resin material, a sitop made by Asahi Glass, for example, is used, and this material has refractive index n=1.34. This fluorine resin material can be formed simply at low cost by dipping the press-molded light guiding plate 503 made of acrylic resin into a liquid material tank. This requires a much lower cost compared with the conventional fabrication method of AR-coating by a sputtering method, which has been proposed.

Light emitted from the cold cathode ray tube 501 enters the incident face 503D of the light guiding plate 503 via the reflector 502. Light 507A, which entered the light guiding plate, advances inside the light guiding plate as light which is ±42° with respect to the normal line of the platen 503D, that is, with respect to plane 503C. Of this light, the components which entered the mild slope 503B are totally reflected, and becomes components 507B and 507C which advance to the sharp slope 503A and the interface 503C. Light 507B is also totally reflected on the sharp slope 503A, and advances to the liquid crystal panel 505 almost vertically. In this case, the low refractive index layer 506 (n=1.34) has been formed between the interface 503C of the light guiding plate 503 and the interface 504B of the polarizer 504, so reflected light at these interfaces is considerably decreased, and most of the components advancing vertically enter the liquid crystal panel 505, and become light components to be used for the display. As a result contrast improves.

With the light 503C, components having an incident angle to the interface 503C of 64° or more are totally reflected and advance inside the light guiding plate again. With the light 507A, components advancing directly to the interface 503C are equivalent to the light 507C, so are separated into components which are guided according to the incident angle and components which enter the liquid crystal panel 505. Therefore, even if the low refractive index layer 506 (n=1.34) is disposed at the interface 503C of the light guiding plate 503 instead of a conventional air layer (n=1), the light guiding functions of the light guiding plate 503 are affected very little, and it is restrained that a light in the light guiding plate leaks to the display without entering the liquid crystal panel, and contrast drops.

Out of the components of the incident light advancing directly to the interface 503C, the components of light which incident angle to the interface 503C is 64° or less enter the liquid crystal panel 505 via the low refractive index layer 506 and the circular polarizer 504. There are, however, few such components. And these components become stray light due to the characteristics of the liquid crystal panel and polarizer, and do not contribute to the display.

External illumination light 507D enters from the light guiding plate 503, and illuminate the liquid crystal panel 505, but the light guiding plate 503, circular polarizer 504 and reflection liquid crystal panel 505 contact each other via the low refractive index layer 506. Since the refractive index of the low refractive index layer 506 is n=1.34, which is higher than the air layer, n=1, reflectance can be decreased at the interface. Therefore reflection by the light guiding plate interface 503C and the polarizer interface 504B, which have been a problem of conventional structures, can be considerably decreased. Therefore in the case of the liquid crystal panel used for this fabrication example, contrast improved dramatically, that is, when only a liquid crystal panel is used, contrast is 20, when the front light of a conventional structure is used, contrast is 5, and when the front light of the present invention is used, contrast is 12.

Fabrication Example 2

Figure 91:
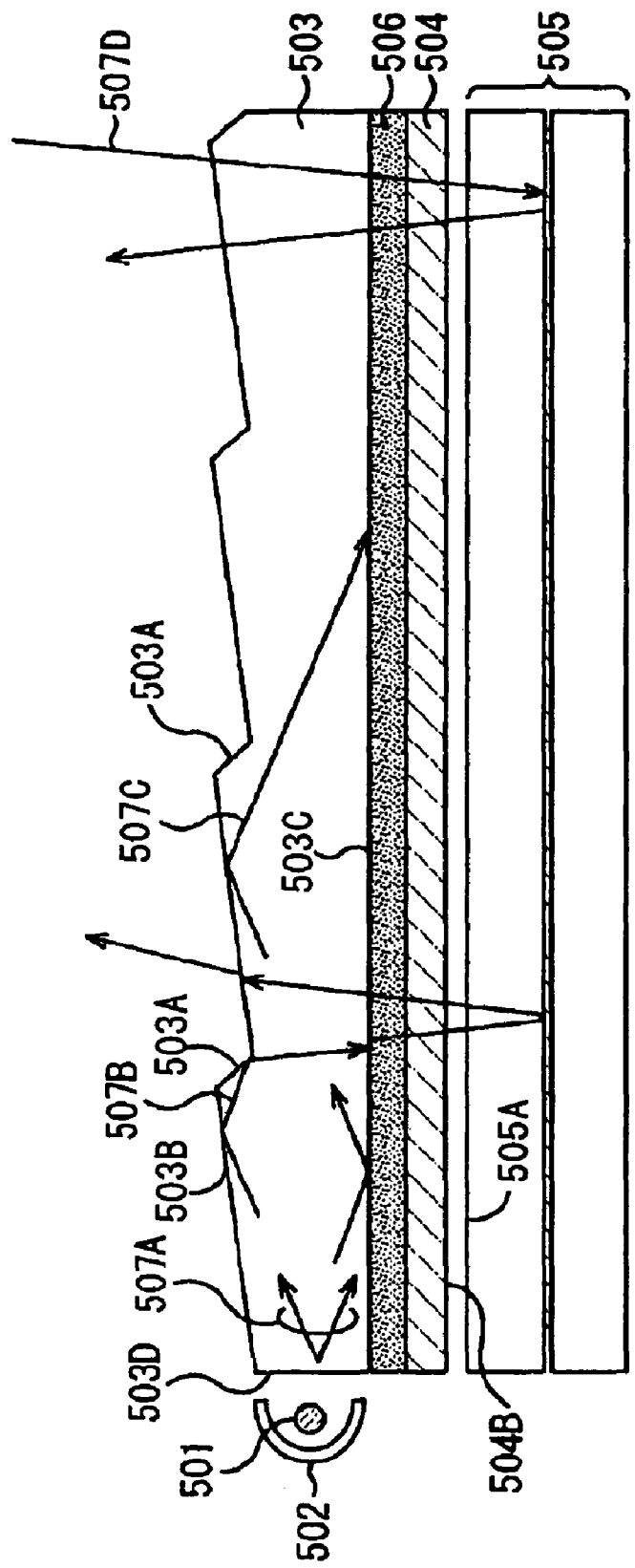
FIG. 91 is a cross-sectional view depicting a rough configuration of the reflection type liquid crystal display device of the fabrication example 2.

FIG. 91 is a cross-sectional view depicting a rough configuration of the reflection type liquid crystal display device of the fabrication example 2. This device also has the above mentioned first feature, and in FIG. 91, the same elements as the fabrication example 1 are denoted with the same numbers, and descriptions for this are omitted.

In the fabrication example 1, interface reflection is controlled by contacting all the elements, but in the present fabrication example, the light guiding plate part and the liquid crystal panel pair are separated, and an effect similar to the fabrication example 1 can be obtained.

As illustrated, the circular polarizer 504 is contacted with the light guiding plate 503 via the low refractive index layer 506. At this part, the light guiding functions and the reflectance control functions are the same as the fabrication example 1. However, the light component 507B, which emits from the light guiding plate at an angle close to vertical after reflecting to the interface 503A, and the illumination component 507D from the outside, have reflection components just like prior art due to the air layer in between when transmitting the circular polarizer interface 504B and the liquid crystal panel interface 505A.

However, in the present fabrication example, both the lights of the interfaces 507B and 507D transmit through the circular polarizer, then are reflected on the interfaces 504B and 505A, and enter the circular polarizer 504 again. At this time, incident light, which enters the circular polarizer 504 again, is absorbed by the circular polarizer, so reflected light is not leaked to the display side, and contrast does not drop as in prior art.

In the present fabrication example, a circular polarizer is used, which is a polarizer and the λ/4 plate (returdation film) which are bonded. For the λ/4 plate (returdation film), a normal λ/4 plate (returdation film) and λ/2 plate (returdation film) may be combined. In this case, combining is more effective since the tolerance, wavelength dependency and incident angle dependency of a λ/4 plate (returdation film) can be compensated by the λ/2 plate (returdation film).

Fabrication Example 3

Figure 92:
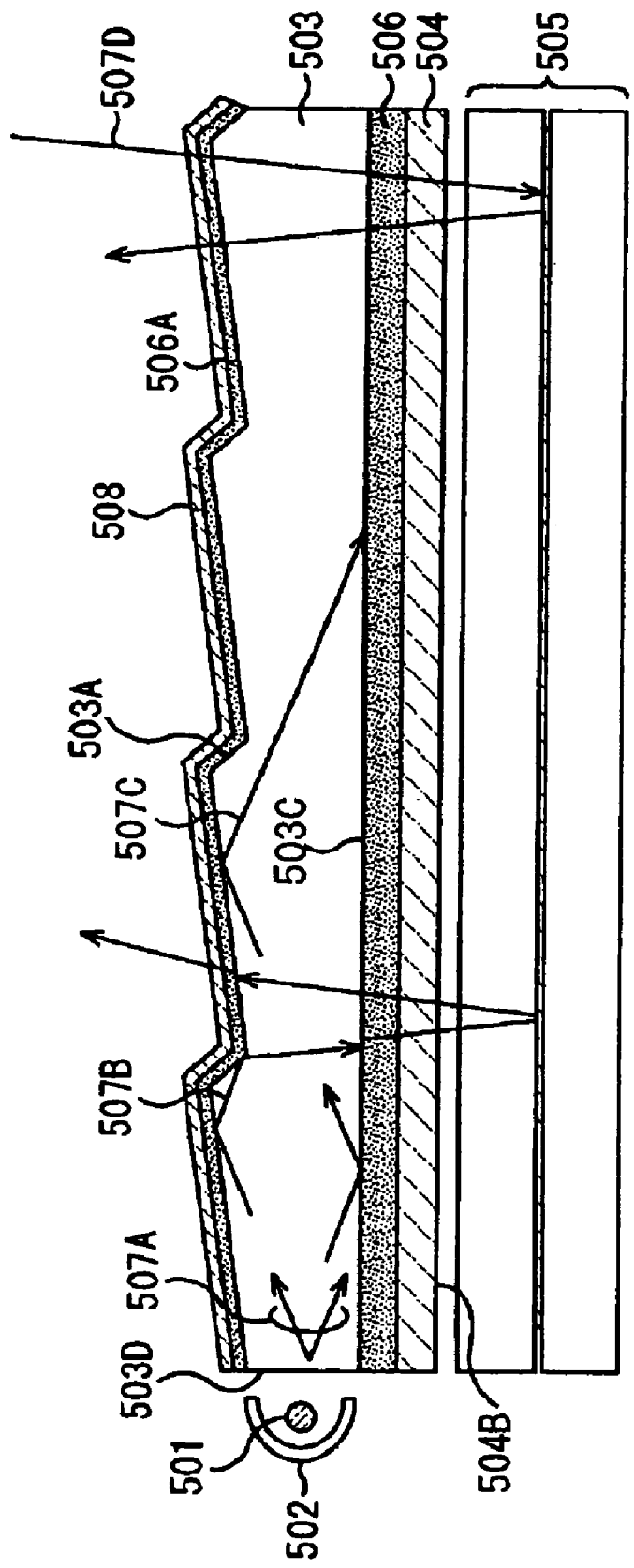
FIG. 92 is a cross-sectional view depicting a rough configuration of the reflection type liquid crystal display device of the fabrication example 3.

FIG. 92 is a cross-sectional view depicting a rough configuration of the reflection type liquid crystal display device of the fabrication example 3. This example has the above mentioned second feature.

In this example, a transparent conductive film 508 is formed on the entire surface of the light guiding plate 503. In this transparent conductive film 508, a terminal for measuring potential is attached at a peripheral part (not illustrated), so as to function as a touch panel to perform coordinate input based on the potential change at each point. Details on the operation and principle of this touch panel are omitted here, since it is not related to the principle of the present invention. Other elements are almost the same as the fabrication example 1, and are denoted with the same numbers as the fabrication example 1, so descriptions thereof are omitted.

A problem when the touch panel and the reflection liquid crystal display device are integrated is that light in a specific band of the light, which is guided by the light guiding plate, is absorbed by the transparent conductive film 508. In other words, the transparent conductive film 508 absorbs the light components of blue and red, and green becomes dominant on the display face. However, both the light guiding plate of the front light and the touch panel must be disposed on the liquid crystal panel (observer side), and cannot have an optically independent configuration, in order to prevent a drop in display quality.

The present inventors examined structures where the reflection of display light and the external illumination light are controlled, where light which is reflected and advances in the light guiding plate does not pass the transparent conductive film, and they invented the present invention to dispose the low refractive index layer 506A contacting between the light guiding plate 503 and the transparent conductive film 508, just like fabrication examples 1 and 2. By using this structure, reflection by display light and external illumination light can be restrained while maintaining the light guiding components. In the present fabrication example, the low refractive index layer 506A is formed on the light guiding plate 503 by fluorine resin coating, then ITO film is formed by deposition so as to form the transparent electrode film 508. In the light guiding plate fabricated this way, components which entered from the light source to the light guiding plate partially pass through the low refractive index layer 506A, and reach the ITO layer 508. However, most components totally reflect at the interface between the light guiding plate 503 and the low refractive index layer 506A. Therefore the light components which leak to the ITO layer 508, which is the transparent electrode, decrease, and the conventional problem of absorbing blue and red light components in the ITO layer 508 is considerably improved, and the integration of the front light and the touch panel becomes possible.

Figure 93:
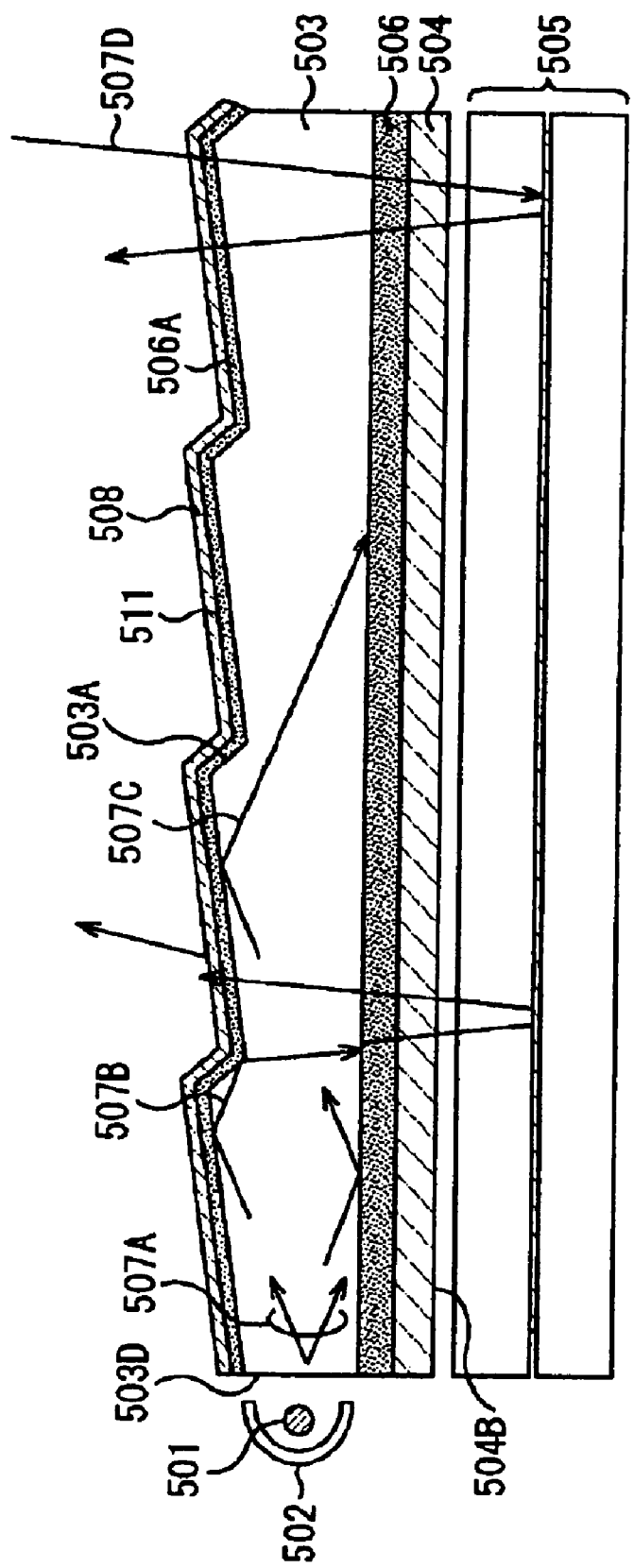
FIG. 93 is a cross-sectional view depicting a rough configuration of the reflection type liquid crystal display device of the fabrication example 3.

In the case of a large display device, however, the absorption of blue and red components in the ITO film may be a problem, even with the configuration of the present fabrication example. This is because a part of the light which enters from the light source, as mentioned above, passes through the interface 503A, and reaches the ITO layer 508. Therefore the present inventors invented the following configuration as a countermeasure thereof. FIG. 93 shows an example.

As FIG. 93 shows, a dye layer 511 is intervened between the low refractive index layer 506A and the transparent electrode layer 508. The other parts are the same as FIG. 92. The dye layer 511 is contacted between the low refractive index layer 506A and the transparent conductive film layer 508, as illustrated. Since the ITO layer 508, which is the transparent electrode layer, absorbs 15% of the B band and 25% of the R band, the material of the dye layer 511 is selected to compensate this, to absorb 25% of the G band and 5-10% of the B band. By this, the components of all the RGB bands can be equally absorbed by the dye layer 511 and the ITO layer 508. Therefore green dominating the display face can be prevented. By this structure, the light reaching the transparent conductive film layer can be corrected by the dye layer, even if color balance is lost by the absorption of the transparent conductive film, the lost balance can be compensated by the dye layer 511, and a large touch panel integrated type display device can be implemented without dropping the display quality.

The front light of the touch panel integrated type can exhibit higher display quality by integrated with a circular polarizer and liquid crystal panel, just like the fabrication example 1 and 2.

Needless to say, a reflection film type touch panel is possible if a spacer and counter ITO substrates are added.

Fabrication Example 4

Figure 94:
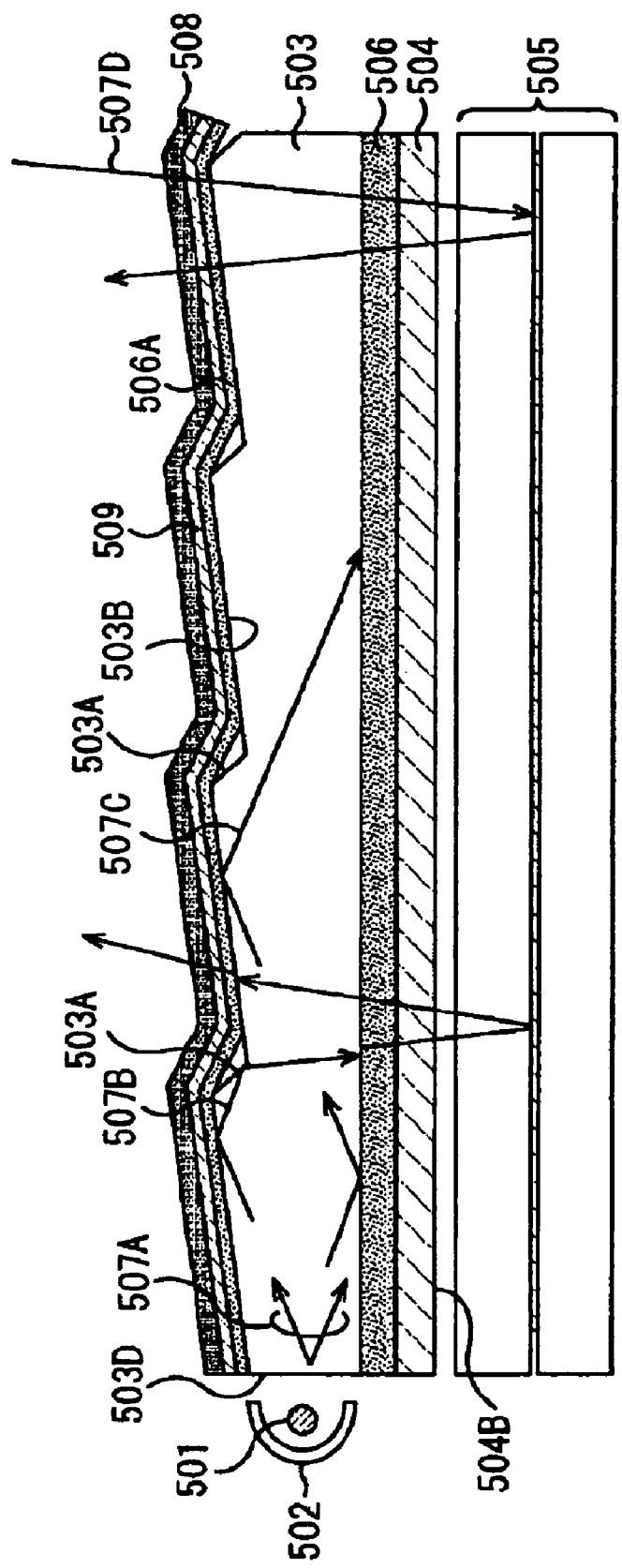
FIG. 94 is a cross-sectional view depicting a rough configuration of the reflection type liquid crystal display device of the fabrication example 4.

FIG. 94 is a cross-sectional view depicting a rough configuration of the reflection type liquid crystal display device of the fabrication example 4. This example as well has the above mentioned second features. However, this example can be fabricated more easily than the fabrication example 3.

In this example, the transparent electrode layer and low refractive index layer to be formed on the front face side of the light guiding plate 503 is formed by gluing a transparent PET film 509, where the ITO layer 508 has been deposited in advance, on the surface of the light guiding plate 503 by a sealing type glue with refractive index n=1.3. In FIG. 94, the ITO layer 508 is deposited on the PET film 509, and the sealing type glue with refractive index 1.3 (hereafter low refractive index glue) is coated on the entire surface at the opposite side of the ITO layer 508 of the PET film 509. If this PET film is glued on the front face side of the light guiding plate 503, the PET film 509 and the interface 503B contact via the low refractive index glue 506A, since the interface 503B is almost horizontal, as mentioned above.

Since the interface 503A has a sharp slope where height changes rapidly, the PET film cannot be contacted as tightly as the interface 503B, so an air gap (air layer) enters between the interface 503A of the light guiding plate 503 and the low refractive index layer 506A. Because of this, more light reflects on the interface 503A between the acrylic material (n=1.5) of the light guiding plate 503 and the air layer (n=1), compared with the case when PET film is contacted with the low refractive index layer 506A, so the light of the light guiding plate 503 can be distributed to the liquid crystal panel 505 side more efficiently.

After forming the ITO layer 508 on the flat PET film 509, the PET film is simply glued to the light guiding plate 503, so compared with the method of depositing the ITO layer 509 on the surface of the light guiding plate 503, this process is simple, and process yield improves.

Fabrication Example 5

Figures 95A, 95B:
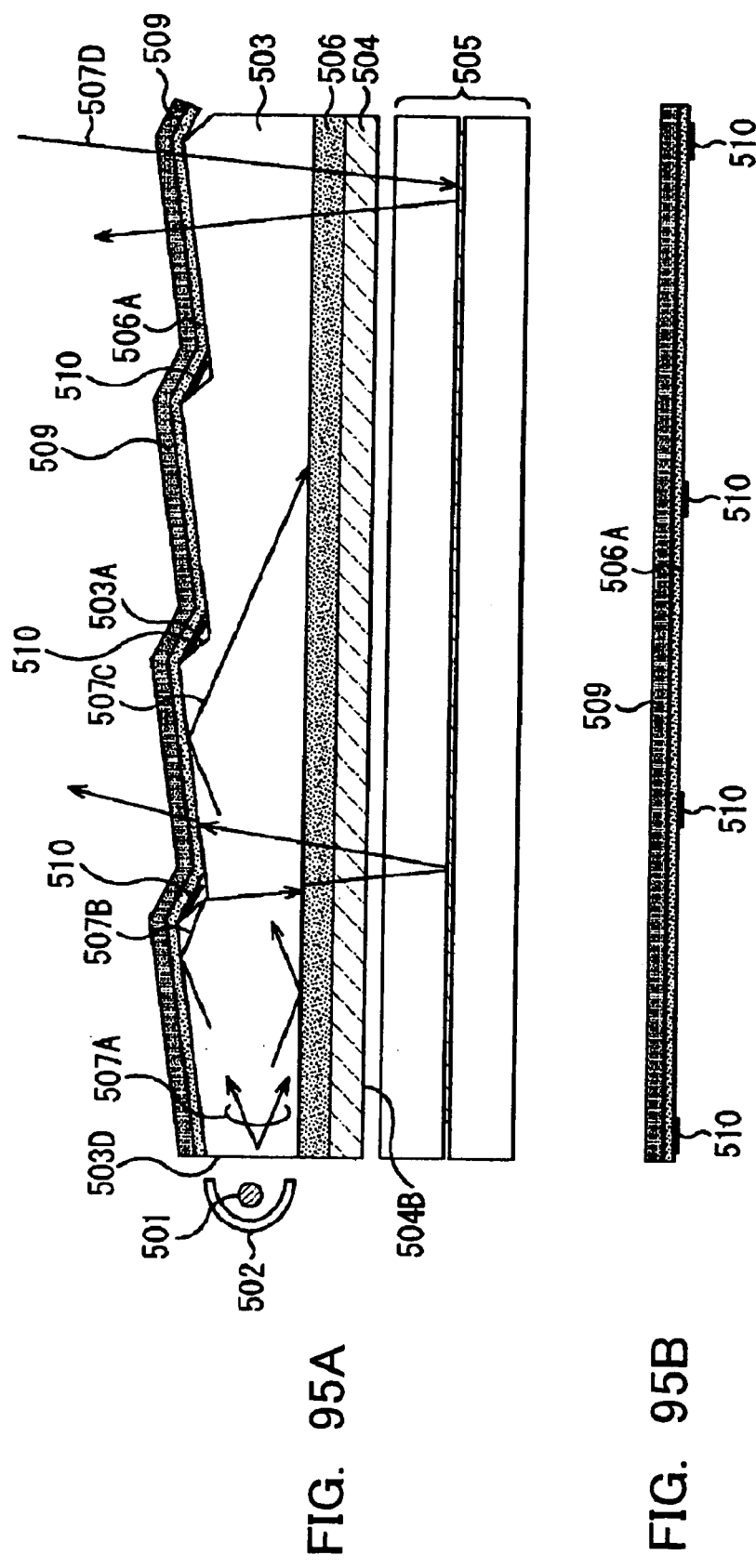
FIGS. 95A-95B are cross-sectional view views depicting a rough configuration of the reflection type liquid crystal display device of the fabrication example 5.

FIG. 95A is a cross-sectional view depicting a rough configuration of the reflection liquid crystal display device of the fabrication example 5. This example is related to the above mentioned third feature. As illustrated, the low refractive index layer 506A is formed on the PET film 509, then a light shielding layer 510 is formed, and these are glued on the surface of the light guiding plate 503. Other parts are the same as the above mentioned fabrication examples, for which descriptions are omitted.

Figure 101:
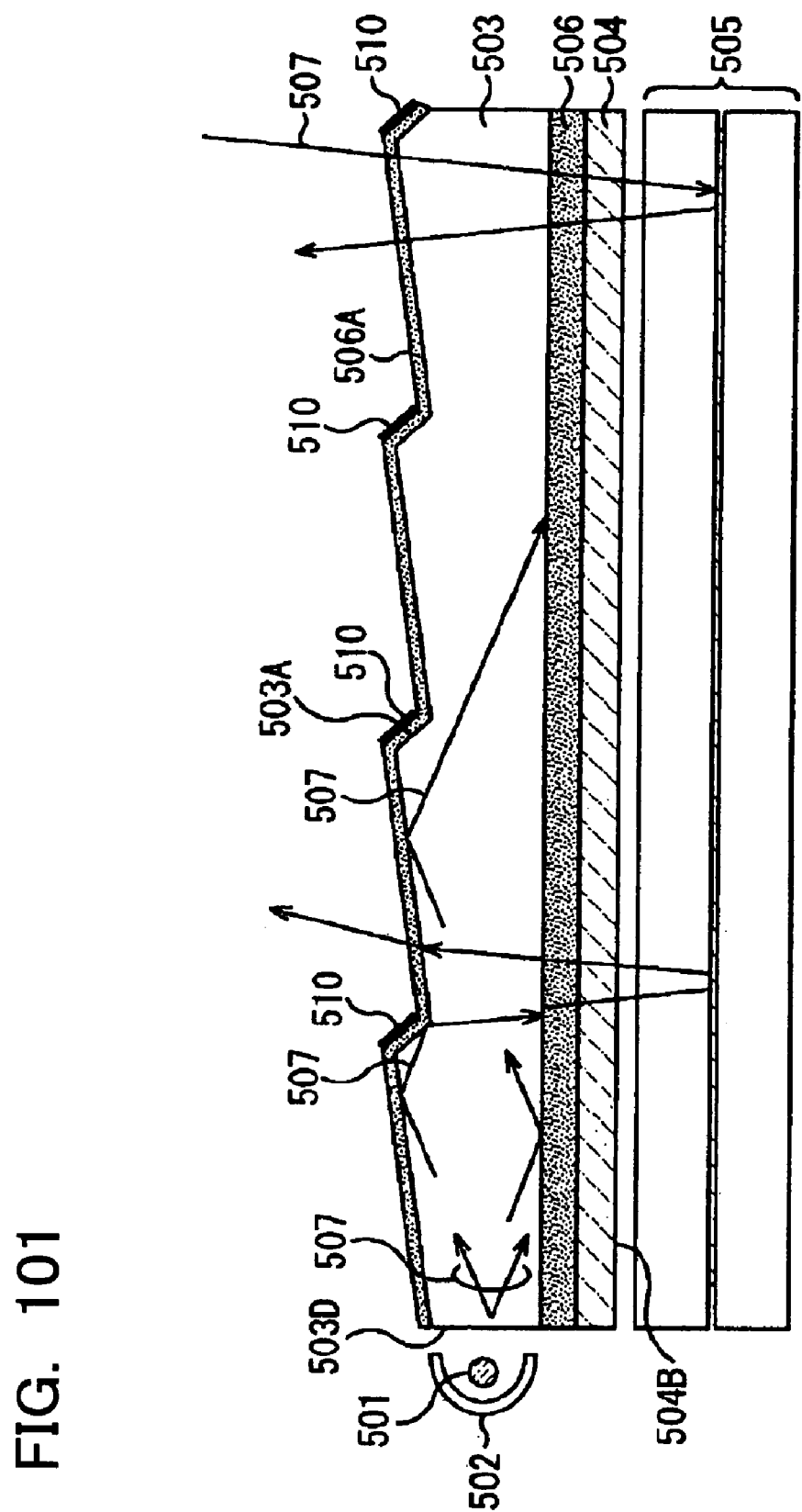
FIG. 101 is a cross-sectional view depicting a rough configuration of the reflection type liquid crystal display device of the comparison example.

As FIG. 101 shows, if the light shielding layer 510 is disposed at the interface 503A on the light guiding plate 503 via the low refractive index layer 506A, patterning by oblique exposure is required to form the light shielding layer 510. In this fabrication method, the light shielding layer 510 can be accurately formed, but this fabrication takes time, which increases cost. Therefore the present fabrication example was invented as a method of obtaining a similar effect at low cost.

In this fabrication example, PET film is glued, just like in fabrication example 4, as a means of disposing the light shielding layer 510 via the low refractive index layer 506A.

FIG. 95B shows a cross-sectional view of the PET film. On the PET film 509, the low refractive index bonding layer 506A and the light shielding layer 510 are formed sequentially. The light shielding layer 510 is black ink formed by printing. Unlike conventional inventions, the light shielding film 510 is formed on the plane of the PET film 509, so a conventional printing method can be used. This sheet is bonded on the light guiding plate 503. At this time, an alignment step is required so that the light shielding layer 510 positions on the interface 503A, here cost is lower since this alignment is implemented in a very short time with simple equipment compared with the conventional oblique exposure and patterning processes.

As illustrated, the light shielding layer 510 and the interface 503A do not contact each other, but an air layer exists between them. Therefore light which entered the interface 503A is distributed to the liquid crystal panel 505 side by total reflection, just like the case of a conventional front light. The leak light component, which transmits through the interface 503A, enters the light shielding layer 510 after emitting from the interface 503A, and is absorbed, so the problem of leak light emitted to the observer side and dropping the display quality can be prevented. Display light reflected from the liquid crystal panel 505 is also shielded, but the size of the slope 503A differs 30 times or more from the slope 503B, so this is hardly a problem. From an observer view, the light shielding layer 510 exists only in a very small area, which does not attract the attention of an observer, and the light shielding layer also functions to decrease black brightness, so contrast can be improved.

For the light shielding layer 510, a reflector, absorber or the layers of the reflection layer and absorption layer can be used. If a reflector is used for the light shielding layer 510, conventional leak light can be recycled as illumination light to the display panel 505, which can make the display brighter. In the case of a layered structure, where the reflection layer is disposed at the front face side of the light guiding plate 503 and the absorption layer at the observer side, leak light from the light guiding plate is reflected to the liquid crystal panel side, and light from the outside is absorbed, so both a bright display and high contrast are implemented at the same time, which is very effective. In these cases as well, these effects can be implemented merely by changing the ink to be printed, according to the method of the present fabrication example.

Fabrication Example 6

FIG. 96 is a cross-sectional view depicting a rough configuration of the reflection type liquid crystal display device of the fabrication example 6. In this example, a slit type scattering layer 512 is intervened between the light source 501 and the light guiding plate 503, so that the angle of the incident light become more parallel with the interface 503C. Other parts are the same as the previous fabrication examples, for which descriptions are omitted. In the fabrication example 1, a part of the components of the light entered from the light guiding plate incident face 503D are not guided but are emitted to the polarizer 504 side. These components do not aggravate the display quality very much, as described above, but are wasted as stray light, so this makes the illumination system less efficient, and which becomes a problem especially when power consumption must be decreased. Therefore in the present fabrication example, light to enter the light guiding plate is shaped to be parallel with the interface 503C by the slit type scattering layer 512, so as to improve the efficiency of the lights.

As illustrated, the slit type scattering layer 512 is comprised of a scattering layer 512A where $TiO_2$ particles are dispersed in acrylic resin and a transparent acrylic resin layer 512B, which are layered alternately, and transforms the light entered from the interface 503D to light which has many components heading in the tight direction in FIG. 96. In other words, the incident light is scattered by the scattering layer 512A, and only components parallel with the interface 503C transmit through the acrylic layer 512B.

By this, components which are not totally reflected by the interface 503C of the light guiding plate 503 but are transmitted in conventional structure, can be transformed to components which can be totally reflected, and the efficiency of the light source improves.

Figure 97:
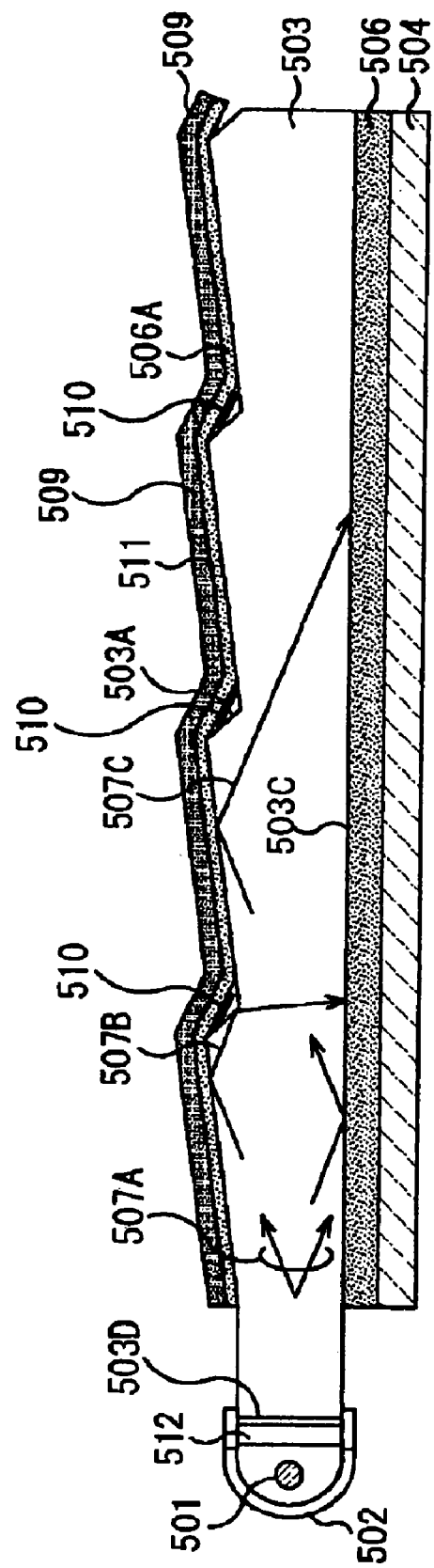
FIG. 97 is a cross-sectional view depicting a rough configuration of the reflection type liquid crystal display device of the fabrication example 6.

As FIG. 97 shows, this configuration can also be implemented by a structure where the slit type scattering layer 512 is disposed without contacting the incident face 503D of the light guiding plate 503. Instead of the slit type scattering layer, the scattering directivity element shown in FIG. 98 may be disposed. In this case, the scattering directivity element is disposed to the air, and light enters the incident face 503D of the light guiding plate 503 after directivity is intensified, so the addition of the above mentioned directivity element can be smaller, which can make the structure simpler.

Figure 98:
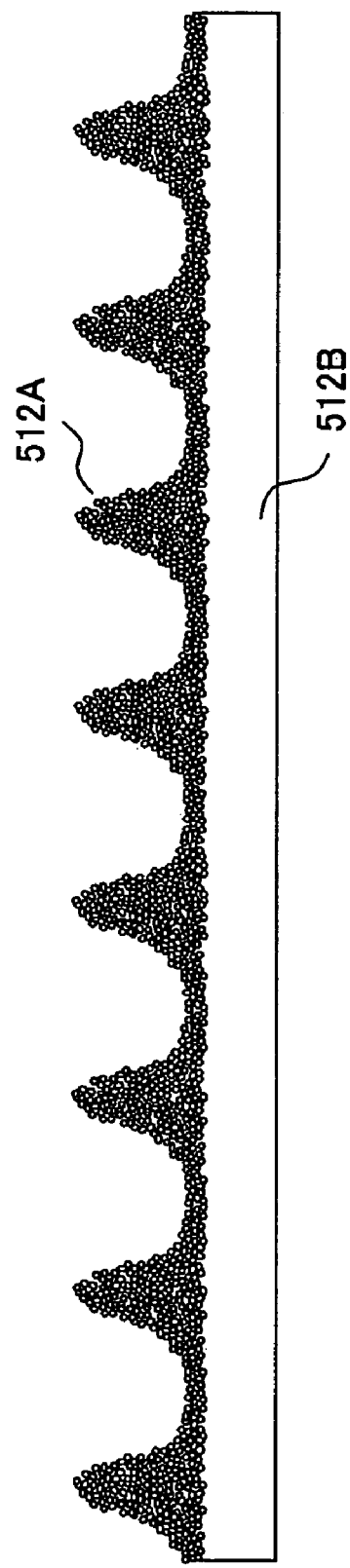
FIG. 98 is a cross-sectional view depicting the structure of a scattering directivity element.

FIG. 98 shows an example of a cross-section of the scattering directivity element. This is formed by printing $TiO_2$ particles 512A on the acrylic resin layer 512B. The cross-sectional structure of the printed particle layer 512A has a smooth convex shape, as illustrated. The light entered from the acrylic resin layer 512B is scattered by the particles 512A, and is emitted to the light guiding plate side as parallel lights.

Figure 99:
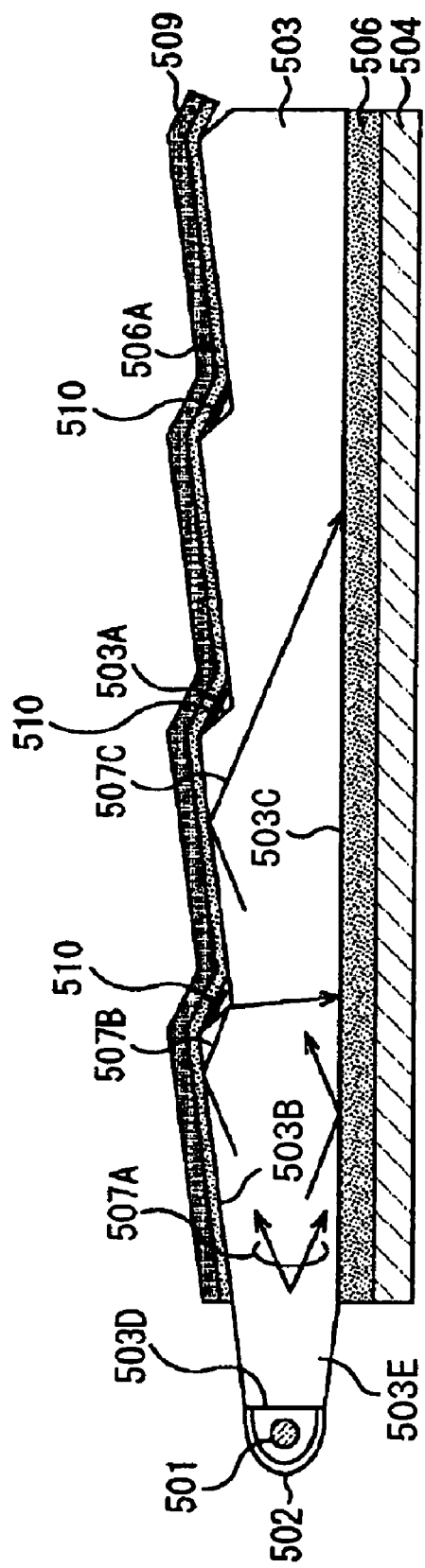
FIG. 99 is a cross-sectional view depicting a rough configuration of the reflection type liquid crystal display device of the fabrication example 6.

The incident side shape of the light guiding plate 503 can be transformed to be like 503E, as shown in FIG. 99. Components which are not totally reflected at the interface 503C between the light guiding plate 503 and the low refractive index layer 506, but which are transmitted through, are components which incident angle with respect to the bottom face of the light guiding plate 503C is small. Therefore these components enter the interface 503C and 503B at locations near the light source. If this interface has a shape which broadens, as shown in FIG. 503E, the lights after reflection have angles close to being parallel to the interface 503C. Therefore by appropriately arranging this broadening shaped part, the incident light to the light guiding plate 503 can be transformed to be light which have less components, which transmit through the low refractive index layer 506.

Figure 100:
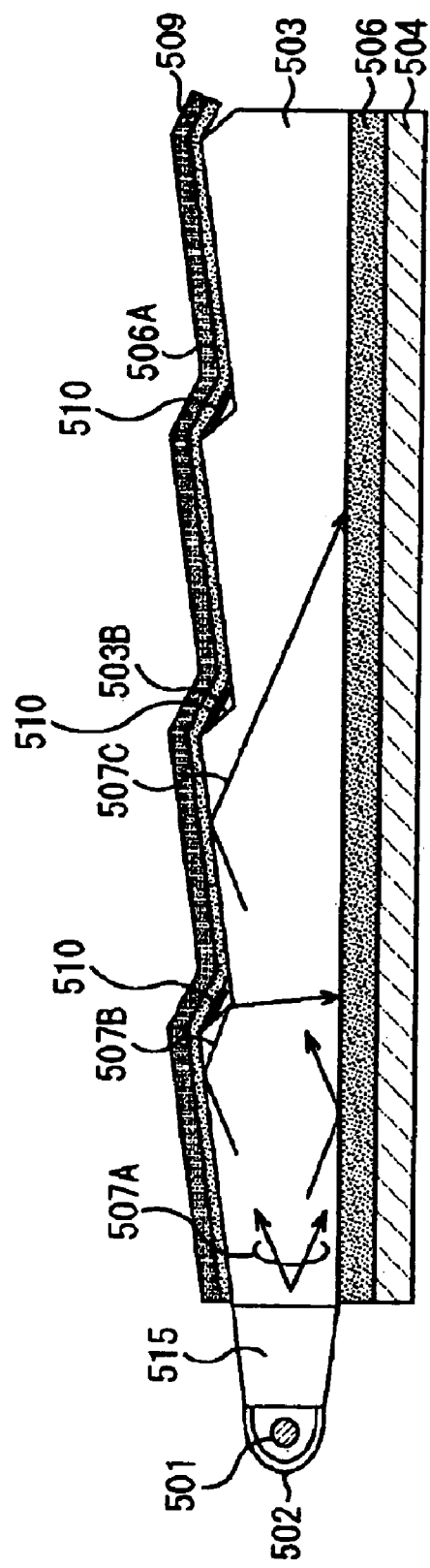
FIG. 100 is a cross-sectional view depicting a rough configuration of the reflection type liquid crystal display device of the fabrication example 6.

Just like the above mentioned fabrication examples, it is not always necessary to integrate the light guiding plate in this structure. For example, as FIG. 100 shows, the broadening shaped part 515 can be disposed at the incident side of the light guiding plate 503.

As described above, according to the present embodiment, a large effect can be presented to improve the performance of the reflection liquid crystal panel with a front light.

As described above, according to the present invention, the undulation for reflection of the reflection type liquid crystal display device can be formed by a simple process, and an inclined face distribution of desired undulation can be formed with good controllability. Also according to the present invention, optimum inclined face distribution by undulation for reflection can be obtained, which improves reflectance.

What is claimed is:

1. A reflection type liquid crystal display device comprising:
   a first substrate and a second substrate opposite said first substrate;
   a common electrode formed on said second substrate;
   TFTs each having electrodes, and step structures each formed from the same material as the electrodes of TFTs, being formed on the first substrate, said step structures being formed in the same layer as, and spatially separated from, one of the electrodes of the TFTs, and the step structures having a linear plane shape or a combination of linear plane shapes when seen in plan view;
   a resin layer formed on said first substrate, the TFTs and the step structures, and having undulation at a surface thereof, and an area with distribution of thermal shrinkage characteristics being different in at least one direction of a thickness direction and a plane direction and being formed according to the TFTs and the step structures, the undulation being formed according to the distribution of thermal shrinkage characteristics within the resin layer; and
   a reflection layer which is formed on said resin layer and has a surface shape reflecting said undulation of said resin layer,
   wherein the undulation has a wave-like shape with peak portions thereof being linear or curved, and valley portions thereof having a similar shape to corresponding peak portions when seen looking perpendicular to the plane of the first substrate, and
   steps are formed in pixel areas according to at least one of number, shape and arrangement of the step structures disposed on the surface of said first substrate under the resin layer, an area having a different distribution of said undulation being formed corresponding to said steps.

2. The reflection type liquid crystal display device according to claim 1, wherein the average inclination angle of said undulation of said resin layer is a value between 8° and 13°.

3. A reflection type liquid crystal display device comprising:
   a first substrate and a second substrate opposite said first substrate;
   a common electrode formed on said second substrate;
   TFTs each having electrodes, and step structures each formed from the same material as the electrodes of the TFTs, being formed on the first substrate, said step structures being formed in the same layer as, and spatially separated from, one of the electrodes of the TFTs, and the step structures having a linear plane shape or a combination of linear plane shapes when seen in plan view;
   a resin layer formed on said first substrate, the TFTs and the step structures, and having undulation at a surface thereof, and a part of which thermal shrinkage characteristics is different from said resin layer, so that a distribution of thermal shrinkage characteristics, which is different in at least one direction of a thickness direction and a plane direction according to the thermal shrinkage characteristics of said resin and said part, is formed in the resin layer; and
   a reflection layer which is formed on said resin layer and has a surface shape reflecting said undulation of said resin layer,
   wherein the undulation is formed according to the distribution of thermal shrinkage characteristics in the resin layer and the TFTs and the step structures,
   wherein the undulation has a wave-like shape with peak portions thereof being linear or curved, and valley portions thereof having a similar shape to corresponding peak portions when seen looking perpendicular to the plane of the first substrate; and
   steps are formed in pixel areas according to at least one of number, shape and arrangement of the step structures disposed on the surface of said first substrate and under the resin layer, and an area having a different distribution of said undulation is formed corresponding to said steps.

4. The reflection type liquid crystal display device according to claim 3, wherein said part is comprised of particles having said different thermal shrinkage characteristics in the resin layer.

5. The reflection type liquid crystal display device according to claim 3, wherein said part is comprised of another resin layer having different thermal shrinkage characteristics layered in said resin layer.

6. The reflection type liquid crystal display device according to claim 3, wherein said part is comprised of another resin layer having different thermal shrinkage characteristics formed into a predetermined shape in said resin layer.

7. A reflection type liquid crystal display device comprising:
   a first substrate and a second substrate opposite said substrate;
   a common electrode formed on said second substrate;
   TFTs each having an electrodes, and step structures each formed from the same material as the electrodes of the TFTs, being formed on the first substrate, said step structures being formed in the same layer as, and spatially separated from, one of the electrodes of the TFTs, and the step structures having a linear plane shape or a combination of linear plane shapes when seen in plan view;
   a resin layer formed on said first substrate, the TFTs and the step structures, and having undulation at a surface thereof; and
   a reflection layer which is formed on said resin layer and has a surface shape reflecting said undulation of said resin layer,
   wherein an irradiation of light with a predetermined exposure energy to the surface of said resin layer forms distribution of shrinkage factors in a thickness direction of said resin layer, and said undulation of said resin layer is formed corresponding to said distribution of said shrinkage factors within said resin layer and the TFTs and the step structures,
   the undulation has a wave-like shape, with peak portions thereof being linear or curved, and valley portions thereof having a similar shape to corresponding peak portions when seen looking parallel to the plane of the first substrate, and
   steps are formed in pixel areas according to at least one of number, shape and arrangement of the step structures disposed on the surface of said first substrate and under the resin layer, and an area having a different distribution of said undulation is formed corresponding to said steps.

8. A method of manufacturing a reflection type liquid crystal display device, comprising:
   (a) forming transistors having electrodes on a substrate and, in the step of forming the transistors, further forming step structures in the same layer as the electrodes of the transistors and spatially separated from one of the electrodes of the transistors;
   (b) forming a photo-sensitive resin layer having a predetermined film thickness on the substrate with the transistors and the step structures formed on the substrate;
   (c) irradiating deep ultraviolet light having a first irradiation energy to an entire surface of the photo-sensitive resin layer over the transistors and the step structures, to form distribution of thermal deformation characteristics in a thickness direction or a plane direction of the photo-sensitive resin layer;
(d) performing a heat treatment with a first temperature to the photo sensitive resin layer, to form undulation at the surface of said photo\-sensitive resin layer; and
(e) forming pixel electrodes on the photo-sensitive resin layer having the undulation at the surface;
(f) before the step of irradiating the deep ultraviolet light having the first irradiation energy, forming contact holes to the electrodes of the transistors in the photo-sensitive resin layer by a photo-lithography process for partially exposing the photo-sensitive resin layer to ultraviolet light having a second irradiation energy lower than the first irradiation energy and developing said photo-sensitive resin layer,
wherein, in the step of forming the pixel electrodes, the pixel electrodes are connected to the electrodes of the transistors through the contact hole.

* * * * *

UNITED STATES PATENT AND TRADEMARK OFFICE
CERTIFICATE OF CORRECTION

PATENT NO.        : 7,903,210 B2  
APPLICATION NO.   : 11/060962  
DATED             : March 8, 2011  
INVENTOR(S)       : Sugiura et al.

It is certified that error appears in the above-identified patent and that said Letters Patent is hereby corrected as shown below:

<u>On the Title Page</u>

After "(76) Inventors:" and the listed inventors, insert

--(73) Assignee: Sharp Kabushiki Kaisha, Osaka, (JP)--

Signed and Sealed this
Twentieth Day of September, 2011

David J. Kappos
*Director of the United States Patent and Trademark Office*